(12) United States Patent
Inagaki et al.

(10) Patent No.: US 10,318,129 B2
(45) Date of Patent: Jun. 11, 2019

(54) ATTACHABLE DEVICE WITH FLEXIBLE DISPLAY AND DETECTION OF FLEX STATE AND/OR LOCATION

(71) Applicant: FLEXTERRA, INC., Skokie, IL (US)

(72) Inventors: Philippe Inagaki, Skokie, IL (US); Hjalmar Edzer Ayco Huitema, Belmont, CA (US)

(73) Assignee: FLEXTERRA, INC., Skokie, IL (US)

( * ) Notice: Subject to any disclaimer, the term of this patent is extended or adjusted under 35 U.S.C. 154(b) by 124 days.

(21) Appl. No.: 15/054,723

(22) Filed: Feb. 26, 2016

(65) Prior Publication Data

US 2016/0283086 A1    Sep. 29, 2016

Related U.S. Application Data

(63) Continuation of application No. PCT/US2014/052814, filed on Aug. 27, 2014.
(Continued)

(51) Int. Cl.
*G06F 3/0484* (2013.01)
*G06F 1/16* (2006.01)
*G06F 3/0488* (2013.01)

(52) U.S. Cl.
CPC .......... *G06F 3/04845* (2013.01); *G06F 1/163* (2013.01); *G06F 1/1626* (2013.01);
(Continued)

(58) Field of Classification Search
CPC ...... G06F 1/1626; G06F 1/163; G06F 1/1643; G06F 1/1652; G06F 1/1677; G06F 1/1679; G06F 3/04845; G06F 3/04883
(Continued)

(56) References Cited

U.S. PATENT DOCUMENTS 4,834,376 A    5/1989    Steinberg
5,065,376 A    11/1991    Choulat
(Continued)

FOREIGN PATENT DOCUMENTS

CN    1306636 A    8/2001
CN    101180669 A    5/2008
(Continued)

OTHER PUBLICATIONS

"3M Flexible Transparent Touchscreen Concepts" video located on the Internet at <http://www.youtube.com/watch?v=kCZz4jFok_o> (uploaded Jan. 6, 2011).
(Continued)

*Primary Examiner* — Tony O Davis
(74) *Attorney, Agent, or Firm* — Marshall, Gerstein & Borun LLP

(57) ABSTRACT

An article with automatic detection capabilities includes a dynamically flexible display and one or more detection elements. Based on signals generated by the detection elements, the article automatically detects/determines conditions associated with the article, and performs actions based on the conditions. Automatically detectable conditions may include a flex state or degree of flex of the display, an identity of an object supporting the article, a contextual environment and/or contextual location in which the article is situated, an orientation of the article, and/or other conditions. Resulting actions may include adapting an image content presented on the display, launching and/or closing applications, changing an operational mode of the article, and/or other actions that may be performed by optoelectronic elements of the flexible display and/or by other electronic elements of the article. The article may include a fastener that allows the article to be releasably attached to itself and/or to other objects.

21 Claims, 15 Drawing Sheets

Related U.S. Application Data

(60) Provisional application No. 61/991,753, filed on May 12, 2014, provisional application No. 61/938,107, filed on Feb. 10, 2014, provisional application No. 61/920,705, filed on Dec. 24, 2013, provisional application No. 61/876,181, filed on Sep. 10, 2013, provisional application No. 61/870,781, filed on Aug. 27, 2013.

(52) U.S. Cl.
CPC .......... *G06F 1/1643* (2013.01); *G06F 1/1652* (2013.01); *G06F 1/1677* (2013.01); *G06F 1/1679* (2013.01); *G06F 3/04883* (2013.01)

(58) Field of Classification Search
USPC ................................. 345/156, 170–176, 422
See application file for complete search history.

(56) References Cited

U.S. PATENT DOCUMENTS

| | | |
|---|---|---|
| 5,162,696 A | 11/1992 | Goodrich |
| 5,438,488 A | 8/1995 | Dion |
| 5,438,851 A | 8/1995 | Geissbuhler |
| 5,644,858 A | 7/1997 | Bemis |
| 5,707,745 A | 1/1998 | Forrest et al. |
| 5,844,363 A | 12/1998 | Gu et al. |
| 5,889,737 A | 3/1999 | Alameh et al. |
| 5,930,026 A | 7/1999 | Jacobson et al. |
| 5,930,921 A | 8/1999 | Sorofman et al. |
| 5,931,764 A | 8/1999 | Freeman et al. |
| 6,011,309 A | 1/2000 | Ahn |
| 6,097,147 A | 8/2000 | Baldo et al. |
| 6,134,965 A | 10/2000 | Somville |
| 6,196,932 B1 | 3/2001 | Marsh et al. |
| 6,212,133 B1 | 4/2001 | McCoy et al. |
| 6,303,238 B1 | 10/2001 | Thompson et al. |
| 6,369,865 B2 | 4/2002 | Hinata |
| 6,503,188 B1 | 1/2003 | August |
| 6,577,496 B1 | 6/2003 | Gioscia et al. |
| 6,585,914 B2 | 7/2003 | Marks et al. |
| 6,608,323 B2 | 8/2003 | Marks et al. |
| 6,750,607 B2 | 6/2004 | Huitema et al. |
| 6,831,769 B2 | 12/2004 | Holman et al. |
| 6,837,590 B2 | 1/2005 | Marston |
| 6,839,158 B2 | 1/2005 | Albert et al. |
| 6,991,749 B2 | 1/2006 | Marks et al. |
| 7,170,670 B2 | 1/2007 | Webber |
| 7,180,665 B2 | 2/2007 | Daniel et al. |
| 7,209,114 B2 | 4/2007 | Radley-Smith |
| 7,278,093 B2 | 10/2007 | Jablonski et al. |
| 7,374,702 B2 | 5/2008 | Marks et al. |
| 7,384,814 B2 | 6/2008 | Huitema et al. |
| 7,446,945 B2 | 11/2008 | Kuiper et al. |
| 7,453,452 B2 | 11/2008 | Huitema et al. |
| 7,528,176 B2 | 5/2009 | Marks et al. |
| 7,564,436 B2 | 7/2009 | Huitema et al. |
| 7,569,693 B2 | 8/2009 | Marks et al. |
| 7,605,225 B2 | 10/2009 | Marks et al. |
| 7,618,260 B2 | 11/2009 | Daniel et al. |
| 7,667,962 B2 | 2/2010 | Mullen |
| 7,671,202 B2 | 3/2010 | Marks et al. |
| 7,710,370 B2 | 5/2010 | Slikkerveer et al. |
| 7,714,801 B2 | 5/2010 | Kimmel |
| 7,755,605 B2 | 7/2010 | Daniel et al. |
| 7,786,951 B2 | 8/2010 | Huitema et al. |
| 7,787,097 B2 | 8/2010 | Satoh |
| 7,787,917 B2 | 8/2010 | Aoki et al. |
| 7,816,480 B2 | 10/2010 | Marks et al. |
| 7,842,198 B2 | 11/2010 | Marks et al. |
| 7,892,454 B2 | 2/2011 | Facchetti et al. |
| 7,893,265 B2 | 2/2011 | Facchetti et al. |
| 7,902,363 B2 | 3/2011 | Facchetti et al. |
| 7,947,837 B2 | 5/2011 | Marks et al. |
| 7,956,820 B2 | 6/2011 | Huitema et al. |
| 7,965,258 B2 | 6/2011 | Aoki |
| 7,982,039 B2 | 7/2011 | Marks et al. |
| 8,017,458 B2 | 9/2011 | Marks et al. |
| 8,022,214 B2 | 9/2011 | Facchetti et al. |
| 8,077,283 B2 | 12/2011 | Van Veenendaal et al. |
| 8,097,877 B2 | 1/2012 | Marks et al. |
| 8,111,465 B2 | 2/2012 | Heikenfeld et al. |
| 8,117,903 B2 | 2/2012 | Golden et al. |
| 8,125,434 B2 | 2/2012 | Huitema et al. |
| 8,151,501 B2 | 4/2012 | Bemelmans et al. |
| 8,199,471 B2 | 6/2012 | Bemelmans et al. |
| 8,237,909 B2 | 8/2012 | Ostreko et al. |
| 8,279,166 B2 | 10/2012 | Huitema et al. |
| 8,325,143 B2 | 12/2012 | Destura et al. |
| 8,329,855 B2 | 12/2012 | Usta et al. |
| 8,334,545 B2 | 12/2012 | Levermore et al. |
| 8,358,275 B2 | 1/2013 | Huitema |
| 8,380,327 B2 | 2/2013 | Park |
| 8,395,150 B2 | 3/2013 | Marks et al. |
| 8,404,844 B2 | 3/2013 | Kastler et al. |
| 8,414,411 B2 | 4/2013 | Stites et al. |
| 8,440,828 B2 | 5/2013 | Quinn et al. |
| 8,446,549 B2 | 5/2013 | Huitema et al. |
| 8,466,851 B2 | 6/2013 | Huitema et al. |
| D686,217 S | 7/2013 | Andre |
| 8,474,146 B2 | 7/2013 | Hartford et al. |
| 8,477,250 B2 | 7/2013 | Schellingerhout et al. |
| 8,482,909 B2 | 7/2013 | Douglas |
| 8,493,714 B2 | 7/2013 | Visser et al. |
| 8,502,788 B2 | 8/2013 | Cho |
| 8,508,468 B2 | 8/2013 | Huitema |
| 8,508,920 B2 | 8/2013 | Huitema et al. |
| 8,514,213 B2 | 8/2013 | van Veenendaal et al. |
| 8,536,579 B2 | 9/2013 | Sele et al. |
| 8,537,104 B2 | 9/2013 | Markvoort et al. |
| 8,547,293 B2 | 10/2013 | Van Lieshout et al. |
| 8,547,325 B2 | 10/2013 | Huitema |
| 8,618,448 B2 | 12/2013 | Alexander |
| 9,030,419 B1 | 5/2015 | Freed |
| 9,176,530 B2 | 11/2015 | Rothkopf et al. |
| 9,223,494 B1 * | 12/2015 | DeSalvo ............... G06F 3/0488 |
| 9,510,470 B2 | 11/2016 | Huitema et al. |
| 9,560,751 B2 | 1/2017 | Huitema et al. |
| 9,629,120 B2 * | 4/2017 | Ryu ........................ H04L 69/08 |
| 9,642,241 B2 | 5/2017 | Huitema et al. |
| 2001/0004808 A1 | 6/2001 | Hurwitz |
| 2002/0019296 A1 * | 2/2002 | Freeman ................ A63F 13/02 |
| | | 482/4 |
| 2002/0027634 A1 | 3/2002 | Kang et al. |
| 2002/0070926 A1 | 6/2002 | Kavanagh |
| 2003/0197597 A1 | 10/2003 | Bahl et al. |
| 2004/0052044 A1 | 3/2004 | Mochizuki et al. |
| 2004/0189605 A1 | 9/2004 | Shih |
| 2004/0212968 A1 | 10/2004 | Lin |
| 2004/0266496 A1 | 12/2004 | Kauhaniemi et al. |
| 2005/0110785 A1 | 5/2005 | Ochiai et al. |
| 2006/0020469 A1 | 1/2006 | Rast |
| 2006/0055691 A1 | 3/2006 | Bursett |
| 2006/0077127 A1 | 4/2006 | Sampsell et al. |
| 2006/0096392 A1 | 5/2006 | Inkster et al. |
| 2006/0132025 A1 | 6/2006 | Gao et al. |
| 2006/0202618 A1 * | 9/2006 | Ishii ...................... G04B 37/12 |
| | | 313/513 |
| 2006/0204675 A1 | 9/2006 | Gao et al. |
| 2006/0209218 A1 | 9/2006 | Lee et al. |
| 2006/0238494 A1 | 10/2006 | Narayanaswami et al. |
| 2006/0262098 A1 | 11/2006 | Okamoto |
| 2006/0273304 A1 | 12/2006 | Cok |
| 2007/0090420 A1 | 4/2007 | Chu et al. |
| 2007/0117600 A1 | 5/2007 | Robertson et al. |
| 2007/0120813 A1 | 5/2007 | Huitema et al. |
| 2007/0195067 A1 | 8/2007 | Zotov et al. |
| 2007/0205997 A1 | 9/2007 | Lieshout et al. |
| 2007/0228952 A1 | 10/2007 | Kwon et al. |
| 2007/0279852 A1 | 12/2007 | Daniel et al. |
| 2008/0037374 A1 | 2/2008 | Chu et al. |
| 2008/0094314 A1 | 4/2008 | Huitema et al. |
| 2008/0100636 A1 | 5/2008 | Lai et al. |
| 2008/0150928 A1 | 6/2008 | Van Der Hoef et al. |

(56) References Cited

U.S. PATENT DOCUMENTS

| | | |
|---|---|---|
| 2008/0198184 A1 | 8/2008 | Schellingerhout et al. |
| 2008/0204367 A1 | 8/2008 | Lafarre et al. |
| 2008/0212271 A1 | 9/2008 | Misawa |
| 2008/0218369 A1 | 9/2008 | Krans et al. |
| 2008/0223746 A1 | 9/2008 | Van Rens et al. |
| 2008/0278472 A1 | 11/2008 | Huitema et al. |
| 2008/0291225 A1 | 11/2008 | Arneson |
| 2008/0316580 A1 | 12/2008 | Gillies et al. |
| 2009/0067123 A1 | 3/2009 | Huitema et al. |
| 2009/0122007 A1 | 5/2009 | Tsuzaki et al. |
| 2009/0189878 A1 | 7/2009 | Goertz et al. |
| 2009/0197749 A1* | 8/2009 | Merkel ................... A43B 3/00 482/148 |
| 2009/0219225 A1 | 9/2009 | Cope |
| 2009/0251888 A1 | 10/2009 | Douglas |
| 2009/0267969 A1 | 10/2009 | Sakamoto |
| 2009/0290117 A1* | 11/2009 | Watanabe ......... G02F 1/133305 349/153 |
| 2009/0296249 A1 | 12/2009 | van Lieshout et al. |
| 2010/0033435 A1 | 2/2010 | Huitema |
| 2010/0045705 A1 | 2/2010 | Vertegaal et al. |
| 2010/0050133 A1 | 2/2010 | Nishihara et al. |
| 2010/0117975 A1 | 5/2010 | Cho |
| 2010/0127965 A1 | 5/2010 | Park |
| 2010/0156868 A1 | 6/2010 | Hirayama |
| 2010/0164973 A1 | 7/2010 | Huitema et al. |
| 2010/0194785 A1 | 8/2010 | Huitema et al. |
| 2010/0231544 A1 | 9/2010 | Lu et al. |
| 2010/0238098 A1 | 9/2010 | Watanabe |
| 2010/0238612 A1 | 9/2010 | Hsiao et al. |
| 2010/0252112 A1 | 10/2010 | Watson |
| 2010/0259524 A1 | 10/2010 | Markvoort et al. |
| 2010/0283047 A1 | 11/2010 | Facchetti et al. |
| 2010/0295761 A1 | 11/2010 | van Lieshout et al. |
| 2010/0315225 A1 | 12/2010 | Teague |
| 2010/0320448 A1 | 12/2010 | Sele et al. |
| 2010/0326527 A1 | 12/2010 | Facchetti et al. |
| 2011/0003665 A1 | 1/2011 | Burton et al. |
| 2011/0043976 A1 | 2/2011 | Visser et al. |
| 2011/0048619 A1 | 3/2011 | Meinders et al. |
| 2011/0090155 A1 | 4/2011 | Caskey et al. |
| 2011/0109654 A1 | 5/2011 | Van Veenendaal et al. |
| 2011/0120558 A1 | 5/2011 | Facchetti et al. |
| 2011/0122593 A1 | 5/2011 | van Lieshout et al. |
| 2011/0124375 A1 | 5/2011 | Stuivenwold |
| 2011/0128260 A1 | 6/2011 | Huitema et al. |
| 2011/0128266 A1 | 6/2011 | Chiu et al. |
| 2011/0136333 A1 | 6/2011 | Facchetti et al. |
| 2011/0148797 A1 | 6/2011 | Huitema et al. |
| 2011/0157046 A1 | 6/2011 | Lee et al. |
| 2011/0185612 A1 | 8/2011 | Waggoner |
| 2011/0187681 A1 | 8/2011 | Kim et al. |
| 2011/0227855 A1 | 9/2011 | Kim et al. |
| 2011/0256649 A1 | 10/2011 | Huitema et al. |
| 2011/0279418 A1 | 11/2011 | Han et al. |
| 2011/0279442 A1 | 11/2011 | Hage et al. |
| 2011/0310035 A1 | 12/2011 | Kim et al. |
| 2012/0007796 A1 | 1/2012 | Jokinen et al. |
| 2012/0038861 A1 | 2/2012 | van Lieshout et al. |
| 2012/0080462 A1 | 4/2012 | Hajarian |
| 2012/0083705 A1 | 4/2012 | Yuen et al. |
| 2012/0086691 A1 | 4/2012 | van Lieshout et al. |
| 2012/0105333 A1 | 5/2012 | Maschmeyer et al. |
| 2012/0122519 A1 | 5/2012 | Jochheim |
| 2012/0162088 A1 | 6/2012 | van Lieshout et al. |
| 2012/0162876 A1 | 6/2012 | Kim |
| 2012/0182282 A1 | 7/2012 | van Veenendaal et al. |
| 2012/0182755 A1 | 7/2012 | Wildner |
| 2012/0188750 A1 | 7/2012 | Marston |
| 2012/0194448 A1 | 8/2012 | Rothkopf |
| 2012/0194478 A1 | 8/2012 | Liu et al. |
| 2012/0212433 A1 | 8/2012 | Lee et al. |
| 2012/0223314 A1 | 9/2012 | Marks et al. |
| 2012/0242599 A1 | 9/2012 | Seo et al. |
| 2012/0264489 A1 | 10/2012 | Choi et al. |
| 2012/0283799 A1 | 11/2012 | Fan |
| 2012/0314546 A1 | 12/2012 | Brewer et al. |
| 2012/0327048 A1 | 12/2012 | Ramrattan et al. |
| 2013/0005404 A1 | 1/2013 | Bremer |
| 2013/0010405 A1 | 1/2013 | Rothkopf et al. |
| 2013/0025647 A1 | 1/2013 | Bouten et al. |
| 2013/0027853 A1 | 1/2013 | Chen et al. |
| 2013/0038622 A1 | 2/2013 | Yang |
| 2013/0044215 A1 | 2/2013 | Rothkopf et al. |
| 2013/0054997 A1 | 2/2013 | Wyatt et al. |
| 2013/0058063 A1 | 3/2013 | O'Brien |
| 2013/0062598 A1 | 3/2013 | Usta et al. |
| 2013/0070431 A1 | 3/2013 | Fukuma et al. |
| 2013/0076612 A1 | 3/2013 | Myers |
| 2013/0076649 A1 | 3/2013 | Myers et al. |
| 2013/0083496 A1 | 4/2013 | Franklin et al. |
| 2013/0106603 A1 | 5/2013 | Weast et al. |
| 2013/0113761 A1 | 5/2013 | van Lieshout et al. |
| 2013/0120106 A1 | 5/2013 | Cauwels et al. |
| 2013/0127690 A1 | 5/2013 | Tsai |
| 2013/0127748 A1 | 5/2013 | Vertegaal et al. |
| 2013/0127765 A1 | 5/2013 | Behdasht et al. |
| 2013/0128439 A1 | 5/2013 | Walters et al. |
| 2013/0131887 A1 | 5/2013 | Park |
| 2013/0141405 A1 | 6/2013 | Huitema et al. |
| 2013/0145522 A1 | 6/2013 | da Silva |
| 2013/0145795 A1 | 6/2013 | Asami |
| 2013/0154826 A1 | 6/2013 | Ratajczyk |
| 2013/0172068 A1 | 7/2013 | Zhou et al. |
| 2013/0182382 A1 | 7/2013 | Vardi et al. |
| 2013/0191741 A1 | 7/2013 | Dickinson et al. |
| 2013/0197680 A1 | 8/2013 | Cobbett et al. |
| 2013/0219332 A1 | 8/2013 | Woley et al. |
| 2013/0222208 A1 | 8/2013 | Gorilovsky et al. |
| 2013/0222270 A1 | 8/2013 | Winkler et al. |
| 2013/0222271 A1 | 8/2013 | Alberth et al. |
| 2013/0229373 A1 | 9/2013 | Eriksson et al. |
| 2013/0235008 A1 | 9/2013 | Kwon |
| 2013/0265257 A1 | 10/2013 | Jung et al. |
| 2013/0286466 A1 | 10/2013 | Lieshout et al. |
| 2013/0300779 A1 | 11/2013 | Van Baarsen et al. |
| 2013/0326790 A1 | 12/2013 | Cauwels et al. |
| 2013/0335929 A1 | 12/2013 | Cavallaro |
| 2014/0042406 A1 | 2/2014 | Degner et al. |
| 2014/0049487 A1* | 2/2014 | Konertz ................. G06F 3/041 345/173 |
| 2014/0062892 A1 | 3/2014 | Dickinson et al. |
| 2014/0123015 A1 | 5/2014 | Sako et al. |
| 2014/0123436 A1 | 5/2014 | Griffin et al. |
| 2014/0138637 A1 | 5/2014 | Yang et al. |
| 2014/0226275 A1 | 8/2014 | Ko et al. |
| 2014/0257050 A1 | 9/2014 | Kuroda et al. |
| 2015/0020081 A1 | 1/2015 | Cho et al. |
| 2015/0084892 A1 | 3/2015 | Shirota et al. |
| 2015/0089974 A1 | 4/2015 | Seo et al. |
| 2015/0124566 A1 | 5/2015 | Lake et al. |
| 2015/0162751 A1* | 6/2015 | Leabman .................. A41B 1/08 219/211 |
| 2015/0169011 A1* | 6/2015 | Bibl ...................... G06F 3/0412 345/175 |
| 2015/0185766 A1* | 7/2015 | Otsuka ............... A61B 5/02422 361/679.03 |
| 2015/0185944 A1* | 7/2015 | Magi .................... G06F 1/1652 345/174 |
| 2015/0227245 A1* | 8/2015 | Inagaki ................ G06F 3/0412 345/173 |
| 2015/0333572 A1* | 11/2015 | Leabman ................ H01F 38/14 320/108 |
| 2015/0378391 A1 | 12/2015 | Huitema et al. |
| 2015/0381793 A1* | 12/2015 | Cerda ................ H04M 1/72541 455/556.1 |
| 2016/0014919 A1 | 1/2016 | Huitema et al. |
| 2016/0019703 A1* | 1/2016 | Tian ........................ G09G 3/20 345/442 |
| 2016/0034742 A1 | 2/2016 | Kim et al. |
| 2016/0037625 A1 | 2/2016 | Huitema et al. |
| 2016/0041581 A1* | 2/2016 | Piccionelli .............. G06F 1/163 345/156 |

(56) References Cited

U.S. PATENT DOCUMENTS

| | | | |
|---|---|---|---|
| 2016/0041680 A1 | 2/2016 | Chi et al. | |
| 2016/0062410 A1 | 3/2016 | Ko et al. | |
| 2016/0142863 A1* | 5/2016 | Lam | H04W 4/008 455/41.2 |
| 2016/0212837 A1 | 7/2016 | Kim | |
| 2016/0277891 A1* | 9/2016 | Dvortsov | H04W 4/008 |
| 2016/0283086 A1* | 9/2016 | Inagaki | G06F 1/1626 |
| 2016/0299570 A1* | 10/2016 | Davydov | G06F 1/163 |
| 2016/0322745 A1 | 11/2016 | Shedletsky et al. | |
| 2016/0360618 A1* | 12/2016 | Elsherbini | H05K 1/115 |
| 2016/0379205 A1* | 12/2016 | Margadoudakis | G06Q 20/327 705/71 |
| 2017/0046931 A1* | 2/2017 | Hartweg | A47F 7/022 |
| 2017/0052749 A1* | 2/2017 | Lee | A41D 1/00 |
| 2017/0235341 A1* | 8/2017 | Huitema | G06F 1/1652 361/679.03 |
| 2017/0236497 A1 | 8/2017 | Huitema et al. | |

FOREIGN PATENT DOCUMENTS

| | | |
|---|---|---|
| CN | 101180864 A | 5/2008 |
| DE | 202006012076 U1 | 10/2006 |
| EP | 1599110 A1 | 11/2005 |
| EP | 2551110 A1 | 1/2013 |
| FR | 2284149 A1 | 4/1976 |
| JP | 2013044293 A | 3/2013 |
| JP | 2013044294 A | 3/2013 |
| JP | 2013068292 A | 4/2013 |
| KR | 2011-0008118 U | 8/2011 |
| KR | 1256109 | 4/2013 |
| KR | 1278604 | 6/2013 |
| KR | 1301561 | 9/2013 |
| KR | 20150035232 A | 4/2015 |
| TW | M258364 U | 3/2005 |
| TW | M265636 Y | 5/2005 |
| TW | 200815886 A | 4/2008 |
| TW | 201035934 A | 10/2010 |
| TW | 1383343 B | 1/2013 |
| TW | 201301002 A | 1/2013 |
| WO | WO-00/25193 A2 | 5/2000 |
| WO | WO-01/64070 A1 | 9/2001 |
| WO | WO-2004/047059 A1 | 6/2004 |
| WO | WO-2006/027727 A1 | 3/2006 |
| WO | WO-2006/085271 A2 | 8/2006 |
| WO | WO-2007/023406 A2 | 3/2007 |
| WO | WO-2007/042987 A1 | 4/2007 |
| WO | WO-2008/054206 A2 | 5/2008 |
| WO | WO-2012/156804 A1 | 11/2012 |
| WO | WO-2013/138003 A1 | 9/2013 |
| WO | WO-2015/023804 A1 | 2/2015 |

OTHER PUBLICATIONS

"Amazin Concept Holo Computer Elodie Delassus", Art, Concepts, Design, Gadgets, downloaded from the Internet at: <http://designskings.com/amazin-concept-holo-computer-elodie-delassus/> (Jan. 18, 2012).

"Athletics and their supporters", Enlightened®: Illuminated Clothing by Janet Hansen, downloaded from the Internet at <http://enlighted.com/pages/athletics.shtml> (Aug. 8, 2013).

"E-Clock", TOKYOFLASH JAPN Product Design Studio, downloaded from the Internet at <http://blog.tokyoflash.com/2010/03/e-clock/> (Mar. 10, 2010).

"Features", SEG Sports Entertainment Gear, downloaded from the Internet at <http://www.segshirts.com/features> (Aug. 8, 2013).

"Flex Mobile, a Flexible Phone That Becomes a Bracelet, Some Other Wearable Piece of Gear", Concept Phones, downloaded from the Internet at <http://www.concept-phones.com/tag/carolina-rebelo/> (Apr. 19, 2011).

"Flexible Smart Phone Fluid Presented by Philips", YouTube, downloaded from the Internet at <http://www.youtube.com/watch?v=Wq9montNgbM&feature=player_detailpage> (Apr. 2, 2012).

"iPING Putter App Cradle Attachment Case for iPhone 5", Carlsbad Golf Center, downloaded from the Internet at <https://www.cgcgolfshop.com/p-50-iping-putter-app-cradle-attachment-case-for-iphone-5.aspx> (Aug. 8, 2013).

"Moment Smartwatch: World's First Wrap Around Smart Watch," Momentum Labs LLC, 28 pp. (Jun. 24, 2014).

"outEDGE iPhone 5 External 2800 mAH Battery Extender Case w/ Flip Screen Cover", outEDGEPOWER Products, downloaded from the Internet at <http://www.outedgepower.com/outedge-iphone-5-external-2800-mah-battery-extender-case-w-flip-screen-cover/> (Aug. 8, 2013).

"Philips unveils world's first 'Rollable Display' pocket e-Reader concept READIUS", PHYS.org website(Sep. 1, 2005).

"Rohm shows a flexible-OLED wristband", OLED-Info.com, downloaded from the Internet at <http://www.oled-info.com/rohm-shows-flexible-oled-wristband> (Oct. 5, 2009).

"Samsung concept video for wearables and phones", YouTube screenshot, downloaded from the Internet at <http://www.youtube.com/watch?v=ezriwGwJGOs> (Jul. 15, 2013).

"Samsung Galaxy X Concept Packs the Same Specs of teh Galaxy S II Plus a 12 MP Camera", Concept Phones website (May 15, 2011).

"Samsung Smart Watch Trademarks Filed, Wearable Internet Nearing Debut", Fox News Latino, downloaded from the Internet at <http://latino.foxnews.com/latino/money/2013/08/07/samsung-smart-watch-trademarks-filed-wearable-internet-nearing-debut/> (Aug. 7, 2013).

"Sony Smartwatch 2 goes official: water-resistant, open API", phoneArena.com, downloaded from the Internet at <http://www.phonearena.com/news/Sony-Smartwatch-2-goes-official-water-resistant-open-API_id44469> (Jun. 25, 2013).

"Taiwan Company to Begin Production of Large Format Flexible Electronic Paper Display Technology", Over the Wire, downloaded from the Internet at <http://www.naylornetwork.com/ppi-otw/articles/?aid=219054&issueID=29119> (Aug. 8, 2013).

"Thermal Image Athletic Apparel", TRENDHUNTER Lifestyle, downloaded from the Internet at <http://www.trendhunter.com/trends/high-tech-athletic-apparel> (Mar. 16, 2013).

"Wearable Concept Phone is Not Nokia 888", Concept Phones, downloaded from the Internet at <http://www.concept-phones.com/tag/hyun-sung-lee/> (Jul. 18, 2008).

"What Will You Pop?", popSLATE, downloaded from the Internet at <http://www.popslate.com> (2012).

"Yuno Concept", TechPin, downloaded from the Internet at <http://www.techpin.com/yuno-concept/> (May 8, 2008).

Catacchio, "New OLED panel to bring bendable cell phones closer to reality?", TNW, downloaded from the Internet at <http://thenextweb.com/asia/2010/10/04/new-oled-panel-to-bring-bendable-cell-phones-closer-to-reality/> (Oct. 4, 2010).

Cochrane et al., "Flexible displays for smart clothing: Part I—Overview", Indian Journal of Fibre & Textile Research, 36:422-8 (Dec. 2011).

Cooper, "Hands-on with Polymer Vision's e-ink Readius", engadget, downloaded from the Internet at <http://www.engadget.com/2008/02/14/hands-on-with-polymer-visions-e-ink-readius/> (Feb. 14, 2008).

Crisp, "Rafael Nadal demonstrates Babolat Play & Connect interactive tennis racquet", gizmag, downloaded from the Internet at <http://www.gizmag.com/rafael-nadal-demonstrates-babolat-play--connect-interactive-tennis-racquet/22699/> (May 26, 2012).

Eaton, "Nokia Morph Cellphone Rolls Up, Stretches, Cleans Itself", GIZMODO, downloaded from the Internet at <http://gizmodo.com/360260/nokia-morph-cellphone-rolls-up-stretches-cleans-itself> (Feb. 25, 2008).

Extended European Search Report for Application No. 14874426.1, dated Aug. 11, 2017.

Extended European Search Report for Application No. 14875486.4, dated Sep. 19, 2017.

Fingas, "Tentative Samsung smartwatch design unearthed in Korean patents", engadget, downloaded from the Internet at <http://www.engadget.com/2013/08/03/tentative-samsung-smartwatch-designs-unearthed-in-korean-patents/> (Aug. 3, 2013).

First Chinese Office Action for Application No. 201480058291.8, dated Jul. 31, 2017.

(56) References Cited

OTHER PUBLICATIONS

Honig, "Pebble smartwatch review", engadget, downloaded from the Internet at <http://www.engadget.com/2013/01/25/pebble-smartwatch-review/> (Jan. 25, 2013).
Inofuentes, "Officially announced: LG G Flex and a healing factor", ars technica, downloaded from the Internet at <http://arstechnica.com/gadgets/2013/10/officially-announced-lg-g-flex-and-a-healing-factor/> (Oct. 28, 2013).
International Preliminary Report on Patentability for Application No. PCT/US2016/019729, dated Sep. 8, 2017.
International Preliminary Report on Patentability, International Application No. PCT/US14/50972, dated Jan. 19, 2016.
International Preliminary Report on Patentability, International Application No. PCT/US14/52814, dated Mar. 1, 2016.
International Preliminary Report on Patentability, International Application No. PCT/US14/52957, dated Mar. 1, 2016.
International Preliminary Report on Patentability, International Application No. PCT/US14/55043, dated Mar. 15, 2016.
International Search Report and Written Opinion for Application No. PCT/US2016/019729, dated May 17, 2016.
International Search Report and Written Opinion, International Application No. PCT/US14/50972, dated Jan. 14, 2015.
International Search Report and Written Opinion, International Application No. PCT/US14/52814, dated Dec. 11, 2014.
International Search Report and Written Opinion, International Application No. PCT/US14/52957, dated Dec. 9, 2014.
International Search Report and Written Opinion, International Application No. PCT/US14/71859, dated Mar. 20, 2015.
International Search Report and Written Opinion, International Application No. PCT/US14/72172, dated Mar. 18, 2015.
International Search Report and Written Opinion, International Application No. PCT/US2014/055043, dated Jan. 27, 2015.
International Search Report and Written Opinion, International Application No. PCT/US2014/072313, dated Apr. 22, 2015.
International Search Report and Written Opinion, International Application No. PCT/US2014/072328, dated Apr. 22, 2015.
International Search Report and Written Opinion, International Application No. PCT/US2015/014964, dated May 14, 2015.
International Search Report and Written Opinion, International Application No. PCT/US2015/022691, dated Jul. 8, 2015.
International Search Report and Written Opinion, International Application No. PCT/US2015/026163, dated Jul. 20, 2015.
International Search Report and Written Opinion, International Application No. PCT/US2015/030254, dated Aug. 10, 2015.
International Search Report and Written Opinion, International Application No. PCT/US2015/030724, dated Aug. 14, 2015.
International Search Report and Written Opinion, International Application No. PCT/US2015/032799, dated Aug. 31, 2015.
Johan, "ASUS Waveface Ultra", techfresh.net, downloaded from the Internet at <http://www.techfresh.net/asus-waveface-ultra/> (Jan. 19, 2010).
Kahn, "Is Apple's iWatch a slap wrist band with a flexible display'?", 9to5Mac Apple Intelligence, downloaded from the Internet at <http://9to5mac.com/2013/02/21/is-apples-iwatch-a-slap-wrist-band-with-a-flexible-display/> (Feb. 21, 2013).
Kaki, "10 Beautiful Nokia Concept Phones for Future Generations", DreamsRain website, downloaded from the Internet at <http://www.dreamsrain.com/2011/09/18/10-beautiful-nokia-concept-phones-for-future-genrations/> (Sep. 18, 2011).
Kelvin, "Apple iBand Envisioned by T3: Health Features, Fitness and Watch Functions (Video)", Concept Phones, downloaded from the Internet at <http://www.concept-phones.com/apple/apple-iband-envisioned-t3-health-features-fitness-watch-functions-video/> (Feb. 18, 2014).
Kelvin, "Apple iWatch 2 Concept by Jermaine Smit Lets You Change the Watch Bracelet Easily (Video)", Concept Phones, downloaded from the Internet at <http://www.concept-phones.com/apple/apple-iwatch-2-concept-jermaine-smit-lets-change-watch-bracelet-easily-video/> (Mar. 5, 2014).

Kelvin, "Apple iWatch Concept Goes Back to Basics, Looks Like Nike Fuelband", Concept Phones, downloaded from the Internet at <http://www.concept-phones.com/apple/apple-iwatch-concept-basics-nike-fuelband/> (Oct. 22, 2013).
Kelvin, "Apple iWatch Glass Hologram is an Overpowered Smartwatch (Video)", Concept Phones, downloaded from the Internet at <http://www.concept-phones.com/apple/apple-iwatch-glass-hologram-overpowered-smartwatch-video/> (Apr. 19, 2014).
Kelvin, "Apple iWatch Goes Back to the Idea of an iPod Nano With a Belt", Concept Phones, downloaded from the Internet at <http://www.concept-phones.com/apple/apple-iwatch-idea-ipod-nano-belt/> (Mar. 2, 2014).
Kelvin, "Finally, a HTC Smartwatch! We Needed Those!", Concept Phones, downloaded from the Internet at <http://www.concept-phones.com/htc/finally-htc-smartwatch-needed/> (Feb. 4, 2014).
Kelvin, "Flexible Screen X Phone Becomes a Bracelet", Concept Phones, downloaded from the Internet at <http://www.concept-phones.com/cool-concepts/flexible-screen-phone-bracelet/> (Oct. 28, 2013).
Kelvin, "HTC One Watch Render Seems Taken out of Tron", Concept Phones, downloaded from the Internet at <http://www.concept-phones.com/htc/htc-watch-render-tron/> (Oct. 14, 2013).
Kelvin, "iPhone 6 and iWatch Pro Get Designed by Dani Yako", Concept Phones, downloaded from the Internet at <http://www.concept-phones.com/apple/iphone-6-iwatch-pro-designed-dani-yako/> (Jun. 6, 2014).
Kelvin, "iWatch Concept is a Curved Bracelet, Runs Flappy Bird", Concept Phones, downloaded from the Internet at <http://www.concept-phones.com/apple/iwatch-concept-curved-bracelet-runs-flappy-bird/> ( Feb. 13, 2014).
Kelvin, "iWatch Goliath is a Giant on Your Wrist (Video)", Concept Phones, downloaded from the Internet at <http://www.concept-phones.com/apple/iwatch-goliath-giant-wrist-video/> (May 23, 2014).
Kelvin, "iWatch Render Goes the Way of the Nike FuelBand", Concept Phones, downloaded from the Internet at <http://www.concept-phones.com/apple/iwatch-render-nike-fuelband/> (Jan. 21, 2014).
Kelvin, "Meizu MWatch Render is Exactly What Smartwatches Need", Concept Phones, downloaded from the Internet at <http://www.concept-phones.com/cool-concepts/meizu-mwatch-render-smartwatches/> (Feb. 12, 2014).
Kelvin, "MWC 2014: Kyocera Showcases Flexible Phone That Turns Into Bracelet", Concept Phones, downloaded from the Internet at <http://www.concept-phones.com/kyocera/mwc-2014-kyocera-showcases-flexible-phone-turns-bracelet/> (Feb. 27, 2014).
Kelvin, "New Apple iWatch Render Shows us an Ultrathin Bracelet", Concept Phones, downloaded from the Internet at <http://www.concept-phones.com/apple/apple-iwatch-render-shows-ultrathin-bracelet/> (Oct. 16, 2013).
Kelvin, "New iWatch Design Brings Us Back the Basics of a Watch", Concept Phones, downloaded from the Internet at <http://www.concept-phones.com/apple/iwatch-design-brings-basics-watch/> (Apr. 29, 2014).
Kelvin, "Nokia Lumia 101 Smartwatch is a Nice Little, Elegant Bracelet", Concept Phones, downloaded from the Internet at <http://www.concept-phones.com/nokia/nokia-lumia-101-smartwatch-nice-elegant-bracelet/> (Dec. 3, 2013).
Kelvin, "Superb Google Smartwatch Render Created in Cinema 4D", Concept Phones, downloaded from the Internet at <http://www.concept-phones.com/google/superb-google-smartwatch-render-created-cinema-4d/> (Jan. 31, 2014).
Kim,"Analysis of iWatch-related Patents from RitFast", IHS Technology, downloaded from the Internet at <http://www.displaybank.com/letter/letter_contents.php?nm=&email=prakash%40polyera.com&mail_id=8995> (Jul. 19, 2013).
Lilienthal, "Book? Accordian? Nope. Lumino is a Gorgeous LED Lamp the Goes Wherever You Do," Digital Trends, 6 pp. (Apr. 27, 2014).
Non-Final Office Action from U.S. Appl. No. 14/188,440 dated Aug. 14, 2015.
Office Action for U.S. Appl. No. 15/054,725, dated Aug. 23, 2017.

(56) References Cited

OTHER PUBLICATIONS

Rastogi, "Nokia Lumia 1080: The Concept Phone", 91 mobiles, downloaded from the Internet at <http://www.91mobiles.com/blog/nokia-lumia-1080-the-concept-phone.html> (Jun. 27, 2013).
Ridden, "Emopulse Smile SmartWatch goes up for pre-order", Gizmag, downloaded from the Internet at <http://www.gizmag.com/emopulse-smile-smartwatch/27984/> (Jun. 19, 2013).
Seth, "In 2020 We Can Wear Sony Computers on Our Wrist", Yanko Design Form Beyond Function, downloaded from the Internet at <http://www.yankodesign.com/2010/05/25/in-2020-we-can-wear-sony-computers-on-our-wrist/> (May 25, 2010).
Seth, "Love This iWatch!", Yanko Design Form Beyond Function, downloaded from the Internet at <http://www.yankodesign.com/2013/07/26/love-this-iwatch/> (Jul. 26, 2013).
Seth, "My Latest Fashion Accessory", Yanko Design Form Beyond Function, downloaded from the Internet at <http://www.yankodesign.com/2009/08/11/my-latest-fashion-accessory/> (Aug. 11, 2009).
Seth, "Super Sexy Roll", Yanko Design Form Beyond Function, downloaded from the Internet at <http://www.yankodesign.com/2011/03/21/super-sexy-roll/> (Mar. 21, 2011).
Smith, "Flexi E Ink screen finds home in curved world time watch", The Register, downloaded from the Internet at <http://www.theregister.co.uk/2010/10/11/phosphor_watches_world_time/> (Oct. 11, 2010).
Smith, "Samsung smartwatch concept shown in patent hints at flexible display use", Android Authority (Aug. 3, 2013).
Smith, "Samsung's curved smartphone is the Galaxy Round, launches in Korea tomorrow (video)", engadget, downloaded from the Internet at <http://www.engadget.com/2013/10/08/samsung-galaxy-round/> (Oct. 8, 2013).
Thrystan, "Apple iWatch 2 Design Appears, More Elegant Than Ever", Concept Phones, downloaded from the Internet at <http://www.concept-phones.com/apple/apple-iwatch-2-design-appears-elegant/> (Feb. 9, 2012).
Thrystan, "BenQ Siemens Snake Concept Phone is Yet Another Bracelet-Handset", Concept Phones, downloaded from the Internet at <http://www.concept-phones.com/benq-siemens/benq-siemens-snake-concept-phone-bracelethandset/> (Feb. 9, 2009).
Thrystan, "Bracelet Phone Concept Incorporates an MP3 Player, Shines Like a Diamond", Concept Phones, downloaded from the Internet at <http://www.concept-phones.com/fashion-phones/bracelet-phone-concept-incorporates-mp3-player-shines-diamond/> (Sep. 8, 2008).
Thrystan, "CEATEC 2010 Hosts TDK's Flexible OLED Displays; Hands-on Photos Here!", Concept Phones, downloaded from the Internet at <http://www.concept-phones.com/news/ceatec-2010-hosts-tdks-flexible-oled-displays-handson-photos/> (Oct. 5, 2010).
Thrystan, "Dyson Concept Phone Charger Turns Temperature Differences Into Electricity", Concept Phones, downloaded from the Internet at <http://www.concept-phones.com/cool-concepts/dyson-concept-phone-charger-turns-temperature-differences-electricity/> (Jul. 24, 2009).
Thrystan, "Email Beeper Watch is Hip, Restarts a Trend", Concept Phones, downloaded from the Internet <http://www.concept-phones.com/cool-concepts/email-beeper-watch-hip-restarts-trend/> (Mar. 3, 2009).
Thrystan, "Flux, Portable and Wearable PC Concept", Concept Phones, downloaded from the Internet at <http://www.concept-phones.com/eco-friendly/flux-portable-and-wearable-pc-concept/> (May 5, 2008).
Thrystan, "Fujitsu Concept Phones Part 2: Judge-Dredd-Like Curvy Handset", Concept Phones, downloaded from the Internet <http://www.concept-phones.com/fujitsu/fujitsu-concept-phones-part-2-judgedreddlike-curvy-handset/> (Oct. 10, 2009).
Thrystan, "'Phone 5 Bracelet Looks Out of this World", Concept Phones, downloaded from the Internet at <http://www.concept-phones.com/apple/iphone-5-bracelet-world/> (Jul. 6, 2012).
Thrystan, "iPhone Holographic Display Concept is Surreal, Could Work", Concept Phones, downloaded from the Internet at <http://www.concept-phones.com/apple/iphone-holographic-display-concept-surreal-work/> (Aug. 22, 2009).
Thrystan, "iWatch Design Created by James Ivaldi is All Metal", Concept Phones, downloaded from the Internet at <http://www.concept-phones.com/apple/iwatch-design-created-james-ivaldi-metal/> (Jul. 29, 2013).
Thrystan, "iWatch Render in the Vision of the Ciccarese Design Team: Simply Stunning (Video)", Concept Phones, downloaded from the Internet at <http://www.concept-phones.com/apple/iwatch-render-vision-ciccarese-design-team-simply-stunning-video/> (Aug. 21, 2013).
Thrystan, "Leaf Phone Features an Organic Structure, is Made of Eco-Friendly Plastic," Concept Phones, downloaded from the Internet at <http://www.concept-phones.com/eco-friendly/leaf-phone-features-organic-structure-ecofriendly-plastic/> (Nov. 4, 2009).
Thrystan, "LG Auki Bracelet Phone Is Colorful and Elegant", Concept Phones, downloaded from the Internet at <http://www.concept-phones.com/lg/lg-auki-bracelet-phone-colorful-elegant/> (Aug. 26, 2011).
Thrystan, "LG Helix Cellphone is Also a Slap Bracelet", Concept Phones, downloaded from the Internet at <http://www.concept-phones.com/lg/lg-helix-cellphone-slap-bracelet/> (Oct. 9, 2009).
Thrystan, "LG Oyster, a Bracelet-Like Mobile Phone Design", Concept Phones, downloaded from the Internet at <http://www.concept-phones.com/lg/lg-oyster-braceletlike-mobile-phone-design/> (Jul. 26, 2009).
Thrystan, "New iWatch Render by Tolga Tuncer is Fancy and Classy", Concept Phones, downloaded from the Internet at <http://www.concept-phones.com/apple/iwatch-render-tolga-tuncer-fancy-classy/> (Mar. 3, 2013).
Thrystan, "Nokia Mixed Reality Concept, Future Technology Demoed at Nokia World (Video)", Concept Phones, downloaded from the Internet at <http://www.concept-phones.com/nokia/nokia-mixed-reality-concept-future-technology-demoed-nokia-world-video/> (Sep. 9, 2009).
Thrystan, "Nokia Open Bracelet Shows Incoming Calls of the Ones You Love", Concept Phones, downloaded from the Internet at <http://www.concept-phones.com/nokia/nokia-open-bracelet-shows-incoming-calls-love/> (Dec. 13, 2008).
Thrystan, "Nokia Smart Watch Concept Looks Interesting", Concept Phones, downloaded from the Internet at <http://www.concept-phones.com/uncategorized/nokia-smart-watch-concept-interesting/> (Oct. 22, 2011).
Thrystan, "Purse Bracelet Fancy Concept Phone, Designed by Yw Li", Concept Phones, downloaded from the Internet at <http://www.concept-phones.com/fashion-phones/purse-bracelet-fancy-concept-phone-designed-yw-li/> (Oct. 19, 2008).
Thrystan, "Quartz Tele Concept Should be in a Final Fantasy Game, Because It's All About Crystals", Concept Phones, downloaded from the Internet at <http://www.concept-phones.com/fashion-phones/quartz-tele-concept-final-fantasy-game-crystals/> (Sep. 8, 2008).
Thrystan, "Samsung Finger Touching Cellphone Concept Comes in Handy", Concept Phones, downloaded from the Internet at <http://www.concept-phones.com/samsung/samsung-finger-touching-cellphone-concept-handy/> (Jan. 31, 2009).
Thrystan, "Samsung Futuristic Technology Relies on Health and Flexibility (Video)", Concept Phones, downloaded from the Internet at <http://www.concept-phones.com/samsung/samsung-futuristic-technology-relies-health-flexibility-video/> (Jul. 10, 2013).
Thrystan, "Samsung S-Health Bracelet Render is Based on Tizen OS", Concept Phones, downloaded from the Internet at <http://www.concept-phones.com/samsung/samsung-shealth-bracelet-render-based-tizen-os/> (Jun. 17, 2013).
Thrystan, "Sony Ericsson Bracelet Phone, a Design That Won't Make It Into Production", Concept Phones, downloaded from the Internet at <http://www.concept-phones.com/sony-ericsson/sony-ericsson-bracelet-phone-design-production/> (Jun. 19, 2009).
Thrystan, "Sony Ericsson Ring Phone Concept by Tao Ma Will Always Be a Winner", Concept Phones, downloaded from the Internet at <http://www.concept-phones.com/sony-ericsson/sony-ericsson-ring-phone-concept-tao-ma-winner/> (Sep. 15 2008).
Thrystan, "Speak to Me Concept Watch Phone is Hot, a Must-Have Fashion Accessory", Concept Phones, downloaded from the Internet at <http://www.concept-phones.com/fashion-phones/speak-concept-watch-phone-hot-musthave-fashion-accessory/> (Jan. 27, 2009).

(56) References Cited

OTHER PUBLICATIONS

Thrystan, "The Hook Bracelet Phone Concept Runs Windows Phone in a New Format", Concept Phones, downloaded from the Internet at <http://www.concept-phones.com/cool-concepts/hook-bracelet-phone-concept-runs-windows-phone-format/> (Jun. 21, 2013).
Thrystan, "The New iPod is iBangle . . . iLike iT", Concept Phones, downloaded from the Internet at <http://www.concept-phones.com/apple/ipod-ibangle-ilike/> (Oct. 23, 2008).
Thrystan, "Xbox 720 Concept is a Pyramid With Two Kinect "Eyes"", Concept Phones, downloaded from the Internet at <http://www.concept-phones.com/microsoft/xbox-720-concept-pyramid-kinect-eyes/> (Jul. 8, 2013).
Thrystan, "Yuxa is a Wearable Cellphone Made From Eco-Friendly Materials", Concept Phones, downloaded from the Internet at <http://www.concept-phones.com/eco-friendly/yuxa-wearable-cellphone-ecofriendly-materials/> (Jun. 24, 2010).
Thrystan, "ZTE Cube Phone, Another Mobile World Congress Concept", Concept Phones, downloaded from the Internet at <http://www.concept-phones.com/cool-concepts/zte-cube-phone-another-mobile-world-congress-concept/> (Feb. 14, 2008).
Vertegaal et al., "Organic User Interfaces have non-planar displays that may actively or passively change shape via analog physical inputs", Organic User Interfaces—Communications of the ACM (May 31, 2008).
Wei et al., Shape memory materials and hybrid composites for smart systems, Part II: Shape-memory hybrid composites, J. Mater. Sci., 33:3763-83 (1998).
Extended European Search Report for Application No. 14875752.9, dated Aug. 1, 2017.
Office Action for Taiwanese Application No. 103129521, dated Apr. 9, 2018.
European Office Action for Application No. 14875752.9, dated Sep. 19, 2018.
Office Action for Taiwanese Application No. 103145253, dated Aug. 2, 2018.
First Office Action received in corresponding Chinese Application No. 2014/80076264.3 dated May 28, 2018.
First Office Action received in corresponding Chinese Application No. 2014/180076308.2 dated Jun. 29, 2018.
First Office Action received in corresponding Chinese Application No. 2014/80076314.8 dated Jun. 28, 2018.
Office Action for Taiwanese Application No. 103145225, dated Jan. 7, 2019.
Third Chinese Office Action for Application No. 201480058291.8, dated Jan. 14, 2019.

* cited by examiner

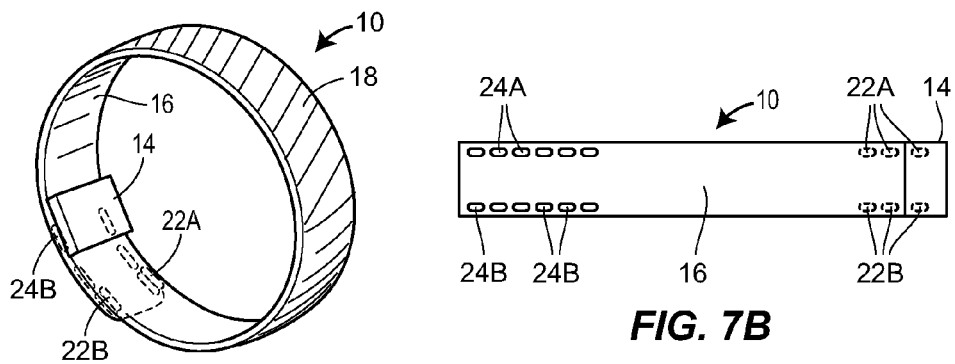
FIG. 7A
FIG. 7B
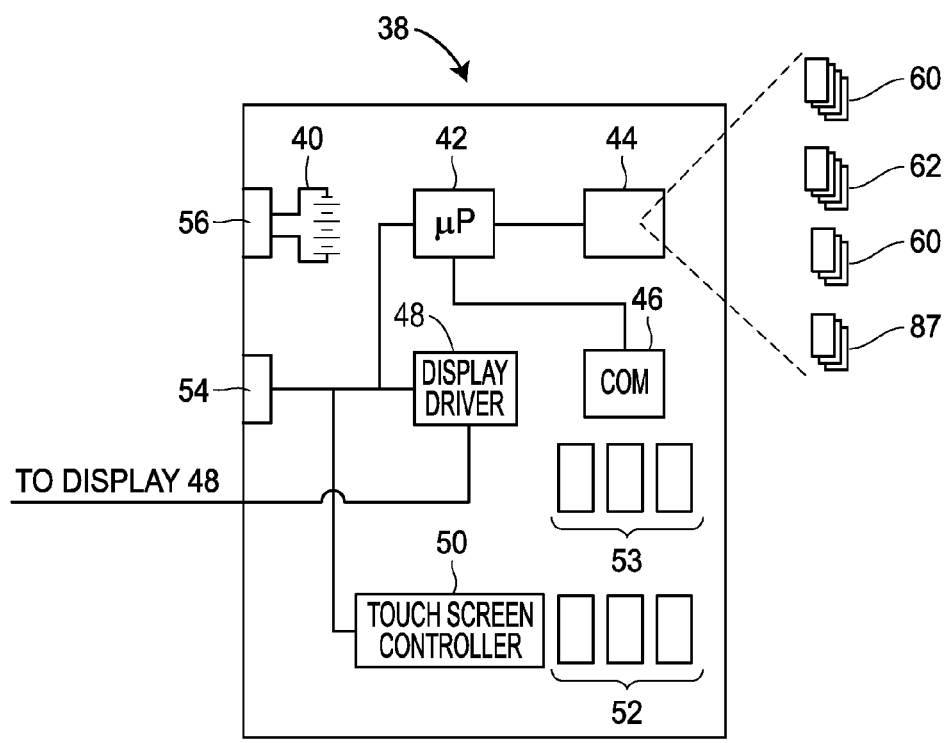
FIG. 8

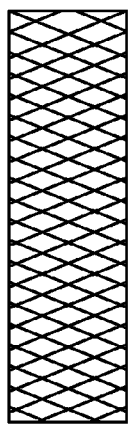 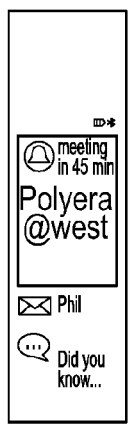  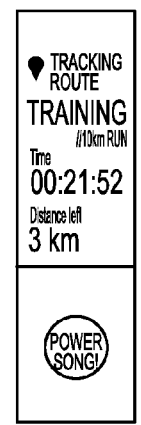 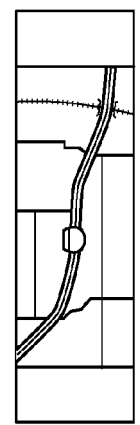
*FIG. 9A*    *FIG. 9B*    *FIG. 9C*    *FIG. 9D*    *FIG. 9E*
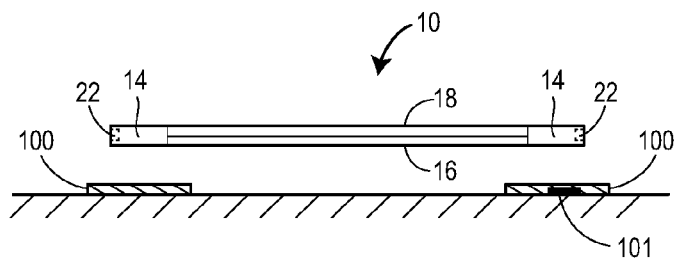
*FIG. 10*
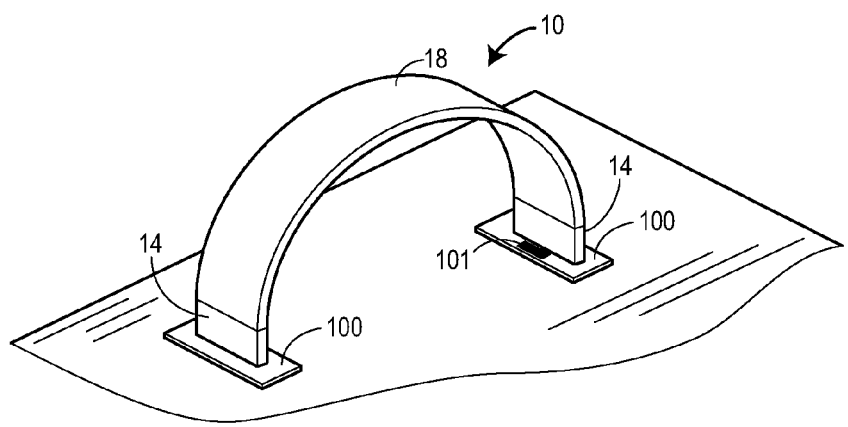
*FIG. 11*

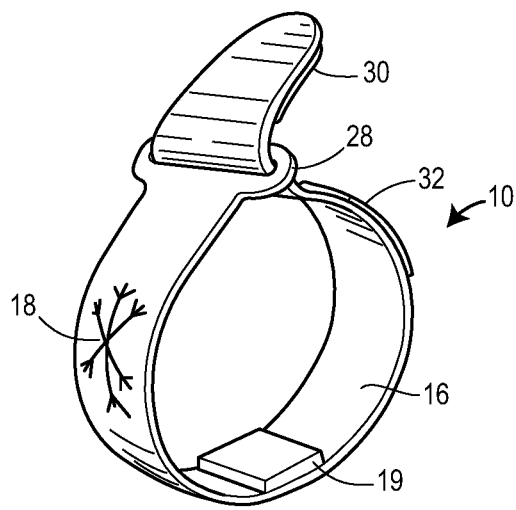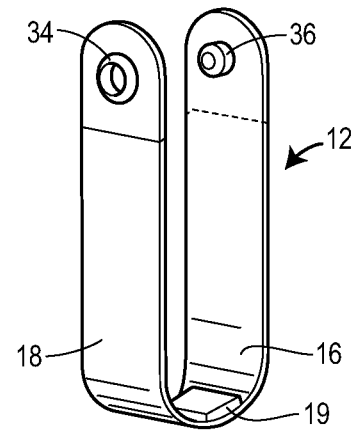
FIG. 20  FIG. 21A
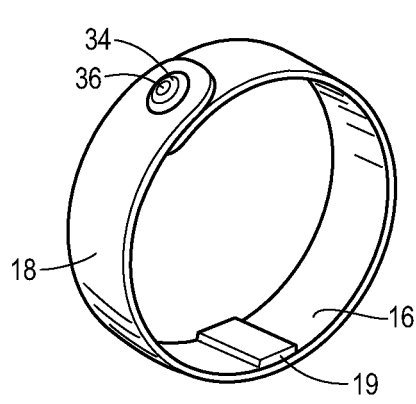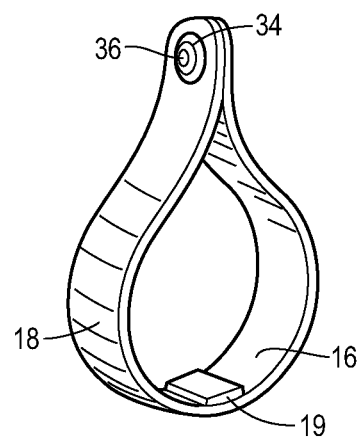
FIG. 21B  FIG. 21C

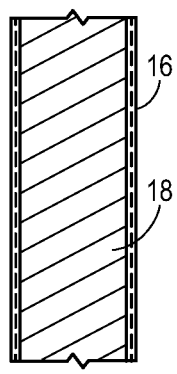
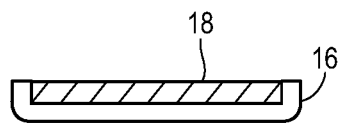
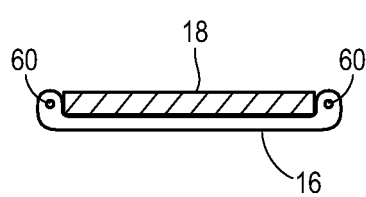
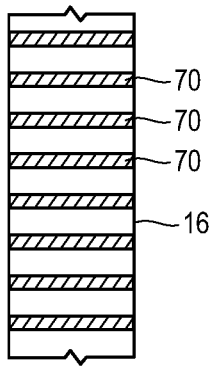
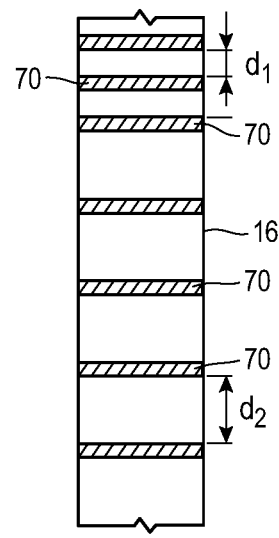
*FIG. 23A*  *FIG. 23B*  *FIG. 24*  *FIG. 25A*  *FIG. 25B*

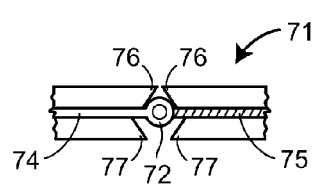
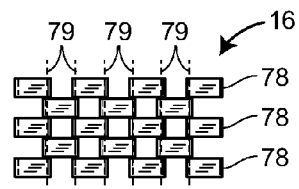
FIG. 32  FIG. 33
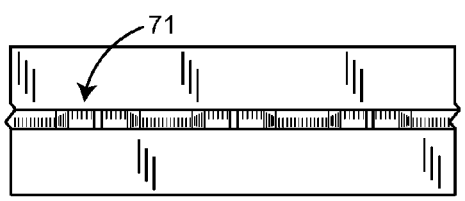
FIG. 34
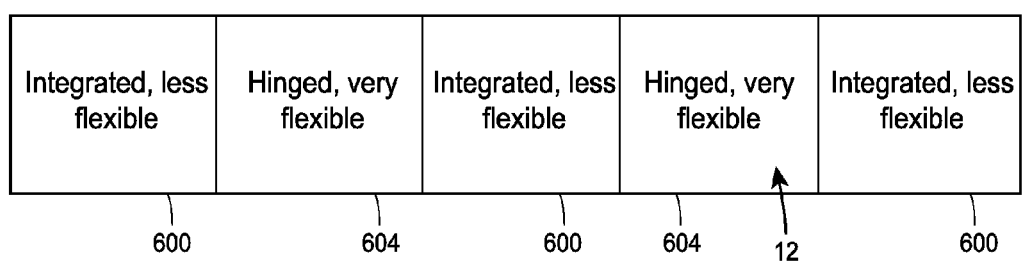
FIG. 35

ATTACHABLE DEVICE WITH FLEXIBLE DISPLAY AND DETECTION OF FLEX STATE AND/OR LOCATION

RELATED APPLICATIONS

This application is a continuation application of International Patent Application No. PCT/US2014/52814 filed Aug. 27, 2014, which claims priority to and the benefit of the filing dates of: U.S. Provisional Patent Application No. 61/870,781, entitled "ATTACHABLE DEVICE WITH AN INTEGRAL FLEXIBLE DISPLAY" and filed on Aug. 27, 2013; U.S. Provisional Patent Application No. 61/876,181, entitled "Attachable Device with an Integral Flexible Display and Natural Messaging Routine" and filed on Sep. 10, 2013; U.S. Provisional Patent Application No. 61/920,705, entitled "Dynamically Flexible, Attachable Device Having an Integral Flexible Display" and filed on Dec. 24, 2013; U.S. Provisional Patent Application No. 61/938,107, entitled "ATTACHABLE DEVICE WITH FLEXIBLE DISPLAY AND ORIENTATION DETECTION", filed on Feb. 10, 2014; and U.S. Provisional Patent Application No. 61/991,753, entitled "FLEXIBLE ELECTRONIC DISPLAY WITH STATE-BASED USER INTERFACE OPERATION" and filed on May 12, 2014. The entire disclosures of each of these applications is hereby expressly incorporated by reference herein for all uses and purposes.

TECHNICAL FIELD

This patent application relates generally to electronic displays, and more particularly to automatically presenting and/or modifying image content presented on the display based on a flex state of the electronic display, and/or based on an environment in which the electronic display is located.

BACKGROUND

Electronic displays are commonly installed within hard surfaces of electronic devices, such as computer screens, television sets, smart phones, tablet computers, etc., and in many cases are installed on accessories for the electronic devices, such as removable monitors. Many electronic devices having an electronic display are portable, and have thus become very useful in implementing mobile applications. This fact is particularly true with smart phones which have become ubiquitous. However, unfortunately, typical mobile devices such as smart phones have electronic displays that are rigid (and in some cases, flat) in nature. Thus, while these displays are useful in implementing many different applications, the device on which the display is present must still typically be held in a hand, or must be stored in a pocket, a purse, a briefcase or other container, which makes the electronic device less accessible in many situations, such as when a person is carrying other items, undertaking an athletic activity such as running, walking, etc. Moreover, in many cases these traditional electronic devices require two free hands to hold and operate, making these devices cumbersome or difficult to use or to view in situations in which, for example, a person has only one or no free hands or is otherwise occupied.

Flexible displays are generally known and are starting to come into more common usage, however, flexible displays have not been widely incorporated into easily portable items such as items of clothing, wristbands, jewelry, etc. or on items that are worn by a user and/or are easily attached to other objects or items, much less in a manner that makes the display and the contents presented thereon more useable and visible to the user in many different scenarios.

SUMMARY

The present application is generally directed to an article or device that has a dynamically flexible electronic display and that displays or presents image content thereon based on a degree of flex or a flex state of the flexible electronic display and/or based on an environment (e.g., contextual environment, or a user-defined environment) in which the display is located. The techniques, systems, methods, and apparatuses described herein pertain to an article or device that automatically detects (e.g., detects without requiring user input) a current degree of flex or flex state of a dynamically flexible electronic display included in the article or device and/or that automatically detects an environment (and, in some cases, a detected particular location within the environment) in which the article or device is currently located. Based on the detected degree of flex, environment, and/or location, the article or device causes particular text and/or images to be presented on the dynamically flexible electronic display. For ease of discussion and not for limitation purposes, such an article or device is referred to herein generally as an article or device that has "automatic detection capabilities."

As an initial matter, though, it is noted that while the techniques, systems, methods, and apparatuses described herein are discussed with respect to articles or devices having one or more automatic detection capabilities and having an electronic display, any or all of said techniques, systems, methods, and apparatuses are not limited to being applied to only articles or devices with electronic displays. Indeed, any or all of said techniques, systems, methods, and/or apparatuses described herein are easily applied to articles or devices that have other types of electronic sheets which emit and/or reflect energy, such as lighting sheets, arrays, arrangements, or groupings. Additionally or alternatively, any or all of said techniques, systems, methods, and/or apparatuses described herein are easily applied to articles or devices having electronic sheets that receive (e.g., passively receive), absorb, and/or detect energy or other information, such as solar cell arrays, sensor arrays, etc. Generally, any or all of said techniques, systems, methods, and/or apparatuses described herein may pertain to articles or devices having any electronic sheet with an optoelectronic area comprised of one or more optoelectronic elements. The optoelectronic elements may be, for example, light-emitting elements, light-reflecting elements, light-transflecting elements (e.g., elements that are able to both emit and reflect light), light absorbing elements, and/or sensing or detecting elements. Examples of possible types of optoelectronic elements include OLED lighting elements or pixels, e-paper elements or pixels, solar cells, sensor elements, and the like. The one or more optoelectronic elements may be arranged on the electronic sheet in any desired arrangement or grouping to form an optoelectronic area of the electronic sheet. Typically, each element of the one or more optoelectronic elements may be of a same type, however, some electronic sheets may include more than one type of optoelectronic element. For example, an electronic sheet may include both sensor elements and light emitting elements, either in separate areas or groupings, or in an intermixed area or grouping. For ease of discussion and not for limitation purposes, the description herein generally refers to electronic displays having a plurality of a same type of light emitting, reflecting, or transflecting optoelectronic elements arranged in an array.

Furthermore, while the techniques, systems, methods, and apparatuses described herein are generally discussed with respect to dynamically flexible electronic sheets that may flex or bend during use, any or all of the techniques, systems, methods, and apparatuses described herein are applicable to rigid electronic sheets (e.g., electronic sheets in a flat or statically flexed position) that do not bend or flex during use.

Generally, an example electronic display included in an article or device to which one or more of the techniques, systems, methods, and apparatuses described herein may be applied is fabricated using any desired electronic display material, such as any of various suitable plastics. The electronic display may be inflexible or rigid, and formed in either a flat or statically flexed position. Alternatively, the electronic display may be dynamically flexible. With regard to statically flexed and dynamically flexible displays (which are collectively and categorically referred to herein as "flexible electronic displays" or "flexible displays"), such flexible electronic displays may be manufactured as a displays that have display elements (e.g., pixel elements) disposed on separate frontplane and backplane substrates, if desired. Typically, the backplane substrate of a flexible display is formed of flexible material. The frontplane substrate may be formed of the same or different flexible material, or may be formed of inflexible material. In some cases, such as in the case in which e-paper is used as a flexible display, a frontplane component may be laminated onto a backplane component, where the backplane layer includes the backplane substrate, and the frontplane component includes an adhesion layer, optoelectronic material (which may be dissolved in a fluid that is contained in microcapsules or microcups, for example), and a top or frontplane substrate. Additional protection layers, a touch screen, and/or a frontlight may be laminated in a layer on top of the frontplane component, if desired. In any case, such layers of substrates and other components may be placed together to form the flexible electronic display, which may then be disposed on or proximate to a support.

A support for the electronic display may be inflexible or rigid (e.g., to maintain the flexible display in a flat or statically-flexed position), or the support may be dynamically flexible (e.g., a leather support, a bendable metal support, bendable plastic, etc. to allow the flexible display to be dynamically flexed or curved during use). A support may be dynamically flexible and have limited flexibility (e.g., the leather support, the bendable metal support, the bendable plastic, etc., each of which may have limited flexibility and/or may be semi-rigid), or a support may be dynamically flexible and soft or may have unlimited flexibility (e.g., cloth, mesh, etc.). In some cases, electronic display is physically coupled to the support, and in other cases, the electronic display is not physically coupled to the support but nonetheless is supported by the support. For example, ends of the electronic display and ends of the support may be respectively coupled to clasps in a layered manner.

Thus, a display support for a dynamically flexible display may itself be dynamically flexible. In some configurations, the dynamically flexible support may limit the maximum, dynamic bending radius of the dynamically flexible display (e.g., in longitudinal and/or torsional directions) so that the display is not permitted to flex to a degree at which its operation may be compromised. Indeed, the dynamically flexible support may incorporate various types of structures to protect the flexible display by, for example, limiting the possible types of motion that the flexible display can undergo. These types of structures can, for example, include a set of transverse bars, stays or stints disposed in or on the flexible support to limit the torsional motion of the flexible support to thereby prevent damage to the flexible display due to torsional bending of the flexible display. In a similar manner, one or more bending limiting structure elements may be configured within the flexible support to limit the bending motion of the flexible support around either a longitudinal axis of the device or about a transverse axis of the device. Such structures thus prevent flexing of the flexible display in one or more directions so as to prevent damage to the flexible display from bending motions that might delaminate, buckle, crack or otherwise damage the various layers of the flexible display. Still further, the flexible support may include a raised edge or ridge formed of, for example, a metal wire or other material that is disposed along the edges of the flexible display to prevent or limit damage to the flexible display by impacts at the edge or side of the flexible display.

If desired, a dynamically flexible support for a flexible electronic display may include a series of rigid pieces of material interconnected with hinges, wherein the hinges limit bending of the flexible electronic display when disposed on the flexible support within the bending tolerance of the flexible electronic display. The rigid pieces of material may be disposed laterally along the article or device, and the hinges may include protrusions that interact to limit the range of bending motion of the hinge. Likewise, the flexible support may include a flexible material with rigid elements spaced laterally apart along the flexible material, and the rigid elements may operate to limit bending of the flexible support in the transverse direction of the band more than in the lateral direction of the article or device. Additionally, in some cases, the flexible support may have two portions disposed laterally adjacent to one another, wherein the first portion can be bent to a minimum radius of curvature that is different than the minimum radius of curvature to which the second portion can be bent.

On the other hand, a display support for a statically-flexed display may be essentially rigid in nature. In an embodiment, such a support includes a flat surface with one or more edges, and one or more other surfaces are congruent to the flat surface at respective edges. Each of the other surfaces is disposed in a respective plane different than the plane in which the flat surface is disposed. In some cases, two or more of the other surfaces are disposed in parallel planes. For example, a display support for a statically-flexed display may be a box, a case, a cover, or two walls meeting at a corner of a building or room, and the flexible display follows the contours of the display support across the different planes. In some configurations, at least one of the other surfaces is a curved surface.

Thus, an article or device that has automatic detection capabilities and that includes an electronic display may also include a support for the display. The electronic display may be a flexible display, for example, and in an embodiment, the support for the flexible display is integrally rigid to support the display in a statically flexed position. In other embodiments, the support for the flexible display is dynamically flexible to allow the display to bend during use.

In some cases, the article or device includes one or more electronics modules for control of and/or communications to/from the article. In some configurations, the one or more electronics modules are self-contained and are attached to the display support. For ease of reading, the one or more electronics modules are referred to herein in the singular (i.e., "electronics module"), although it is understood that an article may include more than one electronics module.

The electronics module includes a processor for implementing applications or programming, such as an application or program to communicate with a display driver to drive the electronic display to display fixed or changeable messages, artwork, pictures, text, images, etc. The electronics module also includes a memory for storing non-transitory, computer-readable or computer-executable instructions corresponding to the applications or programming. For example, the instructions stored on the memory are executed by the processor to perform the applications or programming. Further, the memory of the electronics module may store pictures, images, messages, text, videos, etc. to be displayed on the electronic display at various times, as well as may store application data, such as configuration data, to be used by the applications and/or programming for performing various display tasks at different times. The electronics module may include a battery for powering the electronic display, the processor, a display driver, and other electronic elements, a battery charging device for charging the battery either in a wireless or a wired manner, and a communications module that enables other devices (e.g., other computing or communication devices) to communicate with the processor, the display driver and the memory to provide new or different images or messages to be displayed on the electronic display, to configure the operation of the electronic display of the attachable electronic device, etc.

The article or device so formed may, for example, enable a user to have a single type or multiple different types of digital media depicted or displayed on the display at the same time, including, for example, photographs, digital artwork created by the user or others, messages sent to or created by the user, reminders, notes that provide instructive, educational or inspirational messages, e-cards, advertisements, personalized agendas, calendars, such as a personalized Outlook® calendar, etc. More particularly, the display driver may be configurable to drive the electronic display by displaying thereon one or more images, messages, digital artwork, videos, etc., stored in the memory. In some cases, the display driver is connected to a set of electrodes (e.g., also referred to interchangeably herein as "lead lines," "connectors," "connection lines," "connection elements," "connecting lines," or "connecting elements") that, in turn, are connected to the display elements (e.g., pixel elements) of the flexible display, and the display driver provides respective content to each electrode or connector to produce the image displayed on the flexible display. The display driver may display or present an image via the flexible electronic display, may change the image being displayed/presented on the flexible electronic display from time to time, such as by accessing the memory and providing a new image to the display, may display videos, such as real time videos, and/or may display other types of digital media. Likewise, the display driver may cause various interfaces associated with many different applications at different times or in different modes of the article to be presented on the flexible display. For example, the display driver may be driven by various different applications executed in the processor to display a calendar interface, an e-mail in-box interface, an alarm clock interface, a keyboard interface, a step-counter interface, etc. These interfaces may be located on the same place on the flexible display and displayed at different times, and/or may be located at different places on the flexible display and displayed at the same or at different times.

Further, a battery charger unit may be connected to the battery and may operate to charge the battery using, for example, an inductively coupled charging technique. The battery charger unit may be a part of an inductively coupled charging system and may respond to electromagnetic waves produced by an exterior charging unit to charge the battery when the article is disposed near the external charging unit. In another case, the battery charger may be a kinetic energy charger unit that converts motion of the article (such as that associated with movement of an arm when the article is in the form of a band) into electrical energy which is then used to charge the battery.

Still further, a communications module may enable the processor, the driver, the memory and/or the flexible electronic display to communicate with one or more external sources or devices, such as a computer, a mobile phone, a tablet device, a remote control unit, etc., using, for example, wireless communications produced using a Wi-Fi network, a cellular network, a Bluetooth connection, a near-field communications (NFC) connection, an infrared communication technique, a radio frequency identification (RFID) device or tag, etc. The communications module may operate to enable the driver to receive new images or other digital media for storage in the memory and ultimate display on the flexible electronic display, new applications for execution by the driver to perform control of the electronic display in various manners, and/or new configuration information for configuring the manner in which the display driver controls the flexible electronic display to operate to display images and other information. In this manner, a user may reprogram the article via, for example, a wireless communication network to display different pictures, images, messages, etc., at different times, to execute different applications at different times or in different locations. The communications module operates to eliminate the need for the article or device to be plugged into a computer, or otherwise to have wires connected thereto for writing information to the memory of the device.

In some cases, the memory may store, and the processor may execute, one or more applications provided or downloaded to the article or device by the user. These applications may enable the user to direct or program the operational features of the article or device with the flexible electronic display, such as the particular digital media or images to display at any given time, the order in which images are to be displayed, the speed at which images will change, display features, such as background colors, borders, visual effects, etc. Moreover, the applications may enable or perform communications via the communications module to obtain information that may be displayed on the flexible electronic display, such as e-cards, advertising or promotional information, etc. provided via, for example, a Wi-Fi connection, a cellular connection, a Bluetooth or NFC connection, or any other wireless communications network or connection.

In an example configuration, the processor, which may be a generally purpose micro-processor type of controller or a special purpose controller, the battery, the battery charger unit, the computer-readable memory and the communications module are integrated (within, for example, an end-piece or a side wall of the article), and these integrated components may be sealed or otherwise protected from water, air, dirt, etc. to which the exterior of the article is exposed. Any or all of these electronic components (and indeed, the electronics module itself) may be encapsulated in a hermetically sealed manner to prevent any direct exposure of these components to exterior forces and environmental hazards.

In some configurations, a flexible, transparent, touch screen interface is disposed over or on top of the electronic display to enable a user to input data or take input actions with respect to the electronic display. In some cases, the inputs may be in the form of gestures or other inputs that are detected by other sensors included in article in which the electronic display is included, and the gestures detected by the sensors may cause the electronic display to present corresponding driving signals.

As previously mentioned, an article may be a dynamically flexible article, such as a wristband, a shoe, a belt, a piece of jewelry, etc. Such a dynamically flexible article may include a dynamically flexible electronic display disposed thereon in a manner that is dynamically bendable or conformable to a user's wrist, arm or other curved or even flat surface, and that enables various images to be displayed on the electronic display in a manner that is easily viewable to a user. The dynamically flexible article with such a dynamically flexible electronic display may be attached to or worn on a user's body, such as in the form of a wristband or on a shoe or a belt, and may be bendable to fit the various contours or body surfaces on which the electronic display is located. The dynamically flexible article is also easily attached to other items, such as mugs, cups, computers, phone covers, bicycle handles, automobile dashboards, stands, etc., that enable the flexible display to be viewed (e.g., in a flat and any number of flexed positions) when not being held in one's hands or on one's body. The electronic display of the article is thus, in many cases, viewable to a user and is capable of being manipulated or actuated by the user without having to be held in one or both of the user's hands, making the electronic device useable while the user is engaged in or performing other activities, such as running, biking, etc.

As such, in an example, a dynamically flexible support for a dynamically flexible electronic display may have one, two, or more fasteners or connection mechanisms that are attached to the support and that allow the article in which the support and the display are included to be removably attached to itself, to another object, or worn by a person. The fasteners or connection mechanisms may be end-pieces, or the fasteners or connection mechanisms may be located along the length of the support.

Accordingly, an article or device having automatic detection capabilities may be a consumer device, such as a device that may be worn by a person or used by a person. The article or device having automatic detection capabilities may be a device used for communicating and/or computing. Some articles or devices having automatic detection capabilities may not be consumer devices, though, such as when an article or device is used as a flexible electronic billboard or advertising display, or as a portable, configurable solar array.

With particular regard to the automatic detection capabilities of the article or device, in an example, the article/device includes a flexible electronic display and one or more fasteners that allow the article/device to be releasably attached to itself (e.g., in a circular or oval configuration), and/or to be releasably attached to another object (e.g., in a flat or any number of curved or bent configurations). Additionally, the article/device includes one or more detection elements that generate one or more respective signals corresponding to detected flex states, environments, locations, and/or other conditions associated with the article/device. The signals are received by the processor of the article/device and, based on the signals, the processor may automatically determine one or more actions that are to be performed by the optoelectronic elements of the article/device and cause said determined actions to be performed.

For example, when an article/device automatically detects that it is releasably attached to a headband, the resulting action of the article/device may be to generate a bright light suitable for headlamp capabilities. On the other hand, when said article/device automatically detects that it is laid flat, the resulting action of the article/device may be to receive and store solar energy for re-charging a battery or energy storage device.

In another example, when an article/device automatically determines that it is releasably attached to a refrigerator in the kitchen, the article/device may launch and display a shopping list application, whereas when the article/device automatically determines that it has been releasably attached to a cabinet or wall near a food preparation area in the kitchen, the article/device may automatically hide the shopping list application and display a recipe application. Further, when said article/device detects that it is fastened around a user's wrist, the article/device may cause a watch application to be displayed on the top side of the user's wrist, and a text messaging application to be displayed on the underside of the user's wrist. Still further, when said article/device detects that it is fastened around a different user's wrist, the article/device may cause a wall paper application to be displayed on the top side of the different user's wrist, and a social media application to be displayed on the underside of the different user's wrist.

Generally, an article/device that has automatic detection capabilities is configured and operates to detect one or more current conditions corresponding to the article/device without requiring user input to do so. That is, the article/device does not receive an explicit input from a user indicating the one or more current conditions. Rather, the article/device automatically detects the one or more current conditions using elements included thereon. Examples of detectable conditions corresponding to the article/device include a current or present degree of flex or flex state of the display, a change from one flex state to another flex state of the display, an identity of an object that is currently supporting the article/device, an identity of an object on which the article/device is currently mounted, and whether or not said article/device is releasably attached to the supporting object (e.g., refrigerator, cabinet, wall, etc.) or merely surrounds a portion of the supporting object (e.g., user wrist, bicycle handlebar, belt loop, etc.). Other detectable conditions corresponding to the article/device include an environment in which the article/device is presently or currently located (e.g., kitchen, car, office, bedroom, or other contextual environment), and a particular location within the environment in which the article/device is currently located and at which the article/device is currently situated or disposed (e.g., resting on stand in an office, releasably attached to a wall or cabinet of the office, on a user's wrist while the user is in the office, or other contextual location). Still other detectable conditions corresponding to the article/device may include the particular identity of a supporting object (e.g., am I being supported by Mary, by Joe, by a nightstand, or by a car dashboard?) and, in some cases, an orientation or calibration of the article/device with respect to the supporting object (e.g., am I surrounding Mary's wrist, upper arm, or ankle; or am I mounted on the car dashboard and responsive to the driver or to the front seat passenger?). Of course, the above are merely examples of conditions that are automatically detectable by the article/device, and other conditions may additionally or alternatively be automatically detected by the article/device.

Based on the detected conditions, the article/device determines one or more actions that are to be performed by the optoelectronic elements of the display of the article/device. For example, based on the detected conditions, the optoelectronic elements of the display may provide and/or modify image content presented on the flexible electronic display, may sense and process sensed signals, may emit or reflect visible energy in a particular pattern, etc. Typically, the article/device includes a memory or storage device storing a mapping of detected conditions and corresponding actions that are to be performed.

BRIEF DESCRIPTION OF THE DRAWINGS

FIGS. 7A and 7B illustrate a perspective and top view, respectively, of an example article in the form of a band similar to FIGS. 1-6 having magnetic members disposed on one or both ends or sides of the band to form an adjustable connection or clasping structure.

FIG. 8 is a block diagram of an electronics module associated with the articles or devices having automatic detection capabilities described herein.

FIGS. 9A-9E illustrate various example display images that can be provided on a display of an article that has one or more detection capabilities, where the different display images correspond to different operational modes of the article.

FIGS. 10 and 11 illustrate the band device of FIG. 1 or 3 disposed adjacent to one or more location detection strips in a straight configuration and a curved configuration, respectively, to form a detection system.

FIG. 20 illustrates an example article in the form of a band having an electronics module disposed in the center of the article with a non-magnetic connection structure used at the ends of the flexible support to secure the article in a loop.

FIGS. 21A-21C illustrate an example article in the form of a band having a flexible display and a further connection structure in the form of a snap-on connector.

FIGS. 23A and 23B illustrate a top and a cross-sectional view of a flexible band device having a structure or support that protects the edges of a flexible electronic display disposed thereon.

FIG. 24 illustrates a cross-sectional view of a flexible band device illustrating further side protection structure for protecting the edges of a flexible electronic display.

FIG. 25A illustrates a top view of a flexible support of a band device having a torsional and transverse bending limiting structure in the form of a number of transverse spacers.

FIG. 25B illustrates a top view of a flexible support of a device having a torsional and transverse bending limiting structure in the form of a number of transverse spacers spaced at different distances from one another.

FIGS. 26-32 illustrate views of various bending limiting members that limit the flexing motion of a flexible support in at least one direction while allowing particular flexing motion in another or opposite direction.

FIG. 33 illustrates a top view of a bending or flexing limiting structure forming a flexible support, formed as a series of transversely interconnected longitudinal members, each longitudinal member made up of a set of longitudinally disposed links.

FIG. 34 illustrates a top view of a flexible support of a device having bending limiting structure of any of FIGS. 26-33 disposed therein.

FIG. 35 illustrates a top view of a flexible support of a device that includes a combination of uniformly constructed portions and hinged portions with each portion have a different flexibility from an adjacent portion, to provide a support for a flexible electronic display that includes various different bending characteristics at different locations or sections of the flexible support.

DETAILED DESCRIPTION

Examples of Displays

Figure 1:
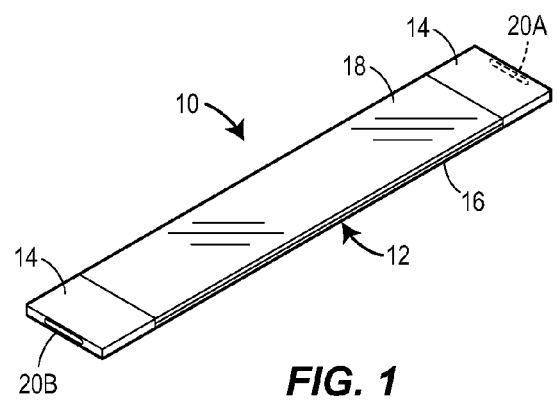
FIG. 1 is a perspective view of an example article that has one or more detection capabilities, where the article is in the form of a band with a dynamically flexible display.

The display of some or all of the embodiments of articles or devices having automatic detection capabilities described herein may be manufactured as any type of rigid or flexible electronic display using any suitable electronic display technology. For example, a display may be manufactured using light emitting diode (LED) technology or liquid crystal technology, e.g., by using an array of pixel elements, and may be a flat, rigid display, a curved or bent rigid display, or a dynamically flexible display. As used interchangeabley herein, the term "flexible display" or "flexible electronic display" generally refers to an electronic display that has or is formed from at least one flexible substrate. Thus, as referred to herein, the term "flexible display" may refer to an electronic display that is maintained in a statically flexed position, and/or to an electronic display that is dynamically flexible during its use. Examples of flexible displays include e-paper displays, organic light emitting diode (OLED) displays, etc. Typically, such flexible displays, once manufactured, may then be formed, curved or bent (either statically or dynamically) in various manners.

Generally speaking, a flexible display may be made of a flexible backplane substrate and a frontplane substrate. The backplane substrate and the frontplane substrate cooperate to support a set of one or more optoelectronic elements configured to produce light based on electrical signals, and/or to produce electrical signals based on light. For example, as previously mentioned, the set of optoelectronic elements may be a set of light-emitting, light-reflecting, light-transflecting, or light-absorbing elements. Typically, the set of optoelectronic elements includes a set of electrical energizing components coupled to a set of electrically energizable components. In some configurations, both the set of electrical energizing components and the set of electrically energizable components are disposed on the backplane substrate. In some configurations, either the set of electrical energizing components or the set of electrically energizable components is disposed on the backplane substrate, and the other set of components is disposed on the frontplane substrate.

Additionally, in most (but not all) configurations, a set of components of the optoelectronic elements that is disposed on the backplane substrate may be connected to a set of electrodes or connecting lines over which electrical signals may be sent and/or received. In an example, the set of electrical energizing components is disposed on the backplane substrate and communicatively coupled to a set of connecting lines to receive signals for driving the set of electrically energizable components. In another example, the set of electrically energizable components is disposed on the backplane substrate and communicatively coupled to the set of connecting lines to transmit signals generated based on energy or light absorbed or detected by the optoelectronic elements.

The frontplane substrate may or may not be flexible. For example, in a dynamically flexible display, two flexible substrates including a backplane flexible substrate and frontplane flexible substrate are placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the electronic display.

Referring more particularly to dynamically flexible displays, such flexible displays may include a dynamically flexible display area on which text, images, and/or driving signals may be presented. The display area may include a backplane display area and a frontplane display area which are placed back to back, next to one another, or laminated onto each other. The frontplane display area comprises an array of optic elements (e.g., electro-optic elements, or elements that are configured to emit or reflect light upon energization or upon receiving signals) that is capable of displaying an image, and the optic elements may be provided on a first flexible substrate. The backplane display area comprises an array of semiconductor devices or elements (e.g., transistor elements) provided on a second flexible substrate for driving or providing energization or signals to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. Nos. 6,585,914; 6,608,323; 6,991,749; 7,374,702; 7,528,176; 7,569,693; 7,605,225; 7,671,202; 7,816,480; 7,842,198; 7,892,454; 7,893,265; 7,902,363; 7,947,837; 7,982,039; 8,022,214; 8,329,855; 8,404, 844; 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, and benzocyclobutene-based polymers. Other polymeric dielectrics are described in U.S. Pat. Nos. 7,605,394; 7,981,989; 8,093,588; 8,274,075; 8,338,555; U.S. Patent Publication No. 2011/0175089; U.S. Patent Publication No. 2011/0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$ as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. Nos. 8,017,458; 8,097,877; 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (no). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. Nos. 5,930,026; 6,831,769; 6,839,158; and 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. Nos. 7,446,945 and 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Further, various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Examples of Articles or Devices with Automatic Detection Capabilities

FIG. 1 illustrates an example article or device 10 having automatic detection capabilities that uses one or more of the techniques, systems, methods, and apparatuses described herein. The article 10 is dynamically flexible, and may be in the form of a band, such as a wristband or other elongated band. As such, the article 10 includes a flexible band portion 12, which is generally rectangular in shape and configuration, disposed between two ends, end pieces, or fasteners 14. The band portion 12 includes a dynamically flexible support 16 and a dynamically flexible electronic display 18 disposed on or proximate to the support 16 so as to be viewable from one surface of the band 12, as illustrated in FIG. 1. One or more of the fasteners, end pieces, ends, or clasps 14, each of which may be made of hard plastic or other rigid material, but could instead be made of a pliable material, may include various electronic components therein for driving the electronic display 18 and for providing other electronic functionality for the article 10. Additionally or alternatively, one or more various electronic components may be disposed in modules that are attached to the band 12 at locations other than with the fasteners 14.

Figure 2:
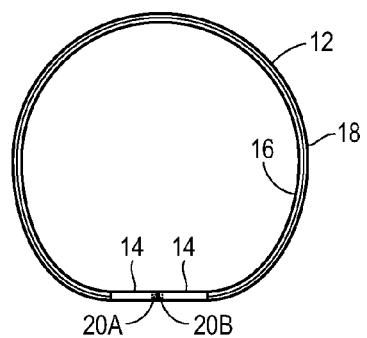
FIG. 2 is a side view of the band of FIG. 1 bent to form a fixed length, circular or oval band.

As illustrated in FIG. 1, one or both of the end pieces or clasps 14 may include a connection structure therein that functions to connect the end pieces 14 together when the band portion 12 is bent, as illustrated in FIG. 2, to form a circular or oval band. In one case, the connection structure may be in the form of magnetic materials 20A and 20B disposed in or on each of the clasps 14, wherein the materials 20A and 20B operate, when in close proximity to one another, to hold the end pieces or clasps 14 together. The magnetic materials 20A and 20B can each be a permanent magnet, or one of the materials 20A or 20B can be a permanent magnet while the other material 20A or 20B can be a magnetically permeable material, such as many kinds of metal. The magnetic materials 20A and 20B can be disposed at the longitudinal ends of the clasps 14 so that the clasps 14 connect end-to-end when the band 12 is bent to allow the clasps 14 to meet up with each other end-to-end, as illustrated in FIG. 2. In the case in which the materials 20A and 20B are both permanent magnets, the materials 20A and 20B may be disposed in ends of the clasps 14 so that opposite poles of the permanent magnets are facing outwardly from the clasps 14 or so that the magnets have their respective north poles facing in opposite directions when the band portion 12 is bent in the manner shown in FIG. 2 (e.g., so that a south pole of one of the magnets 20A and 20B meets or mates with a north pole of the other one of the magnets 20A and 20B). As will be understood, the configuration and placement of the materials 20A and 20B in the clasps 14 in the manner illustrated in FIG. 1 enables the device 10 to be clasped in a continuous circle with a fixed or predetermined length so that the clasps 14 meet end-to-end.

Figure 3:
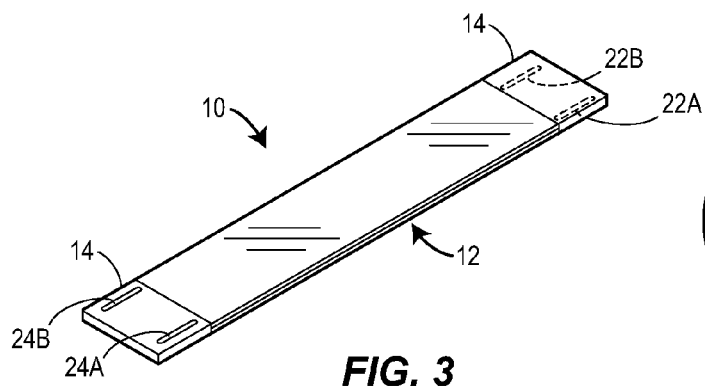
FIG. 3 is a perspective view of an example article that has one or more detection capabilities, where the article is in the form of a band having a dynamically flexible display.
Figure 4:
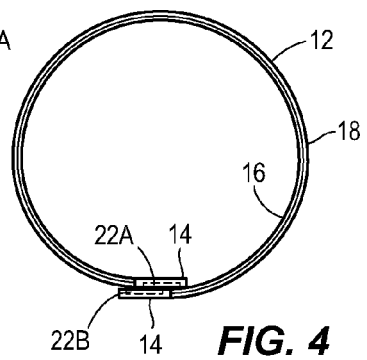
FIG. 4 is a side view of the example article of FIG. 3 bent to form an adjustable length circular or oval band.

In another embodiment illustrated in FIG. 3, the article or device 10, again illustrated in the form of a dynamically flexible band, includes a similar band portion 12 and end pieces or clasps 14. However, in this case, the clasps 14 have a connection structure in the form of magnets disposed on the top or bottom sides of the clasps 14 (and possibly even a portion of the band 12) to enable the device 10 to be folded around on itself in an adjustable manner as illustrated in FIG. 4 so as to create a band of variable length when disposed around or connected around a wrist or other supporting object. As illustrated in FIGS. 3 and 4, magnets or magnetic members 22A and 22B are disposed on or near a lower side of one the clasps 14, and come into contact or react with magnets or magnetic members 24A and 24B disposed on or near an upper side of the other one of the clasps 14. In some cases, the magnets or magnetically permeable elements or members 24A and 24B may be disposed within the support 16, such as in the center of the support 16, instead of on or near an upper or lower surface of the support 16. In these configurations, the clasps 14 may be disposed near or on top of one another during use and are thus connectable in various different positions with respect to one another, such as that illustrated in FIG. 4, when the flexible band 12 is bent to form a circular member to be placed around a wrist, a leg, a bicycle handle bar, etc., for example. In this manner, the article or device 10 may be easily adjustable in size to fit various different sized mounting or supporting members. As illustrated in FIG. 4, the support or flexible material 16 of the band portion 12 is illustrated as being flexed in a manner that causes the display 18 to be disposed on the exterior or outside of the band portion 12. Of course, in the configuration illustrated in FIG. 4, the magnets or metallic members 22A and 22B on the one side, and the magnets or the metallic members 24A and 24B on the other side of the band portion 12 may slide with respect to one another in the longitudinal direction of the device 10 so as to make the device 10 variable in size or circular shape to fit around different sized wrists or other mounting/supporting members. Of course, if desired, portions of the members 22A, 22B and/or 24A, 24B could be disposed in the band portion 12 in addition to or instead of in the clasps 14 and, if so disposed, would still be considered as being disposed in the end portions of the band 12. Still further, any or all of the magnetic members 22A, 22B, 24A, 24B could be a single, long piece of material, as illustrated in FIGS. 3 and 4, or could be a series of magnetic members disposed near but not contacting each other, to enable better registration of the north and south poles of the respective magnetic members in various different longitudinal locations of the band 12. This second configuration may provide for better adjustability of the length of the band 12 when both magnetic members 22 and 24 are permanent magnets.

Figure 5A:
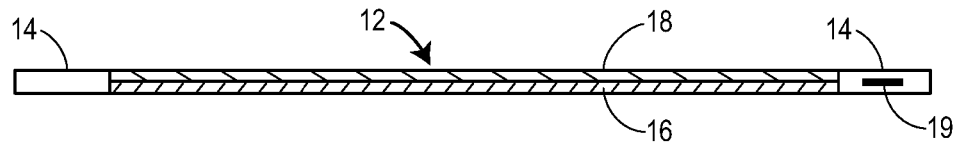
FIG. 5A is a side view of an example article of FIGS. 1-4 that has a dynamically flexible display disposed on a dynamically flexible support between two clasps.

Of course, the article or device 10 could take on many different configurations besides those illustrated in FIGS. 1-4. For example, as a reference, FIG. 5A illustrates a side view of the device 10 of FIGS. 1-4 in more detail. In this case, the band portion 12 is illustrated as including a flexible base or a support portion 16 that may be made of any suitable flexible material such as, for example, cloth, leather, plastic, metal links, or other material, while the dynamically flexible display 18 is disposed on the support 16. The clasps 14 may be the same size as each other and may be the same height as the display 18 and the support 16 together. In another case, the clasps 14 may be larger in height than the display 18 and the support 16 and, in this case, may stick out above surface of the display 18 and/or below the bottom surface of the support 16. As noted above, one or both of the clasps 14 may be or include an electronics module 19 that holds electronics, such as processors, memories, sensors, batteries, etc. that are used to power and drive the display 18 and to provide other communication functionality for the device 10. In some embodiments, the electronics module 19 is not included in the clasps or fasteners 14, but is attached to the band 12 in a location separate from the fasteners 14. If desired, the components of the electronics module 19 may be sealed or otherwise protected from water, air, dirt, etc. to which the exterior of the device 10 is exposed. For example, any or all of these electronic components may be encapsulated in a hermetically sealed manner to prevent any direct exposure of these components to exterior forces and environmental hazards.

Figure 5B:
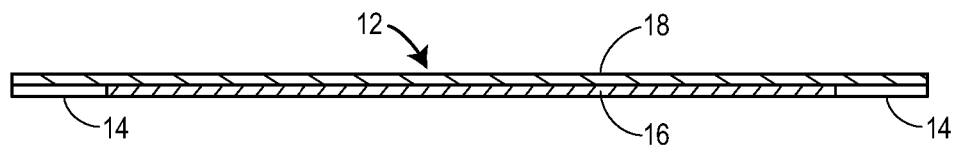
FIG. 5B is a side view of an example article in the form of a band that has one or more detection capabilities and that has a dynamically flexible display disposed over an entire length of a support.

In another embodiment, as illustrated in FIG. 5B, an article or device 10 having a dynamically flexible display 18 has the display 18 disposed over the entire length of the support 16 and end portions 14, which may be part of the support 16. In this case, the display 18 spans the entire length of the band portion 12 and of the device 10 and thus extends from end to end of the device 10. The connection structure, in the form of for example, magnets (not shown in FIG. 5B) may be disposed in the end pieces 14 and/or, if desired, in portions of the flexible support 16.

Figure 5C:
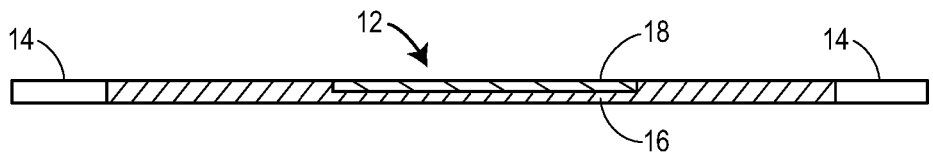
FIG. 5C is a side view of an example article in the form of a band that has one or more detection capabilities and that has a dynamically flexible display disposed on a center portion of a dynamically flexible support.

In yet another configuration, as illustrated in FIG. 5C, a dynamically, flexible article 10 has a dynamically flexible display 18 disposed on a limited portion of the flexible support 16 so that the display 18 is only disposed, in this case, in the center portion of the band 12. Of course, while not shown, the display 18 could be disposed on any other portion of the band 12, including in portions offset from the center of the band 12 and the display 18 could cover any desired amount or portion of uppers surface of the band 12. Here again, any desired connection structure could be provided in the ends of the support 16, including in the clasps 14, to connect the two ends of the band 12 together.

Figure 5D:
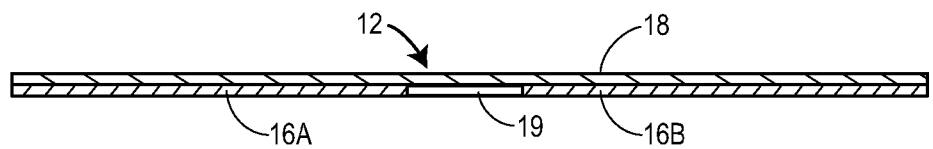
FIG. 5D is a side view of an example article in the form of a band that has one or more detection capabilities and that has a dynamically flexible display disposed over a support having two flexible end pieces connected by an electronics module.

In a still further case, as illustrated in FIG. 5D, a dynamically flexible article 10 has a dynamically flexible display 18 disposed over a support 16 having two flexible end pieces 16A and 16B connected by an electronics module 19 which, in this case, is illustrated is being disposed in the center of the flexible support 16. The electronics module 19 may or may not be made of a flexible material and in either case is still part of the flexible support 16. Moreover, while being illustrated in the center of the support 16, the electronics module 19 could be disposed at any other location along the support 16 including at any position offset from the center of the support 16. Again, any desired connection structure could be attached to or disposed in or on the end portions of the device 10, including the ends of the support 16.

Figure 6:
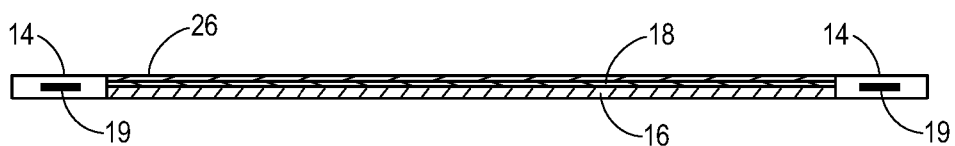
FIG. 6 is a side view of an example article in the form of a band that has one or more detection capabilities and that has a flexible touch screen disposed on a dynamically flexible display and a flexible support disposed between two clasps.

In another embodiment, as illustrated in FIG. 6, the article or device 10 may be configured similarly to that of FIGS. 1-5D, but may also include a touch screen interface 26 disposed over the dynamically flexible display 18. In particular, in this case, the touch screen interface 26 can be a capacitive touch screen, an infrared touch screen, resistive touch screen, or may use any other type of touch screen interface technology. In some cases, the touch screen may be transparent in nature. For example, the touch screen may be a separate layer that may be laid over top of the display 18 to allow the display 18 to be viewable there-through. In some cases, the touch screen may be integrated with at least one layer of the display. Further, the touch screen interface 26 may be flexible or dynamically flexible in conjunction with the display 18. As will be understood, the touch screen interface 26 of FIG. 6 is powered by and controlled by the electronics disposed within one or more electronics modules 19 illustrated as being disposed, in this case, in both of the clasps 14 to perform various different types of touch detection functionality associated with a typical touch screen display. Of course, the touch screen interface 26 could be added to any of the configurations of FIGS. 5A-5D or to any of the other article embodiments described herein.

Indeed, additionally or alternatively, one or more other electronic components may be layered over and/or integrated into the display 18. For example, as previously mentioned, a frontlight may be layered over the display 18. Similarly, a backlight may be layered in between or under the layers of the display 18. Other electronic components that may be layered on top of, below, or between layers of the display 18, or that may be integrated with one or more layers of the display 18 may include, for example, a protective layer, an LED or other lighting layer, or any one or more other desired layers. Typically, but not necessarily, each electronic component layer may have its respective electrically operative connections (for example, in cases in which the electronic component is a separate layer from the display 18), but in some cases, multiple electronic layers may share one or more operative connections, e.g., to a display driver. In some cases, an electronic component layer may electrically and operatively connect to the backplane substrate of the display 18.

While the dynamically flexible article or device 10 of FIGS. 1-6 is generally illustrated as having an display 18 and a flexible support 16 disposed between or including two magnetically coupled clasps 14, with at least one of the clasps 14 containing or operating as an electronics module 19, other manners of disposing connection structures on the device 10 and of locating the electronics module 19 could be used instead. For example, FIGS. 7A and 7B illustrate an example article or device 10 in the form of a band having a single clasp member 14, such as one of clasps members 14 of FIGS. 1-6, disposed at one end of the dynamically flexible display 18 and a set of magnets 22 and 24 or other magnetically permeable material disposed on or in an end piece or end portion attached to or formed as part of the other end of the flexible support 16. In this case, individual magnets 22A and 22B are disposed in a spaced apart manner within the end piece 14 or are disposed in the flexible support 16 next to the end piece 14 and operate in conjunction with the individual magnetic materials 24 which are spaced apart and disposed on the other end piece of the band 12 to form a secure magnetic connection when the band portion 12 is wrapped around a user's wrist, arm, or leg, for example. The spaced apart nature of the individual magnetic members 22 and 24 enable the band to be adjustable in length so that a pair of magnetic members 22A and 22B (on opposite sides of one end of the band 12 or support 16) may meet up with any of a number of different pairs of magnets 24A and 24B (on opposite sides of the other end of the band 12 or support 16) to enable the length of the band, when connected, to be adjustable. Of course, the magnetic members 22 and 24 may each be permanent magnets, or one may be made of permanent magnets while the other is formed of magnetically permeable material. Of course, the spaced apart magnetic material configuration of FIGS. 7A and 7B may be used in any of the embodiments illustrated in FIGS. 1-6.

In other embodiments, the flexible support 16 and the flexible electronic display 18 can be removably coupled to one another and/or to another object in any number of different ways. The flexible support 16 and the display 18 can, for example, be snapped together, hooked together, latched together, or coupled to one another and/or to another in some other manner at one or more locations. A discussion of various coupling and/or connecting mechanisms for dynamically flexible articles is provided in a later section.

Example Electronics Suite

FIG. 8 illustrates a block diagram of various electronic components, referred to herein as an electronics suite 38, that may be used in or disposed in the electronics module 19 of any of the articles or devices described herein that include automatic detection capability. The electronics suite 38 may drive the electronic display 18 of the article 10, or may drive another electronic display. In particular, the electronics suite 38 illustrated in FIG. 8 includes a battery 40 that powers a number of other modules or electronic components including a microprocessor or other processor 42, a computer-readable memory 44, which may be, for example, a flash memory or other suitable type of non-transitory, tangible, data storage medium, a communication module 46, a display driver 48, a touch screen controller 50, and one or more detection elements 52 and other secondary devices 53.

The detection elements 52 may include, for example, an impact sensor or step counter, a geo-spatial location detector (e.g., a Global Positioning System (GPS) transceiver), one or more gyroscopic sensors or gyroscopes, temperature sensors, vibration sensors, pressure sensors, compression sensors, strain gauges, force sensors, tensional strain sensors, positional sensors or positioning elements, motion or movement sensors, orientation sensors, gravity sensors, piezoelectric sensors, biometric sensors (e.g., heart rate or pulse rate sensors, body temperature sensors, blood sugar sensors, oxygen sensors, etc.), other sensors, and/or any other element that receives externally generated input at the article or device 10. The secondary electronic devices, elements or components 53 may include, for example, an alarm or noise creation device, a speaker, a microphone, a vibrator (the operation of which causes the clasp 14 or electronics module 19 to vibrate), or any other device or electronic component that may be used to generate output at the article or device 10. Although FIG. 8 illustrates the detection elements 52 and the secondary electronic devices 53 as being integral with the electronics suite 38, in some cases, one or more of the detection elements 52 and/or the secondary electronic devices 53 are physically disposed at one or more other locations along the band 12 separate from the remainder of the electronics suite 38. In these cases, though, the separately disposed detection elements 52 and/or secondary electronic devices 53 remain in communicative connection with the remainder of the electronics suite 38 (e.g., via a wired or wireless connection).

Similarly, although FIG. 8 illustrates the display driver 48 as being integral with the electronics suite 38, in some cases, the display driver 48 is physically disposed at another location separate from the remainder of the electronics suite 38. In an example, the display driver 48 is disposed in a location that is proximate to electrodes or connectors of the display elements (e.g., pixel elements) of the electronic display 18, e.g., on the backplane of the display 18 or at some other suitable location. The separately located display driver 48, though, remains in communicative connection with the remainder of the electronics suite 38 (e.g., via a wired or wireless connection) despite of the remote locations. In some configurations, an article or device 10 may include more than one display driver 48.

As will be understood, the memory 44, the communication module 46, the display driver 48 and the touch screen controller 50, as well as the detection elements 52 and other secondary electronic devices 53, are communicatively connected to the processor 42 and may operate to perform various functions in conjunction with applications or other programs implemented by the processor 42. Further, each of these elements is connected to and is powered by the battery 40 in any known or desired manner. Still further, the electronics suite 38 of FIG. 8 may include one or more communication ports, such as communication port 54 (e.g., a USB or other type of digital communication port), and a power or battery charger input port 56. In this case, the power input port 56 may be connected to the battery 40 and enable charging or recharging of the battery 40 using any known or desired recharging circuitry and methodology. Alternatively or in addition, the communications input port 54 (in the form of for example, a USB input port) may be connected to the battery 40 and provide power to the battery 40 for charging battery 40, and the input port 54 may also be connected to the microprocessor 42, as well as to the communication circuit module 46, for performing wired-based communications via the input port 54. Of course, the communication input port 54, while being illustrated as a USB-type connection, could any other type of known wired or physical communication connection, including any desired serial or parallel digital communication port using any number of pins or wires, as is known in the art, an analog communication port, etc. Additionally or alternatively, the input port 54 may include a wireless input port for performing wireless communications. In some cases, the communication port 54 also serves as a detection element 52 of the article 10.

In an embodiment, the power input port 56 may be a wireless input port for powering the article 10, and in this case may, for example, be part of a battery charger unit that operates to charge the battery 40 using, for example, an inductively coupled charging technique. If the battery charger unit is part of an inductively coupled charging system, it generally responds to electromagnetic waves produced by an exterior charging unit (not shown) to charge the battery 40 when the article 10 is disposed near the external charging unit. In another case, the battery charger of the input port 56 may be a kinetic energy charger unit that converts motion of the device 10 (such as that associated with movement of an arm when the attachable electronic device 10 is in the form of a wristband or armband) into electrical energy which is provided to charge the battery 40. In still another case, the article 10 includes one or more solar cells via which the battery 40 is charged.

As will be understood, the processor 42, which may be a programmable, general-purpose processor or a specially programmed processor programmed using any desired type of hardware or firmware programming, generally coordinates and implements the operation of the display 18 and the associated electronic components as described in more detail herein. The computer readable memory 44 stores various applications and/or programs, including for example the general operating system implemented by the processor 42, and various applications (illustrated as a set of applications 60 in FIG. 8) to be run on the processor 42 to implement various different types of functionality via the device 10, some of which will be described in more detail herein. The memory 44 may also store one or more data files 62, which may be, for example, image or video data files associated with various images to be displayed on the display screen 18 at various different times. Still further, the memory 44 may store application data that may be created by the various applications 60 or the microprocessor 42 as part of the operation of various applications 60 and to be used by those applications 60 either during runtime of the applications 60 or at other times. If desired, the microprocessor 42 or one of the secondary electronic components 53 may include or be a clock that tracks the current time, day, date, month, year, time zone, etc.

As an example, one or more of the applications 60 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 60 may operate on the processor 42 to turn the display 18 associated with the article or device 10 into a slave display device that may be tied to or communicably coupled to an exterior master device or accessory device that is generating content to be displayed via the display 18. The master device, which may be a smart phone or a nearby computer device, may be wirelessly connected to the electronics suite 38 to provide content to be displayed on the display 18 and will typically have more memory, and computing and processing power than the processor 42.

The communication module 46 of FIG. 8 may include or use any type of communication hardware/software/firmware that uses any desired types of communication techniques to enable the microprocessor 42 to communicate with exterior devices or sources, e.g., via the communication port 54. Of course, the communication module 46 could include multiple different types of communication hardware/software/firmware, including any kind of hardwire-based communication module or wireless-based communication module. As examples, the communication module 46 may include a wired or wireless Internet-based communication module that may provide wired or wireless-based, IP protocol communications between the dynamically flexible article or device 10 and other devices or a communication network such as a LAN or a WAN to which other devices are communicatively connected. For example, the wired or wireless Internet-based communication module may support a Wi-Fi protocol and/or another packet protocol. Likewise, the communication module 46 may include a radio frequency identification (RFID) communications module for communicating with, sending messages to and/or receiving messages from RFID tags stored in other devices around or close to the device 10. In this case, the communications module 46 may decode signals received from RFID tags in response to pings by the RFID communication module 46 to identify the RFID tags or tag numbers (identifiers) associated with these devices. Additionally or alternatively, the communication module 46 may include a near field communication (NFC) protocol module and/or a Bluetooth protocol communication module, which may perform near field communications and/or Bluetooth communications in any known or desired manner with nearby NFC or Bluetooth enabled devices, thereby enabling wireless communication between the device 10 and other closely situated or closely located electronic devices. Still additionally or alternatively, the communication module 46 may include a Z-Wave protocol communication module, a Zigbee protocol communication module, and/or another communication module that uses another wireless protocol to communicative with other devices. Still further, the communication module 46 may support a wireless cellular communication protocol, such as TDMA, CDMA, GSM, LTE, PCS, etc. Still further, the communications module 46 may include a USB or other type of wired communication module for decoding and encoding USB-based communication signals to be sent out and received via the USB communication port 54.

As illustrated in FIG. 8, the display driver 48 is coupled to the microprocessor 42 and to the display 18, and the display driver 48 drives the display 18 to present different images to a user and thus implement functionality via the display 18. The display driver 48 may be associated with or use any type of display driver technology associated with the various different types of flexible displays that might be used, including, for example, e-ink or other bi-stable display drivers, organic light emitting diode (OLED) display drivers, etc.

Of course, it will be understood that the display driver 48 is connected to the various display elements (e.g., pixels or pixel elements) of the display 18 to cause the pixel elements to change their visual appearance so as to present content image on the display 18. Typically, but not necessarily, each pixel element is communicatively connected to two electrodes, lead lines, connecting lines, or connectors corresponding the (x, y) coordinates of the particular pixel element on the display 18. Thus, the display driver 48 provides driving signals (e.g., by using electrical signals or other suitable signals) to a set of connecting lines corresponding to a width of the display 18 or its display area (and, in some cases, physically emanating from a width edge or transverse side of the display 18 to the driver 48), and the same display driver 48 may provide driving signals (e.g., by using electrical signals or other suitable signals) to another set of connecting lines corresponding to a length of the display 18 (and, in some cases, physically emanating from a length edge or longitudinal side of the display 18 to connect to the driver 48). In an example, the display driver 48 provides driving signals to a set of transverse connecting lines and/or to a set of longitudinal connecting lines so that driving signals is presented on the display area of the display 18. In an example, the article 10 includes multiple display drivers 48, each of which provides driving signals to a respective set of connecting lines. In an embodiment, the one or more display drivers 48 are communicatively connected to one or more driving circuits (not shown), and the one or more driving circuits provide driving signals to the display area (e.g., the pixels forming the display area) via one or more sets of connecting lines.

For embodiments of an electronic sheet in which the optoelectronic elements forming the optoelectronic area of an electronic sheet are light-absorbing, detecting, or sensing elements, the one of more driving circuits may receive signals generated by the optoelectronic elements based on the absorption, detecting, or sensing performed by the optoelectronic elements. Thus, generally speaking, the one or more driving circuits may be communicatively coupled or connected with the set of optoelectronic elements via one or more sets of connecting lines to communicate signals to and/or from the set of optoelectronic elements.

Referring still to FIG. 8, the display driver 48 illuminates or causes the pixel elements to obtain or reach a color, a lighting level, an on-off state, etc., so as to drive the display 18 to present various images and other functionality as determined by the particular application 60 being executed on the microprocessor 42. In some cases, the display driver 48 may cause various images, such as one or more artistic renditions, patterns, etc. or other types of images stored in the memory 44 to be displayed as one of the images 62 on the display 18. Such an image may be any type of graphic element in the form of artwork, an indication of an association of the user with a particular university or other organization, such as a logo, a mascot, an icon, etc. In the case of a static display, and particularly when the display 18 is a bi-stable type of flexible display, such as an e-ink type of display, the display 18 might display a particular image or background image whenever the device 10 is in a sleep mode, and thus in which the display driver 48 is not operating to actively drive the display 18.

The touch screen controller 50 of the electronics suite 38 is connected to a touch screen interface 26, such as that illustrated in FIG. 6, if such an interface exists, and receives input signals from the touch screen interface 26. The controller 50 operates to decode these input signals to identify touch events that occur with respect to the touch screen interface 26. The touch screen interface 26 may be a capacitive touch screen interface or any other suitable type of touch screen interface disposed over the display 18, and may be transparent in nature to thus enable the pixel elements of the display 18 to be viewable through the touch screen interface 26. Of course, other types of touch screen interfaces may be used instead or as well. In any event, the touch screen controller 50 operates to energize and control the touch screen interface 26, as well as to recognize and decode touch screen events to identify, for example, the location of each touch screen event, a type of a touch screen event, such as a tap or a swipe movement, etc. If desired, the touch screen controller 50 alone or in conjunction with the processor 42 may operate to determine or recognize gestures that are input via the touch screen interface 26, such gestures being, for example, a slide, a swipe, a multi-finger pinch or any other type of gesture that includes one or more finger movements coordinated with one another. Each such gesture may indicate an action to be taken on or via the device 10. Of course, the article or device 10 may include other or different types of user input devices configured to detect user-generated gestures, such as interfaces that include buttons switches, roller balls, slide bars, pressure sensors, strain gauges, etc., disposed on, for example, one of the clasps 14 of FIGS. 1-7 or elsewhere along the band 12. Such user interfaces may enable the user to perform more rudimentary functions, such as scrolling movements, on-off powering movements, mode switching, etc. that are traditionally entered via actuate-able buttons or switches.

As will be understood, the various different electronic devices or components disposed in or shown in the electronics suite 38 of FIG. 8 may be used in conjunction with one another in various different manners to provide a whole host of functionality for the dynamically flexible article or device 10, which might be beneficial in various different uses of that article. For example, the device 10 may operate to execute any number of different types of applications including, for example, calendar applications, e-mail applications, web-browsing applications, picture, image or video display applications, stop-watch or other timing applications, alarm clock or alarming applications, location based applications including for example mapping applications, navigational applications, etc. In some cases, various different applications or functionality may be performed simultaneously, and different sections or portions of the flexible display 18 may be used to display information associated with the different applications. For example, one portion of the flexible display 18 may be used to illustrate calendar information provided by a calendar application, another portion of the flexible display 18 may be used to illustrate e-mails associated with an e-mail application and a still further portion of the flexible display 18 may be used to display a clock or stop watch associated with a timing application. Still further, the applications 60 executed on the device 10 may be executed on and display information computed solely with the electronics suite 38 of the device 10. In another case, one or more applications 60 may be executed on the processor 42 of the device 10 to interface with and display information received from external computing devices, such as a mobile phone, a laptop computer, a desktop computer, etc. In this case, the device 10 may act as a slave display device or may operate in conjunction with information received from the external computing device to provide information, graphics, etc. to a user on the flexible display 18 of the device 10. The device 10 may communicate with external devices or an external network via any desired communication hardware, software and communications protocol, including any LAN or WAN based protocol, an NFC protocol, a Bluetooth protocol, an IP protocol, an RFID protocol, etc. However, only some of these uses are described in detail herein.

To illustrate, FIGS. 9A-9E show various different types of displays or images which may be provided on a display of an article with automatic detection capabilities at various different times or even at the same time. In an embodiment, the displays or images shown in FIGS. 9A-9E may be presented on the flexible display 18 of the device 10, or on another display of another article that has one or more automatic detection capabilities. Referring to the display 18 of the device 10 for illustrative but non-limiting purposes, in one scenario illustrated in FIG. 9A, the display 18 may depict a pattern, an artistic rendition or other image that is particularly expressive of the wearer or user, including for example, an image provided by the user, a picture or a photo, an image of a hand-drawn sketch, a team, corporate or other organizational logo, a message of some sort, or some other image that expresses some interest or personality trait of the user. Such an image might be displayed whenever the device 10 is in a sleep mode, that is, when the device 10 is not being actively used in other modes. Moreover, such an image could be resident on the display 18 for long periods of time whenever the display 18 is not in use, if the flexible display 18 is a bi-stable display, such as an e-ink display, which requires no power to hold the image in place once image is been formed.

As illustrated in FIG. 9B, in another mode referred to herein as an office mode or a calendar mode, the device 10 displays a calendar screen and an e-mail screen or other images associated with or set up to provide office or business related functionality. Such a mode may provide images that enable the user to easily view e-mails, calendars and to use other business related applications. Thus, for example, the display as shown in FIG. 9B may provide a calendar of events, and may also display one or more e-mail icons, text messaging icons, etc., indicating e-mails or text messages that may be available and viewable to the user.

FIG. 9C illustrates the device 10 in an alarm/clock mode in which the flexible display 18 provides an alarm or clock display that may be generated by an alarm or clock application. An alarm may ring by sounding a speaker (e.g., one of the electronic devices 53 of FIG. 8) at a particular time according to a preset alarm notification and/or the device 10 might use a gyroscope or accelerometer to vibrate the device 10 to cause a vibration indicating an alarm. Still further, as illustrated FIG. 9D, the device 10 may be placed in an exercise or training mode in which the flexible display 18 displays a stopwatch, a distance traveled or other indications of various athletic parameters that have been met or associated with an exercise routine including, for example, use of the step counter to determine the number of steps that have been taken, to determine the number of lifts that have been performed when, for example, lifting weights, etc. Likewise, in such a mode, the display 18 may display a distance traveled by a runner or walker, the time since the beginning of a run or other exercise, etc. Still further, as illustrated in FIG. 9D, a portion of the display 18 may be used to indicate the current song that is playing via a music application implemented on the article 10.

In a still further mode, illustrated in FIG. 9E, the band device might be a slave display to another computer or accessory device, such as a navigation device within a car, a phone, a laptop computer, an e-reader. In this case, the display 18 may display, for example, a map, a route, directions, etc. on a map as provided by a navigation device to the device 10 via, for example, a Bluetooth communication module or other communication module that provides communication between the device 10 and the navigation device (not shown). Such a slave display might enable the device 10 to be more visible to the user in a driving situation. Of course, other types of visuals and displays can be provided with other types of applications stored on the device 10 or in other communicatively coupled computer devices, such as phones or computers that communicate with the device 10 to provide images or information for display to the user.

Examples of Detection Elements

As part of one of these or other uses, the device 10 may be separately connectable to magnetic strips or other exteriorly located magnetic or metallic devices to which the magnets 20 and 22 within the end pieces 14 are magnetically attracted. In this case, the strips may have communication modules therein or associated therewith that communicate with and enable the device 10 to detect and/or determine the environment in which the device 10 is located (and in some cases, detect and/or determine a particular location, within that environment, at which the device 10 is particularly situated or disposed), to thus control the functionality and/or actions of the device 10. As such, the communication port 54 and/or the communication module 46 of the device 10 may at least partially serve as detection elements of the article or device 10 to detect various conditions corresponding to the device 10. For example, the device 10 may be placed around someone's wrist and used in various different modes to provide information to the user as it is wrapped around the wrist. However, the device 10 might also be taken off the wrist and applied to other surfaces or supporting objects, such as tables, desks, car dashboards, refrigerators, nightstands, or any other object. In this case, the device 10 may automatically operate to detect its current environment and/or location and perform various resulting default/automatic functionality or actions based on the determined environment and/or location. As an example, FIG. 10 illustrates a device 10 having magnets disposed in the clasps 14, which are magnetically coupled to magnetic strips 100 which are separately disposed on a different surface or surfaces to cause the device 10 to have the flexible display 18 laid out horizontally or straight along the surface. In a similar manner, FIG. 11 illustrates the device 10 disposed in a curved manner between two magnetic strips 100 to create a curved display for viewing by a user.

Returning now to FIG. 10, in addition to including a metal, magnet or other magnetic material, one or more of the magnetic strips 100 may include a location detection mechanism 101 therein, such as an RFID tag, a Bluetooth or near field communication module, or any other kind of passive or active communication technology that communicates with the communication module 46 within the device 10, to indicate the location or a unique identifier of the strip 100 and thus the current location of the device 10 when the device 10 is disposed near or adjacent the strips 100. In this case, each or at least one of the strips 100 may include a unique RFID tag, Bluetooth communication identifier or other identifier that identifies the object to which the strips are attached, its environment, and/or its precise location within the environment. An application executed within the device 10, such as one of the applications 60 of FIG. 8, may operate to obtain, via the communication module 46 (which may be an RFID communication module, a Bluetooth communication module, an NFC module, etc.), the tag number or the identity of the strip 100 and may locate that tag number within its memory as being associated with a particular functionality, e.g., in a stored mapping. The application 60 may then configure the device 10 to operate in a default manner based on the detected strip identity or location, such as by running one or more other applications 60. Of course, the strips 100 need not be magnetic in nature but could instead be any type of device having an RFID tag, a Bluetooth module (such as Bluetooth tiles) or other communication module therein that is detectable by the device 10 whenever the device 10 is in a certain range of or near the strip 100. That is, the device 10 need not be magnetically connected to the strip 100 to perform the location detection described herein.

Once the RFID tag or other identifier of the strip 100 is determined via communication with the module 101, the device 10 and, in particular, the microprocessor 42 thereof, may execute a particular application indicating or providing certain functionality associated with the location or positioning of the device 10 at that strip 100, and/or associated with the object to which the strip is attached. Thus, the strips 100 may be placed on a refrigerator, and when so used, may disclose particular information necessary or generally associated with kitchen usage, such as a shopping list, a calorie count of particular foods that the user might be eating, a clock or other type of alarm mechanism for timing the cooking or refrigeration of certain food items, etc. On the other hand, the device 10 may be removed from a strip 100 on the refrigerator, and placed next to a different strip, such as that located in bedroom, and there default to operate as alarm clock. In a still further usage, the device 10 may be removed and taken to an office and, when set on or near strips associated with or pre-identified with the office, automatically display e-mail accounts or calendar information that is typically more useful and associated with an office environment. Still further, the device 10 might be then taken off and put on a car dashboard having strips thereon which identifies the band device as being located on the car dashboard. In this case, the device 10 might provide information more useful within a car, such as executing an application that interfaces with a navigation device and acts as a slave display to the navigation device, to thereby display information provided by the navigation device to a user in a more easily accessible manner up on the dashboard. The device 10 may also or instead operate as a compass and show cardinal directions, as a clock, etc.

It is noted that while the article 10 is described as being attached to generally rectangular-shaped strips 100 in FIGS. 10 and 11, it is understood that mating fasteners that are external to the article 10 that allow the article 10 to be releasably attached to one or more other objects (and even, in some cases, allow the article 10 to be supported by the one or more other objects) may be of any desired shape or size in any desired quantity, e.g., circular, square, non-uniform, multiple small mate fasteners, a single hook, etc.

Figure 12A:
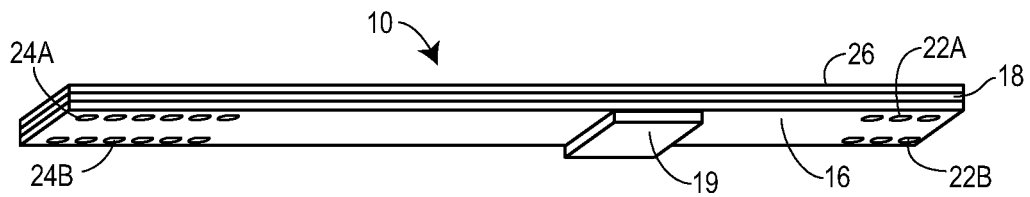
FIGS. 12A-12C illustrate various detection elements disposed on a device similar to that of FIGS. 7A and 7B.
Figure 12B:
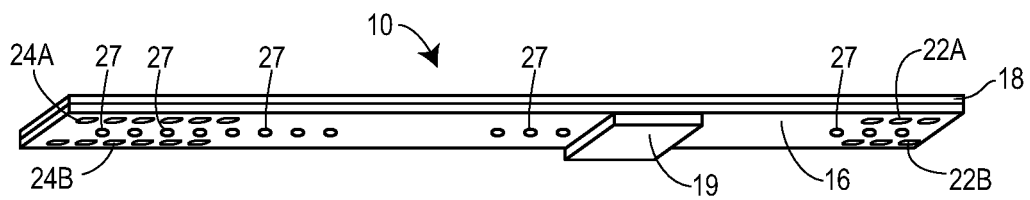
Figure 12C:
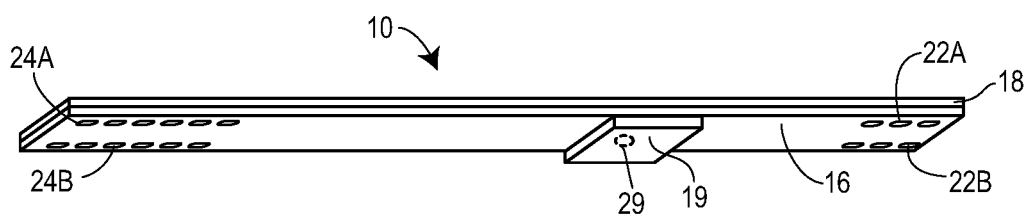

With reference again to FIGS. 7A and 7B, FIGS. 12A-12C illustrate articles similar to that of FIGS. 7A and 7B but including other various different types of detection elements that may be used for various detection purposes, including in detecting whether the band is wrapped around a user's wrist, whether the band is being supported by another object, and an orientation of the band with respect to a supporting object. In particular, FIGS. 12A-12C illustrate various examples of an article in the form of a device 10 that includes an adjustable clamp or connection mechanism for enabling the ends of the band of the device 10 to overlap one another by different distances when worn so as to enable the device 10 to be used on wrists or inanimate objects of different sizes. In addition, however, each of the various devices in FIGS. 12A-12C include mechanisms for determining or enabling the electronics module 19 of the device 10 to determine the orientation of the band with respect to the supporting object to enable better operation of the display features of the device 10. While a magnetic connection or clamping structure is illustrated in each of the devices 10 in FIGS. 12A-12C, other types of adjustable clamping or connection structure could be used instead and allow the electronics module 19 to be able to determine the orientation or positioning of the band or the display 18 while being supported by another object (e.g., when on the arm or wrist of a user, on a car dashboard, wrapped around a corner of a shelf, etc.).

More particularly, FIG. 12A illustrates an example article in the form of a device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band 16 from one end of the band 16 and two-thirds of the length of the band 16 from the other end of the band 16. In addition, the device 10 of FIG. 12A includes a flexible touch screen interface 26 disposed over the flexible electronic display 18.

FIG. 12B illustrates another example article in the form of a device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, one or more pressure sensors 27 are disposed in or on the band support 16 and are electronically connected to the electronics module 19 to communicate signals with the module 19 indicative of pressure, strain, or force applied to those locations of the band 16, thereby allowing the module 19 to determine a degree of flex or flex state of at least a portion of the band 16 or of the display 18. While the pressure sensors 27 are indicated to be disposed at various points along the length on the band support 16 on both sides of the band support 16 near the ends of the support 16, these sensors may be disposed along the entire band support 16, only on one side of the support 16, or on any suitable portion of the support 16 for the purpose of detecting pressure or force applied to the band support 16 or display screen 18. Still further, the pressure sensors 27 may be any desired or suitable pressure sensors including piezoelectric sensors, strain gauges, other force sensors, etc. Additionally, any desired number of sensors 27 may be used and these sensors 27 may be spaced apart from one another any suitable distance along the length of the band support 16. Likewise, the sensors 27 may be disposed in the center of the band support 16 (from side to side) or offset from the center. Also, more than one sensor 27 may be located at any longitudinal location along the band support 16. Indeed, the pressure sensors 27 may be disposed so that a degree of flex or flex state of any point along the band 16 and/or along the display 18 is able to be determined. Alternatively, the sensors 27 of FIG. 12B could be magnetic sensors which sense magnetic field strength, for example. In this case, the magnetic sensors 27 may detect whether one or more magnets on one end of the band (used a part of the coupling mechanism) are near to or are interacting with magnets or magnetic material on the other end of the band. Here, the magnetic sensors 27 may be used to detect the amount of overlap of the ends of the band.

FIG. 12C illustrates another example article in the form of a device 10 having an adjustable clasping mechanism in the form of one or more magnets 22A, 22B, 24A, 24B such as that illustrated with respect to FIGS. 7A and 7B and an electronics module 19 disposed or centered on the flexible substrate or band support 16 at approximately one third of the length of the band support 16 from one end of the band 16 and two-thirds of the length of the band 16 from the other end of the band support 16. However, in this case, a gyroscopic detection element 29 is dispose in the electronics module 19 and operates to detect the orientation of the band (or at least the electronics module 19 or other location at which the gyroscopic element 29 is disposed). The gyroscopic element 29 operates to detect the orientation of the band with respect to gravity or other acceleration force to which the element 29 is subjected. While a single gyroscopic element 29 is illustrated as being disposed in the electronics module 19 of FIG. 12C, this or similar elements could be disposed at other locations along the band (e.g., within the support 16 of the band) and/or multiple gyroscopic elements 29 could be disposed at various locations along the support 16.

Generally speaking, the embodiments of FIGS. 12A-12C include structure or elements, such as a touch screen interface 26 or other user interface, pressure or magnetic sensors 27 or gyroscopic elements 29 that can be used to assist the electronics module 19 in determining the environment, spatial orientation, and/or positioning of the display support 16 or the display 18 with respect to a supporting object, and/or with respect to a particular point of the supporting object. Indeed, as detection elements 52 generally are responsive to external conditions and/or to other input received at the article or device 10 and may generate signals accordingly, other components of the article or device 10 may be considered to be detection elements 52, even though such elements are referred to herein using other reference numbers, e.g., the communication port 54, the communication module 46, etc. Any one or more of such detection elements 26-29, 46, 52, 54, may be utilized either alone or in combination to detect one or more conditions to which the article or device 10 is subjected, or that is associated with the article or device 10.

For example, a positioning element 52 may be calibrated to one or more fixed locations on a user's wrist when the device 10 is wrapped around the user's wrist. This calibration operation enables the module 19 to then calibrate the display 18 to place or center display information such as display screens at particular locations with respect to the user's wrist, such as being centered on the top of the wrist, on the bottom of the wrist, on the inner side of the wrist, on the outer side of the wrist, etc. Subsequently, one or more of the detection elements 52 may be used to detect user inputs and band orientation or locations, e.g., one or more gyroscopic elements 29 may be used in conjunction with one or more pressure sensors 27 to determine a current spatial orientation of one or more portions of the band 16 and/or of the display 18. Combinations of different types of detection elements 52 may be particularly useful in automatically determining irregular or asymmetrical spatial orientations of the device 10 in various environments or at various locations, such as when the device 10 is positioned in a skewed manner around a pole or column, when the device 10 is supported by differently curved car dashboards, or when the device 10 is extended across clothing over a runner's forearm for visibility to the runner.

Examples of Automatic Detection and Resulting Actions

Figure 13:
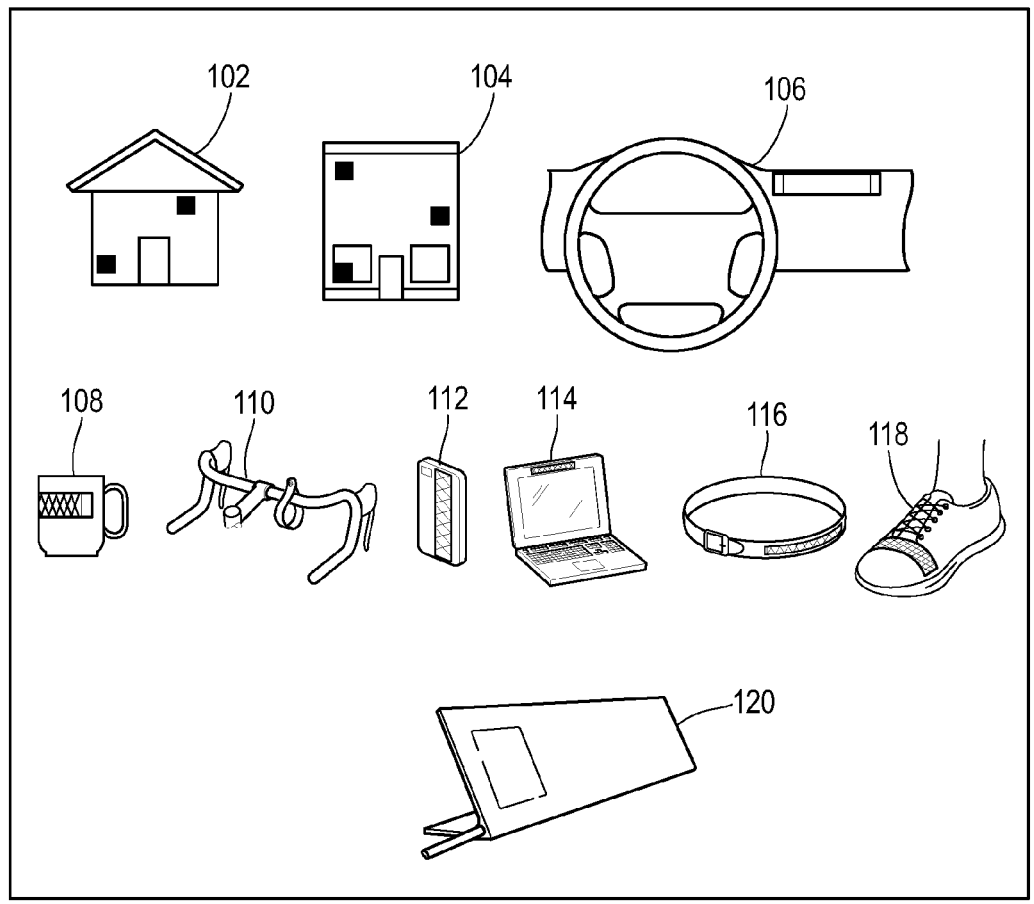
FIG. 13 illustrates the use of the device detection system of FIGS. 10 and 11 in various different places or attached to various different articles to change the default functionality of the device.

FIG. 13 illustrates, for example, various different environments in which the device 10 may be placed or located, and associated with different strips 100 as described above, including a home environment 102, an office environment 104, and an automobile environment 106, to provide different automatic or default functionality of the device 10. Additionally, as illustrated in FIG. 13, the article or device 10 can be attached to any other devices such as a coffee cup or mug 108 or other drinking vessel, a bicycle handlebar 110, a phone case 112, a computer 114, a belt 116, a shoe 118, a docking, support, or charging stand 120, or any other device on which or near which a strip 100 having a communication module is located. Of course, the default functionality may be provided by placement of the device 10 close to the strips and the identification of those strips. However, the user could still change the functionality of the device 10 to other functionality associated with other applications or displays that might be necessary or desirable at the time, instead of the default functionality associated with the detected environment. Moreover, different default functionality might be associated with different locations within each environment. Thus, for example, FIG. 13 illustrates two different locations within the home environment 102 and three different locations within the office environment 104, with each location having a different detectable strip 100 and thus a potential different default functionality.

Of course, it will be understood, that the use of the strips 100 and the identifiers associated with the strips 100, which might communicate via, for example, RFID, NFC, Bluetooth, Z-Wave, Zigbee, Wi-Fi, or any other desired communication hardware and protocols, enables the device 10 to have automatic default functionality based on its location. The detection elements 52 and other electronic devices 53 within the device 10 may also be used to determine environments and/or locations in order to provide default actions or functionality. For example, as previously discussed, the gyroscopes or accelerometers may be used to detect spatial orientations of the device 10, e.g., whether the device 10 is located more horizontally or vertically, and this orientation may be used to control the manner or direction in which information is displayed on the flexible display 18 for different environments in which the device 10 is located, for different objects that may be supporting the device 10, or for different portions of a supporting object (e.g., Mary's wrist or Mary's forearm). The detection elements 52 and devices 53 may also detect whether the device 10 is undergoing movement or acceleration, which might cause the device 10 to have different functionality or to change a display in some manner.

The user may be able to program or configure the device 10 to operate in any desired manner, including any desired default manner, based on the detected location, position, orientation, or movement of the device 10. In this case, a configuration application may be executed in a processor of a computer device to develop or configure the operation of the device 10, including the various operational modes of the device 10, the various default settings based on the mode of the device 10, the motions or actions or locations that may trigger particular modes of the device 10, inputs or gestures associated with each mode or application of the device 10 and what those inputs or gestures may mean in the context of the device 10, etc.

Figure 14:
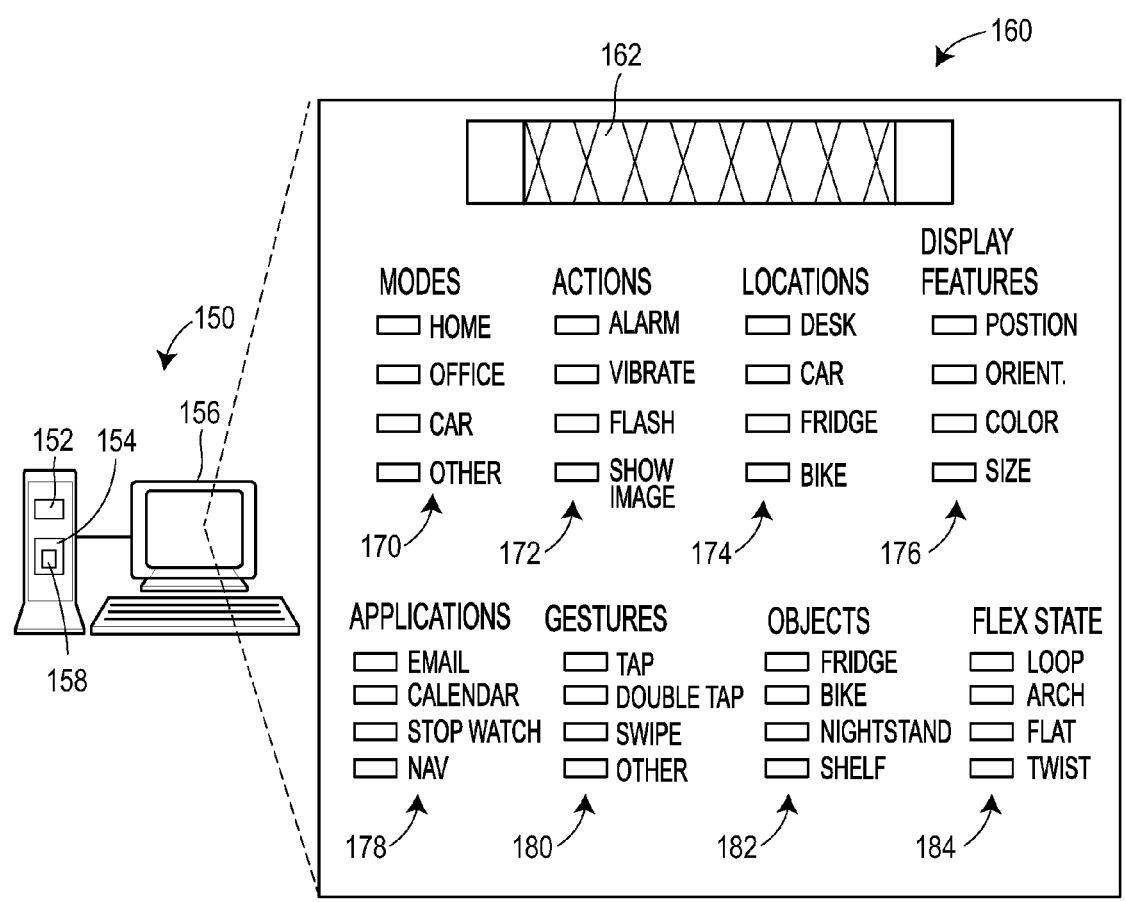
FIG. 14 illustrates an example computer system with a configuration screen that may be used to implement or specify the configuration of an article or device having automatic detection capabilities.

As an example, FIG. 14 illustrates a computer 150 having a processor 152, a memory 154 and a display 156. The memory 154 stores a configuration application 158 that may execute on the processor 152 to enable a user to configure the operation of the device 10. In particular, the configuration application 158, when executed, may produce a configuration screen such as the configuration screen 160 illustrated in FIG. 14. The configuration screen 160 may display an image of the band device 162 to illustrate what will be displayed on the display 18 of the device 10 at various times, and the manner in which this information will be displayed, such as the orientation, position on the display 18, etc.

In addition, as illustrated in FIG. 14, the configuration screen 160 may present a number of boxes or drop down menus, etc. which can be used to define various modes or other operational settings of the device 10 and the default operation of the device 10 during each such mode. For example, a user may select one of a set of mode boxes 170 to define the configuration of a particular mode of the device 10. The user may select or define a sleep mode box, an office mode box, an exercise mode box, a home mode box, a car mode, or may select an "other" box to define a new mode for which the device 10 is to be configured. Additionally or alternatively, the user may select or define one of a plurality of objects 182 to which the article 10 is able to be releasably attached and (in some cases) by which the article 10 is able to be supported, e.g., a refrigerator, a vehicle dashboard, an office wall, a garage workbench, a nightstand, etc.

Upon indicating the appropriate mode box 170 and/or the desired object 182, the user may be presented with information or options about the default and other operations of the device 10 during the selected mode 170 or while attached to the object 182. For example, the user may be able to define the actions 172, locations 174, e.g., as defined by the exterior fasteners 100 (e.g., of FIGS. 10-11), identity or description of the object 182, orientations, etc. that might be used to enter a particular mode. Thereafter, another set of menus or drop down boxes or windows may be used to enable a user to define the placement, content, orientation, etc. or other display features 176 of information to be displayed on the flexible display 18. Still further, the user may select one or more applications 178 to execute during a particular mode or while the article 10 is attached to a particular object 182 (which may or may not be different for different orientations of the article 10 while it is attached to the same object); the placement, size and area of the screen associated with at least part of the application display; the orientation of at least part of the display on the screen; the background features, borders features or other screen indicia and/or characteristics, etc. Likewise, the user may define one or more RFID tag IDs or other identifiers to define exterior locations 174 and/or objects 182 that are to be associated with or that cause the device 10 to enter or operate in a particular mode 170 and/or that cause the device 10 to launch a particular application 178. In some cases, the user may define particular modes and/or applications corresponding to different flex states 184, such as looped, bent, twisted, and/or flat. In this manner, the configuration application 158 enables the device 10 to have default functionality or one or more actions based on the functions to be provided, based on the environment in which the device 10 is located, based on a particular location of the device 10 within the environment in which the device 10 is located, based on its orientation or position around a supporting object, whether or not the device 10 is attached to itself or to the supporting object, and/or based on movement of the device 10, location 174, identity of a supporting or attached object 182, flex state 184, orientation, movement, user input, etc.

Referring now simultaneously to FIGS. 1-8 and 10-13, the input that is provided by the user via the configuration application 158 to define desired relationships, associations, or correspondences between modes 170, supporting and or attached objects 182, actions 172, locations 174, display features or characteristics 176, applications 178, and/or flex states 184 may be stored in the memory 44 of the device or article 10, e.g., as a mapping 87. In an example scenario, a user provides input to the configuration application 158 using a computer 150, and the resultant mapping 87 is downloaded or otherwise delivered from the computer 150 to the device 10 for storage in its memory 44. In another example scenario, such as when the configuration application 158 is executed by the processor 42 of the device 10, the user accesses the configuration application 158 via the configuration screen 160 while the screen 160 is presented on a touch screen controller 50 or other user interface of the device 10. In this scenario, the resultant mapping 87 is stored directly into the memory 44 of the device 10 without requiring an external device such as the computer 150. In some situations, at least a portion of the mapping 87 indicates default relationships, and/or associations for certain combinations of modes 170, supporting and or attached objects 182, actions 172, locations 174, display features or characteristics 176, applications 178, and/or flex states 184.

The processor 42 of the article or device 10 utilizes the resident mapping 87 to determine one or more actions that are to be taken when the article or device 10 is subject to a particular detected condition, and the processor 42 causes those determined actions to be executed. Specifically, when a particular condition is detected by one or more detection elements 52 of the device 10, the processor 42 receives corresponding signals from the one or more detection elements 52 and, based on the stored mapping and on the received signals, determines one or more actions that are to be taken.

In an illustrative but non-limiting scenario, an example device 10 includes magnetic fasteners 14 to allow the device 10 to be releasably attached to itself and/or to other identifiable objects. A user of the device 10 affixes different sets of external, mating fasteners 100 for the device 10 at various locations (e.g., on a dashboard of the user's vehicle, on a nightstand in the user's bedroom, on a refrigerator, at an office location, etc.), and each set of external fasteners 100 includes its own respective RFID tag 101 or identifier. Accordingly, when the device 10 is removably attached to one of the sets of attachment fasteners 100, the communication module 46 of the device 10 detects the RFID tag of the receiving external fasteners 100 and thus is able to determine the particular object or location to which the device is attached. Based on the detected RFID tag and the mapping 87 (of which at least a portion may have been defined by the user), the processor 42 of the device 10 causes certain actions to automatically be performed or executed by the device 10.

For example, as defined by the user and as indicated by the mapping 87, when the device 10 is detected as being attached to the nightstand, an alarm clock application 60 is automatically launched by the processor 42 of the device 10. The launched alarm clock application is indicated on the display 18 of the device 10, e.g., by displaying the alarm clock in a separate window, or by displaying an icon which may be later selected by the user for expansion. Subsequently, when the device 10 is detached from the nightstand, the processor 42 causes the alarm clock application to close.

As additionally defined by the user, when the device 10 is detected as being attached to the vehicle dashboard, based on the mapping associations 87, the processor 42 of the device 42 ensures that various applications 60 are launched, closed, and/or minimized. For example, the user define that in the vehicle dashboard location, a hands-free application is to be launched (if not already done so); web-browsers, email, and other applications that may be dangerous to access while driving are to be minimized or closed; and a route determination application is to be launched (if not already done so). Such actions are automatically performed when the article 10 is attached to the dashboard, and the results of the actions are indicated on the display 18 of the device 10. For example, when the attachment to the vehicle dashboard is detected, a previously-launched web-browser window may be decreased in size and shifted to allow screen space for the newly launched route determination application window, and a Blue-tooth enabled symbol or icon may be presented to indicate that the hand-free application is ready for use.

As further defined by the user, when the device 10 is releasably attached to itself and is being worn by the user, said condition is detected by the detection elements 52, for example, based on a combination of (i) a certain strain profile corresponding to the user's wrist size (which may have been previously calibrated, e.g., in a manner such as described above) that is detected by strain gauges 52, and (ii) a body temperature that is detected by a temperature sensor 52. The strain gauges and the temperature sensor send resultant signals to the processor 42, and the processor 42 utilizes the received signals and the mapping 87 to automatically cause a particular wallpaper to be presented across a majority of the display 18. Indeed, a device 10 may be calibrated (and reflected as such in the mapping 87) for several different users, e.g., by wrist size, arm size, and/or left or right wrist orientations and by using one or more positioning elements 52 disposed on the device. For example, to calibrate the device 10 with respect to a particular user, the particular user may align the one or more positioning elements 52 with particular points of his or her wrist, and then may initiate the calibration process. Accordingly, upon completion of the calibration process, the particular user identity may be automatically detectable by one or more of the detection elements 52, for example, by using the technique above or by using some other technique, and a corresponding application may be launched, e.g., a wallpaper application that presents images on display portions corresponding to the outside of the user's wrist.

Thus, the device 10 may be customized for each particular user of the device 10. For example, if the device 10 automatically detects that it is being worn by the aforementioned particular user during a time of day when stock markets are open, based on the user's previously provided definition stored in the mapping 87, the processor 42 automatically causes a scrolling stock ticker application to be launched and displayed on a portion of the screen corresponding to the underside of the user's wrist while maintaining the wallpaper on the outside of the user's wrist.

Moreover, a user may define different actions to be taken while the device 10 is in different states of flex and/or in different environments and/or locations. For example, when the device 10 is detected to be in a bent or arched state and not releasably attached to itself (e.g., as shown in FIG. 11), the user may define that a music application is to be launched instead of the wallpaper and scrolling stock ticker. In another example, when the device 10 is detected to be in a particular degree of flex that signifies that the device 10 is attached to a user's bicycle handles (e.g., as previously defined by the user), the user may indicate that an application that wirelessly connects to another device disposed on the bicycle wheel is to be launched to record mileage and speed. In yet another example, when the device is in a flat state and is in a location that is not in the user's home, an email application/icon corresponding to the user's work email account may be displayed, as defined by the user and reflected in the mapping 87.

Of course, the user-defined associations 87 described for the above example device 10 are exemplary only. A user may define associations 87 between any combination of a mode 170 of the device; an object 182 that is detected as supporting the article 10 or to which the article 10 is attached; an action 172 to be taken by the device 10 as result of one or more detected conditions of the device 10; a location 174 of the device 10 (e.g., an absolute or relative geo-spatial location and/or a location defined by the user); an addition, deletion and/or modification to one or more characteristics of at least part of content presented on the display 176; a launching, closing or modification to an application 178 hosted on the device 10; a current flex state 184 of the device 10; a current orientation of the device 10

(e.g., a current spatial orientation); and/or one or more user inputs received while the device 10 meets one or more other conditions. Furthermore, a user may modify or update one or more of the previously stored associations included in the mapping 87, e.g., by using the configuration screen 160 at the device 10 or at another computing device 150.

In another case, the configuration screen 160 may enable the user to define one or more gestures 180 associated with a particular mode or a particular application on the device 10. Thus, for example, the user might define a gesture that, when detected on the touch screen interface 26 of the device 10, such as a swipe gesture, a pinch gesture, a double tap gesture, etc. causes the device 10 to operate in a certain manner, such as to switch between modes, to change orientation of the image on the display 18, to cause portions of the displayed information to move or to appear or disappear, or to cause a particular action within an application, such as to pull up new information, etc. Additionally or alternatively, the user might define one or more gestures that are detectable by one or more of the sensors 52, such as a rapid shaking, or such as a magnitude, duration, and/or a number of squeezing forces applied to the outer faces of the device 10 when the device 10 is in a looped configuration. Thus, using the configuration application screen 160, the user may define various different gestures or may preprogram various gestures to define desired device functionality, such as switching between modes, turning on and off the device or applications, switching applications, moving images or content of particular applications on the display 18, taking actions within an application, etc. As a further example, one gesture may be defined by the user to unlock the device 10 or allow operation of the device 10 such as implementing a locking or security feature. In this case, is not necessary that the device 10 display numbers or have the user pick a set of numbers but instead, gestures might enable the user to define an action that will unlock device, such as a swipe in one direction, two taps and a swipe in a particular direction, etc. Of course, the same gesture could be used for different types of operations in different modes of the device 10 or with different applications implemented by the device 10, and any combination of gestures might be used with any combination of applications or modes to enable different functionality or to enable the functionality of the device 10 be programmed in various manners. Once configured as such, the configuration data as selected by the user via the configuration application 158 on the computer 150 can be downloaded to the device 10, either wirelessly or via a wired connection, and stored in the memory 44 thereof and then be used by the operating system of the device 10 to operate.

Thus, the various different electronic devices or components disposed in or shown in the electronics suite 38 of FIG. 8 may be used in conjunction with one another in various different manners to provide a whole host of functionality for the dynamically flexible article or device 10, which might be beneficial in various different uses of that article. However, it is noted that only some of these uses are described in detail herein, and other additional or alternative uses may be possible.

Figure 15:
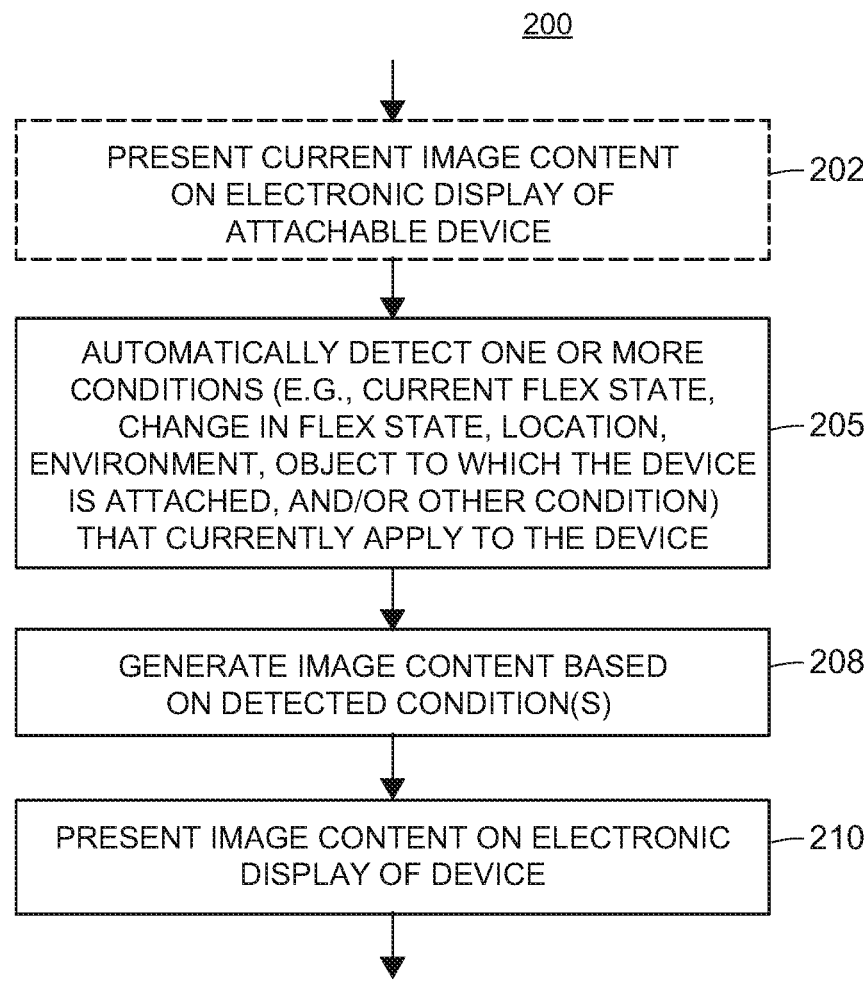
FIG. 15 illustrates an example method of presenting information at an attachable article or device that has one or more detection capabilities.

FIG. 15 illustrates an example method 200 for presenting information at an attachable article or device that has automatic detection capabilities, such as an embodiment of the article or device 10 discussed herein. At least a portion of the method 200 may be performed by one or more processors of the attachable article or device, such as by the processor 42 of the device 10, in some configurations. In other configurations, at least a portion of the method 200 may be performed by one or more processors of one or more other devices, e.g., one or more remote computing devices such as a master device that directs the behavior and actions of the attachable article, a server or bank of servers, a computing cloud or computing network, etc. For example, at least a portion of the method 200 may be performed by one or more processors of other devices by executing computer-executable instructions stored on one or more memories that are excluded from and remotely located from the attachable article (e.g., a remote data storage entity, a data bank, cloud data storage, etc.). Each of the one or more other devices may be in communicative connection with the attachable article via one or more wireless communication channels.

However, for clarity of discussion and not for limitation purposes, the method 200 is generally discussed below with respect to the device 10 of FIG. 1 and the electronics suite 38 of the device 10 of FIG. 8, which includes the processor 42 and the detection elements 52.

The method 200 may include causing current image content to be presented on an electronic display of the device (block 202). For example, the processor 42 causes image content corresponding to an executing application 60 to be presented on the display 18 of the device 10, e.g., via the display drivers 48. In some scenarios, the block 202 may be omitted as denoted by the dashed box, for example, upon boot-up or initialization of the device 10 prior to displaying any image content at all on the display screen.

The method 200 includes automatically detecting (e.g., by one or more of the detection elements 52 of the device 10) a degree of flex of at least a portion of the device 10 (block 205). In an embodiment, one or more detection elements 52 of the article or device 10 may detect a degree of flex at one or more different points of the flexible display 18, at one or more different points of the support 16 of the flexible display 18, and/or at one or more different points of the band 12. The detected degree of flex (or the combination of multiple detected degrees of flex at multiple points) may be associated with a particular flex state. For example, degrees of flex from 0° to 1° may correspond to a flat flex state, degrees of flex from 1° to 20° may correspond to a first bent flex state, degrees of flex from 20° to 45° may correspond to a second bent flex state, etc. As such, the one or more detection elements 52 may detect a flex state of one or more different points of the flexible display 18, the support 16 of the flexible display 18, and/or the band 12. Additionally or alternatively, the one or more detection elements 52 may detect a change from a first flex state into a second flex state at one or more different points of the flexible display 18 of the support 16 of the flexible display 18, and/or of the band 12, e.g., from a flat state to a bent state, from a first bent state to a second bent state, from any bent state to a flat state, tec. As such, changes in flex state may cause the flexible electronic display 18 to have a greater or lesser degree of flex at various points along the display 18.

At block 208, the method 200 includes causing, based on the detected degree of flex or flex state of the device 10, image content to be generated. The generated image content may be initial image content, such as when the device 10 is booted up, initialized, or re-started. In some situations, the generated image content may be updated image content, e.g., when the device 10 was presenting image content on its display 18 prior to the block 208. The updated image content may include an addition of other image content to the current image content, a deletion of at least some of the current image content, and/or a modification of the appearance of at least some of the current image content. For example, based on the detected change in the degree of flex of the device 10, the updated image content may include an indication of a newly launched application; the updated image content may exclude an indication of a previously launched and now closed application, and/or the updated image content may include a modification to at least a part of the current image content (e.g., a change in size, font, color, position, orientation, and/or a hiding or un-hiding of at least some of the current image content). At a block 210, the image content is caused to be presented on at least a portion of the electronic display 18.

It is noted that in some embodiments, at least some (if not all) of the automatic detection of the degree of flex or of the flex state (block 205) may be performed by one or more detection elements that are excluded from (e.g., that are not included in or disposed in or on) the article or device 10. In an example scenario, one or more environmental sensors may not be disposed on the article or device 10, but may be disposed in an environment in which the article or device is located. For instance, an environmental sensor may be an image processing system configured to capture an image of the article or device 10 and determine the degree of flex of the article 10 based on the captured image. Such environmental sensors may detect or determine the degree of flex or flex state of the article or device 10, and may indicate the determined degree of flex to the article or device 10 and/or respective image content accordingly, e.g., by signaling the device 10. In some cases, the environmental sensors may indicate the determined degree of flex of the article or device 10 to one or more remote computing devices, and the one or more remote computing devices may determine the respective image content to be displayed on the article or device 10, and signal or direct the article or device 10 to display the respective image content accordingly (block 208).

In some embodiments of the method 200, at the block 205, instead of or in addition to detecting a degree of flex or flex state of the device 10, the block 205 includes detecting one or more other conditions to which the device 10 is subjected or that currently apply to the device 10. Detectable conditions may include, for example, the presence of an object that is currently supporting the device 10, an identity of the supporting object, a contextual environment and/or location in which the device 10 is currently located, an orientation (e.g., a spatial orientation, which may be a two-dimensional or a three-dimensional spatial orientation) of the device 10, a change in flex state of the device 10, a signal received from another device, a user input received at the device 10, a movement or motion of the device 10, and/or other conditions. Typically, but not necessarily, the device 10 may not require a user to enter user input at a user interface of the device 10 in order for the device 10 to determine one or more of these conditions. Rather, the device 10 may utilize signals generated by one or of the other detection elements 52 to automatically determine one or more of these conditions.

For example, the block 205 may include automatically detecting and/or determining an object by which the device 10 is currently being supported (and, optionally, to which the device 10 is currently and releasably attached), e.g., by receiving a communication from the strips 100 of FIGS. 10 and 11, by receiving some other communication from the supporting object via the communication port 54, or by processing signals generated by other detection element 52 included in the device 52. Additionally or alternatively, the block 205 may include automatically detecting a particular identity of the supporting object (e.g., whether the device 10 is surrounding and being supported by Mary's wrist, Mary's arm, Mary's bike handle, John's wrist, John's bike handle, etc.), e.g., based on signals provided by temperature, pressure, and/or orientation, and optionally based on previously performed calibration and configuration procedures.

Further, the block 205 may additionally or alternatively include detecting a current environment in which the device 10 is located, and/or a particular location within the current environment at which the device 10 is currently disposed. Generally, the environments and/or particular locations within the environments are particularly defined or specified by a user of the device 10, e.g., by using the configuration screen 160 or other suitable mechanism. Thus, possible environments and/or locations at which the device 10 may be disposed or located are contextual, rather than geo-spatial or absolute. To illustrate, contextual environments may include, for example, My Home Office, My Work Office, My Kitchen, My Bedroom, My Car, My Bicycle, My Wrist, Joe's Wrist, etc. Contextual locations within contextual environments may include, for example, My Desk in My Work Office, My Bookshelf in My Work Office, My Nightstand in My Bedroom, On the Wall Next to My Mirror in My Bedroom, etc. Thus, while the device 10 may be capable of automatically determining an absolute geo-spatial location or area in which is it located (e.g., by receiving or listening to signals from GPS satellites, cell phone towers or other radio-frequency (RF) sources to determine the device's geo-spatial latitude, longitude, altitude, etc.), the device 10 may additionally or alternatively be capable of automatically determining the contextual environment and/or contextual location within the contextual environment at which the device 10 is currently located without utilizing general, geo-spatial locational data being transmitted or broadcasted by the GPS satellites, cell phone towers, and other RF sources. Instead, the device 10 may automatically determine its current contextual environment and/or contextual location based on signals generated by one or more detection elements 52 of the device 10, e.g., temperature sensors, RFID communication module, gyroscope, pressure sensors, etc., examples of which were discussed above.

Still further, the block 205 may additionally or alternatively include detecting a current spatial orientation of the device 10, in particular, with respect to a supporting object. For example, the device 10 may detect its current three-dimensional spatial orientation to determine whether it is surrounding Mary's bike handle (narrower looped configuration) or Mary's arm (wider looped configuration). In another example, the device 10 may detect its particular orientation on Mary's arm (e.g., am I wrapped around Mary's arm or laid flat and attached to a sleeve covering Mary's arm.

Moreover, in some embodiments of the method 200, instead of or in addition to causing updated image content to be generated (block 208) and causing the updated image content to be presented on the display (block 210), the method includes determining one or more actions based on the detected condition(s), and causing the one or more actions to be executed by the device 10. For example, the method 200 may include launching a new application, closing a previously launched application, modifying the behavior of a presently launched application, causing one or more of the secondary devices 53 to activate. When utilized with electronic sheets, the method 200 may include, for example, causing light to be emitted from or reflected by the optoelectronic elements in a particular pattern, or allowing various sensors or solar cells to receive input. In other examples, the method 200 may include causing the article or device 10 to enter into one or more different operational modes (e.g., locked, unlocked, power-save, power-off, limited functionality, full functionality, touch screen activated or deactivated, or some other operational mode).

Examples of Display Area Optimization

Figure 16:
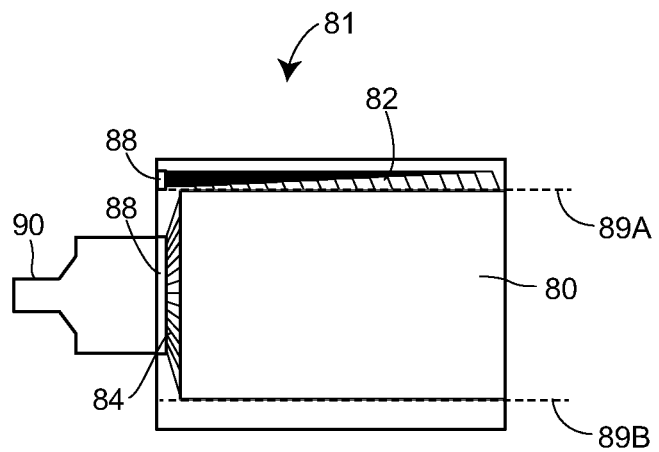
FIG. 16 illustrates a top view of a backplane layer of a flexible electronic display as formed on a flexible display substrate.

It may be desirable to manufacture an electronic display in a manner that maximizes the amount of the display area space viewable on a surface layer of an article or device in which the electronic display is included, such as on a surface layer of an article or device that has automatic detection capabilities (e.g., the device or article 10). For example, it may be desirable to maximize the viewable display space of the electronic display 18 of the article 10, i.e., the area on the display 18 on which text and/or images are presentable and viewable to a user. In this regard, FIG. 16 illustrates, in an exemplary but non-limiting manner, a base or backplane layer 81 of the flexible display 18 as manufactured. Generally speaking, the backplane of a flexible display 18 comprises a surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component. Both the backplane substrate of the backplane component and the frontplane substrate of the frontplane component may be flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink capsules, microcapsules, or microcups or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 18 may be built in layers, e.g., starting with the backplane and ending with attaching the frontplane substrate.

As illustrated in FIG. 16, the display area 80 formed on the backplane component 81 of such a display 18 may be generally rectangular in shape and have a large aspect ratio, e.g., an aspect ratio where the length of the display area 80 is at least two times greater than the width of the display area 80, and, in some configurations, is at least five times greater than the width. The display area 80 includes any number of pixels or pixel elements, each of which may be connected to at least two connecting lines (e.g., electrical lines, lead lines, electrodes, connecting lines, connectors, etc.) for energization thereof. The electrical lines or connecting lines are disposed at the pixel elements and exit from the display area 80 via various sides of the display area 80. Generally, each line services a particular row or column of pixel elements. As such, in FIG. 16, the connection lines are illustrated as a first set of connecting lines 82 coming from one of the longitudinal sides and including a line 82 for each of y columns of pixels of the display area 80 (e.g., a set of longitudinal connecting lines), and a second set of connecting lines 84 coming from one of the transverse sides of the display area 80 and including a line 84 for each of x rows of pixels of the display area 80 (e.g., a set of transverse connecting lines). As is known, energization or connection between a particular connecting line 82 of a column $y_n$ and a connecting line 84 of a row $x_m$ of the display area will energize or turn on that corresponding pixel, and, as such, the corresponding pixel may be referred to using its two-dimensional coordinates, e.g., $(x_m, y_n)$ or $(y_n, x_m)$. In any event, as illustrated in FIG. 16, the sets of connecting lines 82, 84 exit from the display area 80 along the same backplane substrate 81 and are connected to one or more multiplexer or IC driving circuits 88, which may be formed, for example, on or near the edge of the backplane display substrate 81. The driving circuits 88 may be integral with the display driver 48 of the electronics suite 38, or the driving circuits 88 may be disposed separately from but nonetheless communicatively connected to the display driver 48, e.g., the driving circuits 88 are disposed on a flexible connector 90 connecting the backplane layer 81 to the electronics module 19. Typically, the flexible connector 90 is not integral with the backplane layer 81, but instead is a separate element that couples to the backplane layer 81 to communicate with the electronics module 19 and components included therein, such as the display driver 48.

Figure 17:
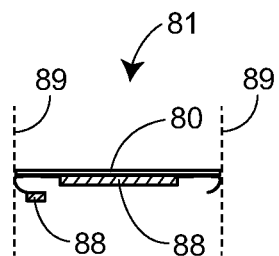
FIG. 17 illustrates a manner of bending the flexible display substrate of FIG. 16 to form a flexible display with a maximal display area on a surface.

FIG. 17 illustrates a manner of bending or folding a flexible display, e.g., of bending or folding of at least one substrate of a flexible display. The display may be, for example, the display 18 of FIG. 16 or another flexible display. Generally, referring to the display 18 as an illustrative but non-limiting example, the display 18 may be bent or folded so as to form a display that includes a maximum amount of display area 80 on the band 12 at which the display area 80 is viewable and to minimize the area of edges surrounding the display area 80 that are visible to the user. (For ease of viewing, the flexible connector 90 is not shown in FIGS. 17-18.) In FIG. 17 in particular, the bending may occur along the dotted line 89A, illustrated in FIG. 16, so as to fold over the backplane sections adjacent to the longitudinal side of the display area 80 at which the connecting lines 82 are disposed. This folding enables the connecting lines 82 to be bent down and under the display area 80, and enables the multiplexer or IC driving circuits 88 to be connected to the display driver 48 (disposed in, for example, one of electronics module 19 not shown in FIGS. 16 and 17) via separate electronics or electrical connections. Thus, as illustrated in FIG. 17, which depicts a cross-sectional end view of the flexible display 18, the flexible display 18 so formed and bent enables the separate longitudinal display lines 82 to be connected to different multiplexer or driving IC circuits 88, which are ultimately connected to the display driver 48 of FIG. 8, in order to energize the rows and columns of pixel elements of the flexible display 18 to thereby drive the display 18. As the fold 89A occurs along the edge of the display area 80, the areas of the backplane substrate of the flexible display 18 that are used to form the connecting lines 82 are disposed in a different plane than, and are disposed in some cases under the display area 80, and thus do not require the backplane substrate 81 to extend out towards the sides of the band 12 much beyond the edges of the display area 80. This configuration, in turn, enables the maximal amount of viewable display area to be disposed on the top portion of the band 12 which maximizes the viewable or usable area of the band 12 at which the display 18 can present viewable images. In some embodiments, the backplane substrate 81 may also be bent along the dotted line 89B along the opposite longitudinal side, even if the opposite longitudinal side does not support any electrodes or connectors thereon, e.g., for ease of manufacturing and/or for aesthetic considerations.

Figure 18:
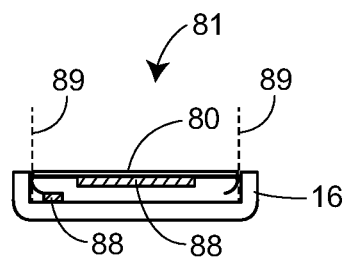
FIG. 18 illustrates an end view of a flexible display as provided in FIG. 17 disposed within a flexible support with side protection structure.
Figure 19:
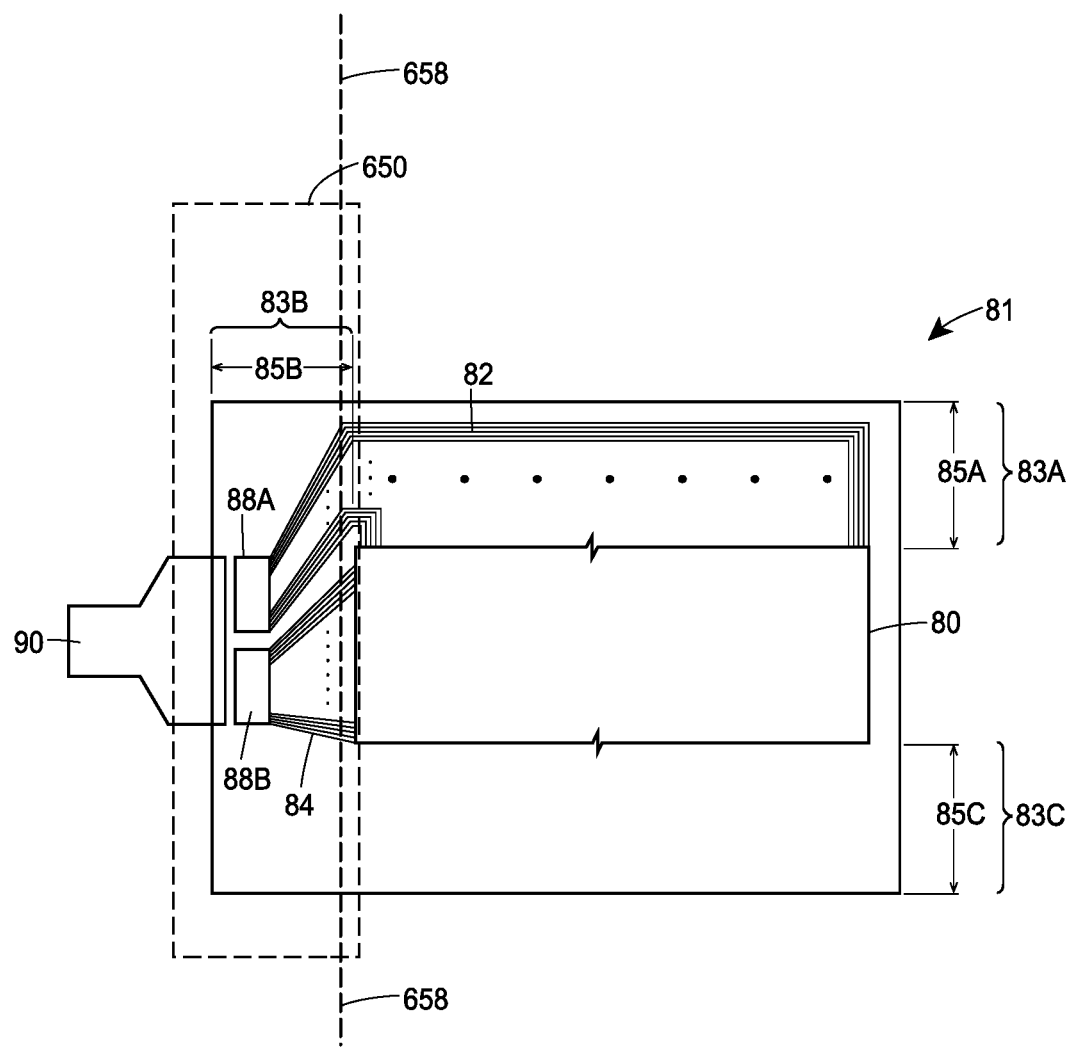
FIG. 19 illustrates a top view of a backplane layer of a flexible electronic display as formed on a flexible display substrate.

FIG. 18 illustrates a cross-sectional view of the display 18 bent as illustrated in FIG. 17 and disposed in or on a flexible support 16 of the band 12, with the display 18 having the maximal display area 80 thereon disposed up to the edges of the band of the device 10. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible article or device 10.

In some cases (for example, due to the size of the display area 80, the material composition of the display 18, etc.), bending the backplane layer 81 so that the electrodes or connectors 82 are under the display area 80 may cause undesirable effects, such as interference between various electrical components of the backplane layer 81. Further, in order for the flexible display 18 to be as dynamically flexible as possible, the impact of the more rigid portions of the backplane layer 81 (e.g., the portions which support the less-flexible or rigid driving circuits 88) on the flexibility of the display area 80 is desired to be minimized. Still further, a minimum border extending from the display area 80 and viewable to a user may be necessary to seal the top and bottom layers of the flexible display 18, e.g., by using an environmental barrier material for the frontplane and backplane substrates and the seal, or by some other means. In electrophoretic displays, for instance, the required width of a border for sealing is typically around 2 to 6 mm.

In such cases, an alternate configuration of the backplane layer 81 that maximizes the amount of area on the band 12 at which the display area 80 of the display 18 is viewable may be utilized. FIG. 13 illustrates such an example alternate configuration. Similar to the configuration illustrated in FIG. 9, the connecting lines 82, 84 and the driving circuits 88A, 88B are arranged on the backplane layer 81 in a single layer, and an optional flexible connector 90 couples the driving circuits 88 to the display driver 48 (which is not shown in FIG. 13). In FIG. 13, though, a transverse portion 83B of the backplane layer 81 supporting the driving circuits 88 is bent into a plane different from (and in some cases, underneath or parallel to) the display area 80, e.g., along the dotted line 658, while a longitudinal portion 83A of the backplane layer 81 supporting the longitudinal connectors 82 remains in the same plane as the display area 80. This bending configuration allows for maximum, continuous dynamic flexion of the display area 80, as the less flexible zone 650 of the band 12 corresponding to the relatively inflexible (e.g., rigid) driving circuits 88 is limited to a short end of the display area 80. Additionally, with this example configuration, undesired effects such as interference may be reduced.

Of course, techniques for optimizing a display area of an electronic display, any one or more of which may be equally applied to optimizing an optoelectronic area of an electronic sheet, are not limited to only the above examples. Indeed, any suitable technique or techniques for optimizing display areas may be used in conjunction with the articles/devices having automatic detection capabilities disclosed herein. For example, any one or more of the techniques for optimizing electronic display areas as discussed in PCT (Patent Cooperation Treaty) Application No. PCT/US14/50972 (which is entitled "OPTIMIZATION OF ELECTRONIC DISPLAY AREAS" and filed on Aug. 13, 2014, the entire contents of which are hereby incorporated by reference) may be utilized in conjunction with the articles/devices having automatic detection capabilities disclosed herein.

Examples of Connection Mechanisms for Dynamically Flexible Articles or Devices

Referring now to FIGS. 1-7 and 10-12, it is noted that while the previous sections generally describe the article 10 as being releasably attached to itself and/or to other objects using metal or magnetic fasteners 14, it is understood that the techniques, concepts and features described with respect to the metal or magnetic fasteners 14 equally apply to other types of fasteners 14, e.g., hook and eye connectors, snaps, buckles, temporary adhesives, electrostatic materials, or other suitable materials and/or configurations of connectors. Further, it is noted that in some embodiments, one or more of the fasteners 14 that allow the article 10 to be releasably attached to itself (e.g., in a looped configuration) also allow the article 10 to be releasably attached to other objects. On the other hand, in some embodiments, one or more first types of fasteners 14 allow the article 10 to be releasably attached to itself, while one or more different types of fasteners 14 allow the article to be releasably attached to other objects. Indeed, in embodiments in which the article 10 includes a connection structure that utilizes one or more mechanical connectors in combination with one any of the above-described magnetically coupled connection structures, the connection structure can provide both a magnetic connection and a mechanical connection, and, thus, the connection structure provides a stronger and more durable connection between the end pieces 14 of the article 10 or between the various portions of the band or support 16. In these cases, the magnetic connectors can, but need not, be disposed near or proximate to the mechanical connectors.

As an example, FIG. 20 illustrates an example dynamically flexible article 10 in the form of a band having an electronics module 19 disposed in the center of the band 12 with a non-magnetic clasp arrangement used at the ends of the flexible support 16 to secure the article 10 to a wrist of a user or other mounting or supporting object, such as a bicycle handle. In this case, a loop or buckle member 30 is attached to one end of the flexible support 16 and hook and loop pads 30 and 32 (one being hook material and the other being loop material) are attached to the end portions of the band 12. Here, one end of the band portions 12 may be looped through the buckle 28 and bent back to enable the hook and loop material pads 30 and 32 to contact each other and thus secure the band 12 to a user's wrist or other structure. Of course, while the electronics module 19 is illustrated as being located in the center of the band portion 12, the module 26 could be located on one of the ends as well, such as near the buckle 28. Moreover, use of the buckle 28 in FIG. 20 is not necessary. Instead, hook and loop pads may be placed at opposite ends of the band 12 to enable a connection between the two ends of the band 12.

FIGS. 21A-21C illustrate a dynamically flexible article or device 10 having yet another type of mechanical connection structure in the form of a button based or snap-type connection structure. As illustrated in FIG. 21A, the device 10 includes a band 12 having a flexible display 18 disposed on a flexible support 16. In this case a hole member 27 forming one side of a snap-fit connector and a snap member 29 forming the other side of a snap fit connector are disposed on opposite ends of the band portion 12. The snap member 29 snaps or slides into the hole member 27, which may have flexible material such as rubber disposed around a center hole to better interact with the snap member 29 and retain the snap member 29 therein. As illustrated in FIGS. 21B and 21C, the band 12 may be bent to enable the snap member 29 to side into either side of the hole member 27 to thereby create a circular band as illustrated in FIG. 21B or a tear-drop shaped band as illustrated in FIG. 21C. In this case, the electronics module 19 that drives the display 18 could be located near one of the ends or in the center of the band portion 12 of FIGS. 21A-21C or at any other desired location on the band 12. As will be understood, the embodiments of FIGS. 7A, 7B, 20, 21A-21C are provided to illustrate that other connection structure, besides or in addition to a magnetic based connection structure, can be used on the ends of the band 12 to enable connection of the ends of the band 12 around a wrist or other mounting member, if so desired, as well as to illustrate that the electronics module 19 can be located in any desired position on the band 12.

Figure 22A:
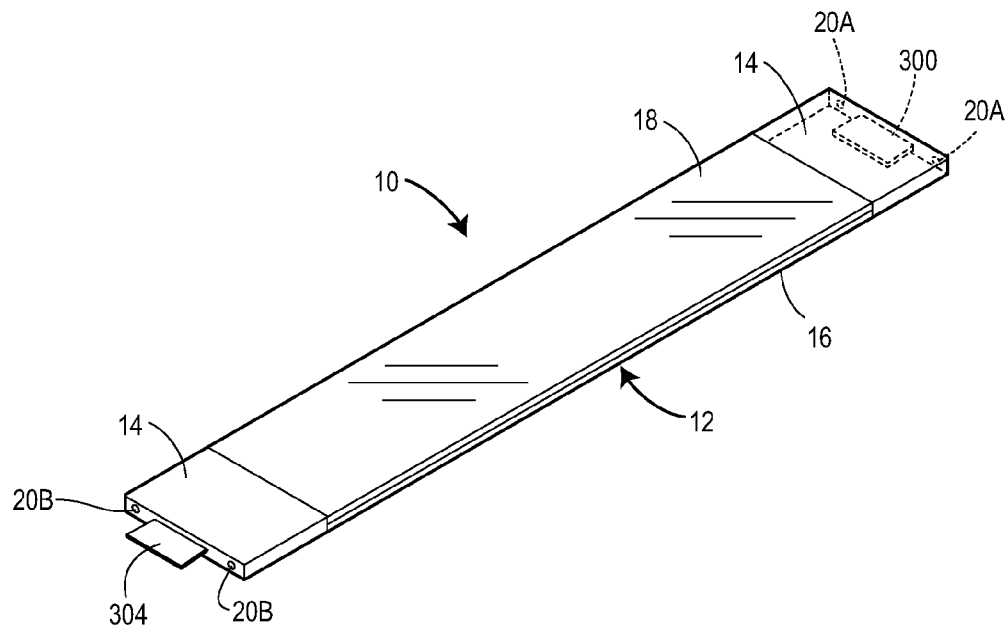
FIGS. 22A and 22B illustrate an example attachable article in the form of a band having a flexible display and a connection structure that includes magnets and a tab and recess arrangement.
Figure 22B:
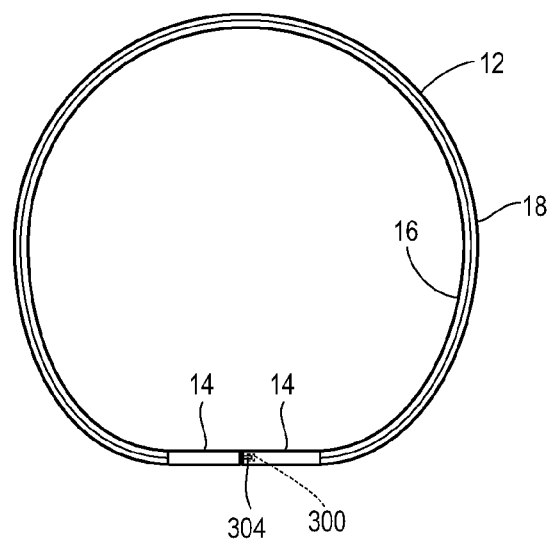

Of course, other connection structures could be used as well including, for example, a slide in snap-fit buckle. For example, in another embodiment illustrated in FIG. 22A, the flexible attachable article 10, again illustrated in the form of a band, includes a similar band portion 12 and end pieces or clasps 14. However, in this embodiment, the article 10 has a connection structure that not only includes magnets 20A, and 20B disposed at the lateral ends of the band portion 12, as described above in connection with FIGS. 1 and 2, but also includes mechanical connectors that can effectuate a mechanical connection between the end pieces or clasps 14, such that the clasps 14 can be mechanically and magnetically connected to one another when the device 10 is bent, as illustrated in FIG. 22B, to form a circular or oval band. In FIGS. 22A and 22B, the mechanical connectors take the form of a recess 300 that is formed or defined in the longitudinal or lateral end of one of the clasps 14 and a tab 304 that is formed or defined on, and extends laterally outward from, the longitudinal or lateral end of the other one of the clasps 14. The tab 304 can be disposed or inserted into the recess 300 to mechanically connect the longitudinal ends of the opposing clasps 14 to one another when the flexible band 12 is bent to be disposed around or on a wrist, a leg, a bicycle handle bar, etc., for example. At the same time, the magnets 20A and 20B, by virtue of being in proximity to one another as shown in FIG. 22B, create or provide a magnetic force that also serves to hold the clasps 14 together. In this manner, the connection structure described in connection with FIGS. 22A and 22B can provide a stronger, more durable connection when the clasps 14 are connected in an end-to-end arrangement so that the device 10 is clasped in a continuous circle or oval with a fixed or predetermined length.

Examples of Limiting the Bending of Dynamically Flexible Displays

It may be important to limit in the manner in which the flexible support 16 can bend or flex so as to protect the flexible display 18 and/or the touch screen interface 26 of FIGS. 1-22, as well as to provide or protect the edges of those devices, which might be subject to impact if the dynamically flexible article or device 10 is hit from a lateral side. FIG. 23A illustrates a top view of the flexible support 16, showing the flexible display 18 disposed thereon. In this case, the flexible display 18 is disposed on top of the flexible support 16 over the center portion of the support 16, while the edges of the support 16 extend out transversely towards the sides of the device 10 beyond the flexible display 18 at least a little bit. This additional area of material of the support 16 may be used to protect the flexible display 18 from being bent or torn in the case of a side impact to the device 10, as this material will operate to blunt or absorb some of that impact. As illustrated in FIG. 23B, which provides a cross-sectional view of the device 10 of FIG. 23A, the flexible support 16 can be thicker in the area at the edges of the device 10 and may extend upward to be even with or disposed above the lateral or transverse sides of the flexible display 18, to provide additional side impact protection for the flexible display 18. In this case, as illustrated in FIG. 23B, the display 18 is seated in a space or crevice formed within the center of the support 16, wherein the support 16 has sidewalls that extend above or up against the edges of the flexible display 18, in order to provide side impact protection to the display 18. In some cases, the edge or sidewalls of the support 16 that extend upward to protect the edges of the flexible display 18 and/or the touch screen interface 26 (if present) may be formed with stitching when the support 16 is made of leather for example. In another embodiment, illustrated in FIG. 24, additional side impact protection is provided by a wire or other harder, rigid or semi-rigid material 60 (having a density greater than that of the flexible support material 16, but that is still flexible) disposed within or along the flexible support 16 along the edges of the flexible display 18 near or adjacent to the sides of the flexible display 18. As illustrated in FIG. 24, the wires 60 are provided within the flexible support material 16 and extend along the edge of the band portion 12 next to or adjacent the transverse sides of the flexible display 18 to provide superior support or edge protection for the display 18 in the case of a side impact to the device 10. Of course, other types of edge protections besides those illustrated in FIGS. 23 and 24 can be used to protect the edges of the of the flexible display 18.

FIGS. 25-35 illustrate structures that can be used to protect the flexible display 18 and the touch screen interface 26 (if it exists) by limiting the certain flexing, bending and/or torsional movement of the flexible support 16, and thus the display 18 disposed thereon, to certain predefined bending motions or ranges. In particular, because the flexible display 18 is formed as a set of separate substrates having different electronic components formed or etched thereon, as will be described herein, certain types of movement or bending motions may cause damage to the flexible display 18 by causing these layers to delaminate or come apart from one another. In particular, while it is generally possible to flex or bend the band portion 12 in one direction (e.g. around a wrist to form a circular band such as that shown in FIGS. 2 and 4) without delaminating, buckling, cracking or otherwise damaging the separate layers of the flexible display 18, it is typically not generally desirable to be able to flex or bend the display 18 in multiple different directions, such as forming a circular band with the flexible display 18 facing the inside of the band and twisting the band, as doing may cause the layers of the flexible display to delaminate from one other and thus stop functioning, or may be undesirable for usability of the article 10.

More particularly, while it is desirable to bend the flexible support 16, as illustrated in FIGS. 2 and 4, such that the display 18 faces towards the outside of a circular ring (i.e., wherein the display surface of the flexible electronic display through which the driving signals is viewable is bent to be convex and the surface of the flexible electronic display disposed near or adjacent the support structure is bent to be concave), it would be disadvantageous, in some embodiments, to bend the device 10 too far in the opposite manner (referred to herein as a counter-rotational direction), i.e., with the display 18 on the inside of the ring (wherein the display surface of the flexible electronic display through which the driving signals is viewable is bent to be concave and the surface of the flexible electronic display disposed near or adjacent the support structure is bent to be convex).

Still further, it would be undesirable to provide too much flexing of the sides of the flexible display 18 around the longitudinal axis of the band 12 or too much torsional bending on the flexible display 18, wherein such torsional bending rotates one of the clasps 14 around the longitudinal center line of the band 12 with respect to the other of the clasps 14, thus forming a helical structure in the band 12. In this case, torsional rotation would occur when one end of the flexible display 18 is rotated in one direction while the other end of the flexible display 18 is rotated in the other direction, such as by rotating one of the end pieces 14 about the center longitudinal axis of the band 12 in a clockwise direction while simultaneously rotating the other end piece 14 about the center longitudinal axis of the band 12 in a counter-clockwise direction simultaneously. Again, as will be understood, too much of such a bending movement could delaminate the flexible display 18 and/or otherwise damage the flexible display 18.

As such, FIGS. 25-35 illustrate various mechanisms for limiting the bending or flexing motion of the flexible support 16 of the device 10 to the desired bending motions like those illustrated in FIGS. 2, 4, 7A, 11, 20, 21, and 22B, while limiting undesirable bending motion such as, for example, longitudinal flexing and torsional or counter-rotational flexing of the display 18. In particular, these or other mechanical structures can be used to limit the bending motion of the flexible substrate to a minimal radius of curvature (e.g., in the rotational direction, such as when the display surface of the flexible electronic display through which the driving signals is viewable is bent to be concave and the surface of the flexible electronic display disposed near or adjacent the support structure or flexible band is bent to be convex) to be greater than or equal to the minimum critical bending radius of the flexible electronic display. Here, the minimum critical bending radius of the flexible electronic display is the minimal or smallest bending radius at which further bending will impair or destroy the functionality of the flexible electronic display by, for example, breaking the electronic connections or other components in the flexible electronic display.

As shown in FIGS. 25A and 25B the support 16 can include a series of spacers or bars 70 disposed between sections of the band portion 12 from one side of the band 12 to another side of the band 12 (i.e., oriented transversely) across the band portion 12. The spacers 70 operate to limit or reduce the amount of torsional rotation that is able to be applied to the substrate 16 and also limit the amount of longitudinal rotation that can be applied to the band 12. More specifically, the material, size, number, and/or spacing of the spacers 70 within the flexible support 16 may be varied to define, and thus limit, the amount of torsional motion that can be applied to the support 16. To this end, the spacers 70 can be made of a material, such as a rigid or semi-rigid material like hard plastic or metal that is stiffer or more inflexible than the material from which the band 12 is made. In other embodiments, the spacers 70 and the support 16 can be made of the same material, but the spacers 70 may comprise a thicker or denser configuration of that material. In yet other embodiments, the support 16 may be made of a bendable metal that bends easily at large radii of curvatures (i.e., small bending angles) but that increases in stiffness or non-elasticity at smaller radii of curvatures (i.e., larger bending angles). The spacers 70 may be separately formed and then disposed within or on the support 16 or may be manufactured as part of the support 16. For example, the spacers 70 can be molded on the underside of the band portion 12. In FIG. 25A, the spacers 70 are evenly spaced across the band portion 12, such that all portions of the band portion 12 are subject to the same bending or flexing limit. Alternatively, one or more of the spacers 70 can be spaced at different distances from one another across the band portion 12. In FIG. 25B, the spacers 70 are spaced at different distances across the band portion 12 (i.e., d2 is greater than d1), such that different portions of the device 10 (e.g., the sides) can be bent or flexed more than other portions of the device 10 (e.g., the top and the bottom). The spacers 70 may also operate to absorb side impacts to the band 12. For example, the support 16 can have a width that is at least slightly larger than the width of the flexible display 18, such that the spacers 70 also act as side impact protection structure.

Figure 26:
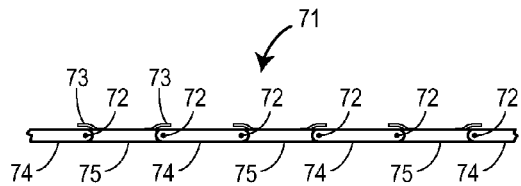

In FIG. 26, the interconnected slats or bars have alternating flat members 74 and flat members 75 (which are generally and categorically referred to herein as members 71) with wings or protrusions 73 on the edges thereof, wherein the wings 73 are disposed above the adjacent flat members 74. The flat members 74 are pivotally connected to the flat members 75 so that the wings 73, when disposed above a flat member 74, prevent or at least limit rotation about the pivot point 72 in one direction while allowing such rotation in the opposite direction.

Of course, if desired, the shape and/or curvature of the wings 73 can be varied to permit more or less rotation about the pivot point 72. In some cases, it may be desirable to vary the shape and/or curvature of only some of the wings 73. For example, wings 73 that permit greater bending can be used at or along sections of the band 12 (e.g., the sections disposed along the sides of the wrist) where more curvature is desirable.

Figure 27:
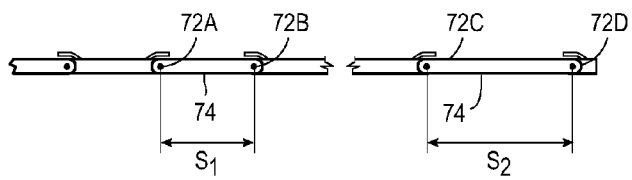
Figure 28:
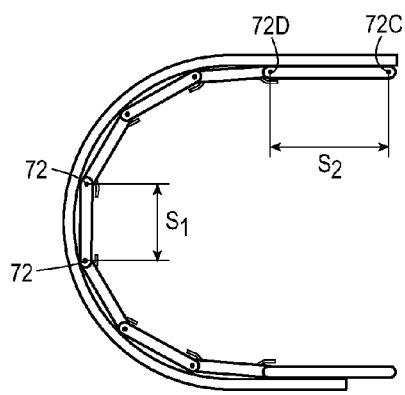

In some cases, the spacing between the pivot points 72 may be adjusted to control (e.g., adjust) the minimum radius of curvature at which the band 12 can be bent, and, in turn, provides a more comfortable oval-shaped band 12 when worn (in contrast to a less comfortable circular-shaped band 12). As shown in FIG. 27, the spacing between the pivot points 72 can be different at different points along the band 12. In other words, the pivot points 72 in one section of the band 12 may be a distance of d1 apart from one another, while the pivot points 72 in another section of the band 12 may be a distance of d2 apart from one another, d2 being greater or less than d1. For example, the spacing between pivot point 72A and 72B ($S_1$ in FIGS. 27 and 28) is less than the spacing between pivot point 72C and 72D ($S_2$ in FIGS. 27 and 28). As such, different sections of the band 12 (e.g., the sections disposed along the sides of the wrist) can be bent or flexed more than other portions of the band 12 (e.g., the sections disposed along the top and the bottom of the wrist), thereby facilitating the formation of a more oval-shaped band 12, as illustrated in FIG. 28.

Figure 29:
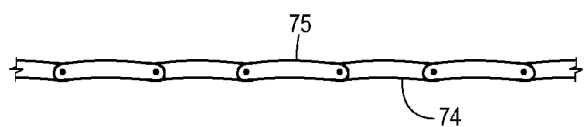
Figure 30:
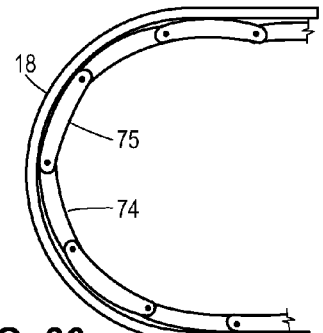

As shown in FIG. 29, the interconnected bars 74 and 75 can be arched or curved. As illustrated in FIG. 30, such a configuration serves to reduce, or even eliminate, the sharpness of the bending at the pivot points 72, thereby providing a more continuous shape when the band 12 is bent. In some cases, it may be desirable to arch the bars 74 and 75 so that the local display bending radii at the pivot points 72 are equal and opposite when the band 12 is both flat and bent (e.g., disposed around the wrist).

Figure 31:

In some instances, it may be desirable to limit the number of configurations that the device 10 can take on, such as, for example, cheap-looking configurations, configurations that provide a confusing user experience, or configurations in which the device 10 is likely to be damaged. To this end, one or more of the pivot points can be connected together with or using an interconnecting wire. As shown in FIG. 31, the pivot points 72 are connected together with or using an interconnecting wire 68. In some cases, several interconnecting wires 68 may be needed to connect different groups of pivot points 72. For example, one wire 68 may be utilized to interconnect pivot points 72 disposed along one side of the band 12, while another wire 68 may be utilized to interconnect pivot points 72 disposed along the opposite side of the band 12. In any event, the interconnecting wire(s) 68 serve(s) to synchronize the movement of the pivot points 72 that are connected to one another, which, in turn, fixes the angle between interconnected bars 74 and 75 for those pivot points 72 that are connected together.

In FIG. 32, interconnected bars 74 and 75 are connected at pivot points 72 and each includes a protrusion 76 that extends at least partially above the pivot point 72. In this case, the protrusions of adjacent bars 74 and 75 contact each other very soon (in response to minimal rotation about the pivot point 72) when rotated in one direction, to thereby limit or prevent such rotation, and allow rotation in the opposite direction. Moreover, the interconnected bars 74 and 75 may additionally include protrusions 77 that extend below the pivot point 72 but that are spaced further apart and thus allow more rotation than the protrusions 76. The protrusions 77 will thus enable the member 71 to bend in one direction (i.e., the down direction in FIG. 32) more than in the other direction (i.e., the up direction in FIG. 32). However, the protrusions 77 will still prevent bending or flexing at large angles of curvature and the spacing and interaction of the protrusions 76 and 77 can be configured to limit the minimal bending radius of the support element 71 to the greater than or equal to the minimum critical bending radius of the flexible electronic display 18 disposed on the support element 71, to thereby protect the flexible electronic display 18. In any event, the spacing and size of the protrusions 76 and 77 can be adjusted to obtain the desired amount of flexing in each direction.

Still further, FIG. 33 illustrates a top view of a bending or flexing limiting structure forming a flexible support, formed as a series of transversely interconnected longitudinal members 78 (which are also included in the general, categorical term "member 71" or "link 71" used interchangeably herein), each longitudinal member made up of a set of longitudinally disposed links. Here, the various sets of rotatably interconnected links are rotatably interconnected by pivot members disposed along the dotted lines 79 of FIG. 33. The various sets of links as illustrated in FIG. 33 may be used as or may be part of the flexible support 16, and may operate to limit the bending motion of the flexible support 16 in each of the longitudinal, counter-rotational and torsional directions described above. Of course, the interconnected links illustrated in FIG. 33 could additionally have wing or protrusion structure such as that of FIGS. 26, 27, 28, 31 and 32, or other structure that limits rotation of adjacent links about the transverse pivot points 79 interconnecting the links, to provide superior bending or flexing limiting structure.

In any event, the configuration of the members 71 of FIGS. 26-33 allow or enable movement of the adjacent slats or flat members 74, 75 and 78 with respect to one another in one direction, e.g., the down direction in FIGS. 26 and 27, limited to a particular minimum bending radius, while limiting the rotational movement of the slats or bars 74 and 75 in the opposite direction, such as the up direction in FIGS. 26 and 27, to the same or a different minimum bending radius. In this case, the member 71 with the alternating flat members 74 and flat members 75 or the interconnected support of FIG. 33 may be disposed along a longitudinal axis or in the longitudinal direction of the support 16, as illustrated in FIG. 34, to allow the bending motion illustrated in FIGS. 2 and 4 while limiting counter rotational bending motion. While only one member 71 is illustrated in FIG. 34 as being disposed longitudinally in the center of the flexible support 16, more such members could be disposed at other locations along the length of the flat support 16, such as on either or both lateral sides of the support 16. Moreover, while only one member 71 is illustrated in FIG. 34, multiple such members could be used to limit the counter-rotational movement of the flexible support 16. Of course, if desired, a bending limiting member similar to that of FIGS. 26 and 27 could be disposed along the edge of the flexible support 16 instead of or in addition to the wire 60 of FIG. 24, so as to both protect the edge of the flexible display 18 (by providing a rigid or semi-rigid structure at the edges of the display 18) and to limit the counter-rotational movement of the flexible support 16, while allowing some rotational movement of the support 16 in the manners described herein. Thus, for example, in FIG. 24, the wire 60 could be replaced with a series of links forming a bar member 71 in accordance with the principles of FIG. 26 or 27, for example, wherein the links 74 and 75 are rotationally connected to one another and are disposed such that they allow rotation or movement in one direction a certain amount while not allowing or at least limiting movement relative to one another in the other direction. Of course, the flat interconnected longitudinal members of FIGS. 26 and 27 could be used in conjunction with the slats or bars of FIG. 32 to limit both the torsional and the counter rotational movement of the flat support 16 in the manners described above.

In the embodiment illustrated in FIG. 35, the band 12 includes or is formed of one or more monolithically integrated, less flexible portions 600 combined with one or more hinged, more flexible portions 604. In other words, the band 12 depicted in FIG. 35 can include one or more portions constructed in accordance with different configurations of any one of the bands 12 described in FIGS. 1-6, 7A-7B, 10-12, and 20-34, to provide generally uniformly constructed or configured bending structure at different portions or sections of the band.

Generally speaking, the position of the less flexible portions 600 corresponds to portions of the article 10 where the required amount of flexing is limited (e.g., the portions of the article 10 disposed on the top and bottom of a wrist), while the position of the more flexible portions 604 corresponds to portions of the article 10 where the required amount of flexing is greater (e.g., the portions of the article 10 disposed adjacent the sides of the wrist). In any event, as illustrated in FIG. 35, the band or support member 16 can have any number of different sections of portions that allow or enable more or less bending (e.g., that have different minimum radii of curvature in either or both the rotational and counter-rotational directions) to effectuate different degrees of bending in these directions.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing display features via a flexible electronic display on a dynamically flexible article as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed is:

1. A system, comprising:
    a dynamically flexible electronic sheet having a flexible backplane substrate and a flexible frontplane substrate that are operatively connected between a first end and a second end opposite the first end, wherein the dynamically flexible electronic sheet is flexible between a substantially flat position and a curved position in which the first and second ends meet or overlap;
    a fastener configured to allow the electronic sheet to be at least one of releasably attached to or supported by each of a plurality of objects;
    one or more detection elements;
    a processor in communicative connection with the flexible electronic sheet; and
    a memory storing a routine that, when executed by the processor, operates to:
    determine, based on one or more signals generated by the one or more detection elements, a particular object that is currently supporting an article in which the dynamically flexible, electronic sheet is included, the particular object included in the plurality of objects;
    determine, based on the particular object, one or more respective actions that are to be performed by the article; and
    cause the one or more respective actions to be performed by the article.

2. The system of claim 1,
    wherein the routine operates to determine the one or more respective actions based on the particular object and further based on at least one of:
    (i) a current, dynamic flex state of the article, the current, dynamic flex state included in a plurality of dynamic flex states including bent and flat;
    (ii) a current spatial orientation of the article;
    (iii) a current environment in which the article is located;
    (iv) a current location at which the article is located within the current environment; or
    (v) a user input; and
    wherein each of (i) to (v) is determined by the processor based on one or more respective signals generated by the one or more detection elements.

3. The system of claim 1, wherein the article is releasably attached to itself using the fastener, and the article surrounds at least a portion of the particular object that is determined to be currently supporting the article.

4. The system of claim 3, wherein the article surrounds the at least the portion of the particular object in a particular orientation of a plurality of orientations, and wherein the routine operates to determine the one or more respective actions further based on the particular orientation.

5. The system of claim 1, wherein the particular object is a body part of a user of the article.

6. The system of claim 1, wherein the article is releasably attached, using the fastener, to the particular object that is determined to be currently supporting the article.

7. The system of claim 1, wherein:
    the memory further stores a mapping defining a plurality of associations between the plurality of objects and a plurality of respective actions; and
    the routine operates to determine the one or more respective actions corresponding to the particular object using the mapping.

8. The system of claim 1, wherein when the dynamically flexible electronic sheet is in the curved position, the first and second ends overlap.

9. A system, comprising:
    a dynamically flexible electronic sheet having a flexible backplane substrate and a flexible frontplane substrate that are operatively connected between a first end and a second end opposite the first end, wherein the dynamically flexible electronic sheet is flexible between a substantially flat position and a curved position in which the first and second ends meet or overlap;
    a wireless communication module that enables detection of an environment in which the flexible electronic sheet is located;
    a processor included in or in communicative connection with an article including the flexible electronic sheet; and
    a memory storing a routine that, when executed by the processor, operates to:
    determine, based on one or more signals received at the wireless communication module from another object, a current environment of the article;
    determine, based on the current environment in which the article is located, one or more respective actions that are to be performed by the article; and
    cause the one or more respective actions to be performed by the article.

10. The system of claim 9, wherein the current environment in which the article is located includes a plurality of locations, and wherein the routine determines the current environment and a current location of the article within the current environment based on the one or more signals received at the wireless communication module from the another object.

11. The system of claim 9, wherein:
the flexible electronic sheet includes a dynamically flexible, electronic display;
one or more optoelectronic elements are included in a display area of the dynamically flexible, electronic display;
each optoelectronic element of the one or more optoelectronic elements is configured to at least one of emit, reflect, or transflect light; and
the one or more respective actions to be performed by the article include causing image content to be at least one of presented or modified on the display area by using the one or more optoelectronic elements.

12. The system of claim 11, wherein the image content corresponds to at least one of: a newly launched application, a closing of a previously launched application, or a modification to a format of image content provided by a currently launched application.

13. The system of claim 12, wherein the modification to the format of the image content provided by the currently launched application comprises at least one of:
a change in a size of the image content provided by the currently launched application,
a change in an orientation of the image content provided by the currently launched application,
a disappearance or hiding of at least a part of the image content provided by the currently launched application,
a re-appearance or un-hiding of the at least the part of the image content provided by the currently launched application, or
a change in a location, on the flexible electronic display, of the image content provided by the currently launched application.

14. The system of claim 11, wherein the memory is a first memory, and wherein the article stores, in the first memory or in a second memory, one or more images to be presented on the display area when the article is detected, by the processor, to be in a particular mode, the particular mode corresponding to at least one of:
a particular object currently supporting the article, the particular object determined by the processor,
a current flex state of the article, the current flex state determined by the processor,
a current environment in which the article is located, the current environment determined by the processor,
a current location at which the article is situated within the current environment, the current location determined by the processor,
a current spatial orientation of the article, the current spatial orientation determined by the processor, or
a detected movement of the article, the detected movement determined by the processor.

15. A method presenting information at an article, the method comprising:
determining, by a processor that is included in the article or that is communication connection with the article, based on one or more respective signals generated by the one or more detection elements, an object currently supporting the article; and
determining, by the processor, respective image content based on the object currently supporting the article; and
causing, by the processor, the respective image content to be presented on a dynamically flexible electronic display of the article, wherein the dynamically flexible electronic display is flexible between a substantially flat position and a curved position in which a first end of the dynamically flexible electronic display and a second end of the dynamically flexible electronic display opposite the first end meet or overlap.

16. The method of claim 15, wherein determining the object currently supporting the article comprises determining that a human being or an inanimate object is currently supporting the article.

17. The method of claim 16,
further comprising determining an identity of the human being or of the inanimate object; and
wherein determining the respective image content based on the degree of flex comprises determining respective image content based on the determined identity.

18. The method of claim 15, wherein:
the one or more detection elements exclude a user interface;
the method further comprises determining, by the processor based on one or more respective signals generated by the one or more detection elements, an environment in which the article is currently located; and
determining the respective image content based on the degree of flex of the at least the portion of the article includes determining respective image content based on (i) the object currently supporting the article, and (ii) the environment in which the article is currently located.

19. The method of claim 18, wherein determining the environment in which the article is currently located comprises determining a particular location at which the article is situated within the environment in which the article is currently located, the particular location included in a plurality of locations within the environment.

20. The method of claim 15, wherein determining the respective image content further includes determining a modification to at least some of a current image content being presented on the flexible electronic display, the modification to the at least some of the current image content including at least one of:
a modification to a size of the at least some of the current image content;
a modification to an orientation of the at least some of the current image content;
a hiding of the at least part of the at least some of the current image content;
an un-hiding of a previously hidden portion of the current image content; or
moving the at least some of the current image content to a different location on the flexible electronic display.

21. The method of claim 15,
further comprising, by the processor and based on the object currently supporting the article, at least one of a launching a new application or closing a previously launched application; and
wherein at least one of the new image content included in the respective image content is provided by the launched new application, or the at least part of the current image content excluded from the respective image content is provided by the closed, previously launched application.

* * * * *